(12) United States Patent
Cho et al.

(10) Patent No.: US 8,897,719 B2
(45) Date of Patent: Nov. 25, 2014

(54) INITIALIZING A TRANSCEIVER IN A WIRELESS COMMUNICATION SYSTEM

(75) Inventors: In Sung Cho, Mountain View, CA (US); Kumar Mahesh, San Ramon, CA (US); Prakash Kamath, Santa Clara, CA (US); Jeffrey Gilbert, Palo Alto, CA (US); Rob Frizzell, San Jose, CA (US)

(73) Assignee: Sibeam, Inc., Sunnyvale, CA (US)

( * ) Notice: Subject to any disclaimer, the term of this patent is extended or adjusted under 35 U.S.C. 154(b) by 1216 days.

(21) Appl. No.: 12/165,472

(22) Filed: Jun. 30, 2008

(65) Prior Publication Data

US 2009/0325508 A1 Dec. 31, 2009

(51) Int. Cl.
*H04B 1/00* (2006.01)
*H04W 99/00* (2009.01)
*H04W 28/04* (2009.01)
*H04W 88/02* (2009.01)
*H04W 52/02* (2009.01)

(52) U.S. Cl.
CPC .............. *H04W 99/00* (2013.01); *H04W 28/04* (2013.01); *H04W 88/02* (2013.01); *H04W 52/0229* (2013.01)
USPC ................................ 455/73; 455/84; 455/90.2

(58) Field of Classification Search
USPC ............................................ 455/73, 84, 90.2
See application file for complete search history.

(56) References Cited

U.S. PATENT DOCUMENTS

| | | | |
|---|---|---|---|
| 5,182,746 A * | 1/1993 | Hurlbut et al. | 370/463 |
| 5,926,457 A | 7/1999 | Feng | |
| 6,603,733 B2 | 8/2003 | Tsukagoshi | |
| 6,658,254 B1 | 12/2003 | Purdy | |
| 6,742,052 B2 | 5/2004 | Himmel et al. | |
| 6,819,677 B1 | 11/2004 | Nouzovsky et al. | |
| 7,015,789 B1 * | 3/2006 | Helgeson | 340/3.1 |
| 7,058,739 B2 | 6/2006 | Wu | |
| 7,499,462 B2 | 3/2009 | MacMullan et al. | |

(Continued)

FOREIGN PATENT DOCUMENTS

| | | |
|---|---|---|
| EP | 1 450 515 A2 | 8/2004 |
| EP | 1 689 126 A1 | 8/2006 |
| WO | WO 97/36772 A1 | 10/1997 |
| WO | WO 2004/086623 A1 | 10/2004 |

OTHER PUBLICATIONS

US Office Action for U.S. Appl. No. 12/164,849, Mar. 30, 2010, 23 pgs.

(Continued)

*Primary Examiner* — Wen Huang
(74) *Attorney, Agent, or Firm* — Fenwick & West LLP

(57) ABSTRACT

A method and apparatus for initializing a transceiver in a wireless communication system. In one embodiment, a method for initializing a transceiver that is part of an apparatus for use in a wireless communication system for communicating with WirelessHD devices in a wireless network, where the apparatus comprises a host processor; a transceiver; a physical interface coupling the host processor and the transceiver; and a memory accessible by the host processor and the transceiver to exchange information between the host processor and the transceiver, the initialization method comprising resetting the transceiver by initializing internal hardware and software subsystems of the transceiver; after resetting the transceiver, the transceiver entering a configuration state to configure the transceiver; configuring the transceiver, such that the transceiver is configured as part of initialization; and after configuration, the transceiver entering a wait enable state during which the transceiver waits for its wireless interface to be enabled before wireless operation of the transceiver becomes active.

18 Claims, 64 Drawing Sheets

(56) References Cited

U.S. PATENT DOCUMENTS

| | | | |
|---|---|---|---|
| 7,514,962 | B2 | 4/2009 | Kumar |
| 7,644,217 | B2 | 1/2010 | Butler |
| 2003/0027517 | A1 | 2/2003 | Callway et al. |
| 2003/0120763 | A1 | 6/2003 | Volpano |
| 2003/0198178 | A1 | 10/2003 | Joo |
| 2004/0260760 | A1 | 12/2004 | Curnyn |
| 2005/0021725 | A1 | 1/2005 | Lobbert |
| 2005/0138217 | A1 | 6/2005 | Therisod et al. |
| 2005/0256970 | A1 | 11/2005 | Harrison et al. |
| 2005/0259646 | A1 | 11/2005 | Smith et al. |
| 2006/0035590 | A1* | 2/2006 | Morris et al. ............... 455/41.2 |
| 2006/0110157 | A1 | 5/2006 | Tritschler et al. |
| 2006/0128428 | A1 | 6/2006 | Rooyen |
| 2006/0190665 | A1* | 8/2006 | Oshita et al. ............... 710/313 |
| 2006/0252440 | A1 | 11/2006 | Sugaya et al. |
| 2007/0005859 | A1 | 1/2007 | Diefenbaugh et al. |
| 2007/0050240 | A1 | 3/2007 | Belani et al. |
| 2007/0171881 | A1 | 7/2007 | Zhang et al. |
| 2007/0268868 | A1 | 11/2007 | Singh et al. |
| 2007/0286140 | A1 | 12/2007 | Kwon et al. |
| 2007/0286378 | A1 | 12/2007 | Brown et al. |
| 2008/0062178 | A1 | 3/2008 | Khandekar et al. |
| 2008/0113631 | A1 | 5/2008 | Lee |
| 2008/0130617 | A1 | 6/2008 | Singh et al. |
| 2008/0146343 | A1 | 6/2008 | Sullivan |
| 2008/0209233 | A1 | 8/2008 | Kumar et al. |
| 2008/0212568 | A1 | 9/2008 | So et al. |
| 2008/0253344 | A1 | 10/2008 | Lin et al. |
| 2008/0304452 | A1* | 12/2008 | Solvsteen ............... 370/331 |
| 2008/0320194 | A1 | 12/2008 | Vega et al. |
| 2009/0131003 | A1* | 5/2009 | Masamoto et al. ........ 455/186.1 |
| 2009/0154412 | A1 | 6/2009 | Wang et al. |
| 2009/0232034 | A1 | 9/2009 | Li et al. |
| 2009/0232079 | A1 | 9/2009 | Khandekar |
| 2009/0279594 | A1* | 11/2009 | Muhammad ............... 375/219 |

OTHER PUBLICATIONS

US Office Action for U.S. Appl. No. 12/165,494, May 14, 2010, 12 pgs.
US Office Action for U.S. Appl. No. 12/164,907, Jul. 9, 2010, 12 pgs.
US Office Action for U.S. Appl. No. 12/164,849, Aug. 4, 2010, 22 pgs.
"The I2C-Bus Specification", Version 2.1, Jan. 2000, 46 pgs., Phillips Semiconductors.
US Office Action for related U.S. Appl. No. 12/164,810, Feb. 2, 2011, 25 pgs.
US Office Action for related U.S. Appl. No. 12/164,907, Feb. 24, 2011, 12 pgs.
US Final Office Action for related U.S. Appl. No. 12/164,757, Mar. 30, 2011, 31 pgs.
US Final Office Action for related U.S. Appl. No. 12/165,468, Apr. 14, 2011, 13 pgs.
Gilbert, Jeffrey M. et al., "A 4-GBPS Uncompressed Wirelss HD AV/Transceiver Chipset", (Internet) <http://ieexplore.ieee.org/stap/stamp.jsp?arnumber=4523359&isnumber=4523348>, Apr. 2008, 9 pgs., IEEE Computer Society.
Gilbert, Jeffrey M. et al., "A 4 GBPS Wireless True Uncompressed 1080P-Capable HD A/V Transceiver Using 60 GHZ", (Internet) <http://www.hotchips.com/archives/hc19/3_Tues/HC19.06/HC19.06.01.pdf>, 2007, 12 pgs., SiBeam Inc.
Wei, Chao-Huang et al., "Implementation of Local Area Digital Audio Broadcasting System Upon I2C Network",(Internet) <http://ieeexplore.ieee.org/stamp/stamp.jsp?arnumber=1354395&isnumber=29745>, 4 pgs., Jul. 2004.
Internatioanal Search Report for PCT Patent Application No. PCT/US2008/070093, May 11, 2009, 9 pgs.
Written Opinion of the International Searching Authority for PCT Patent Application No. PCT/US2008/070093, May 11, 2009, 15 pgs.
US Office Action for U.S. Appl. No. 12/164,849, Jun. 7, 2011, 21 pgs.
US Office Action for U.S. Appl. No. 12/164,757, Aug. 31, 2011, 29 pgs.
US Office Action for U.S. Appl. No. 12/164,757, Dec. 6, 2010, 29 pgs.
US Office Action for U.S. Appl. No. 12/165,468, Dec. 15, 2010, 12 pgs.
US Office Action for U.S. Appl. No. 12/165,494, Oct. 13, 2010, 13 pgs.

* cited by examiner

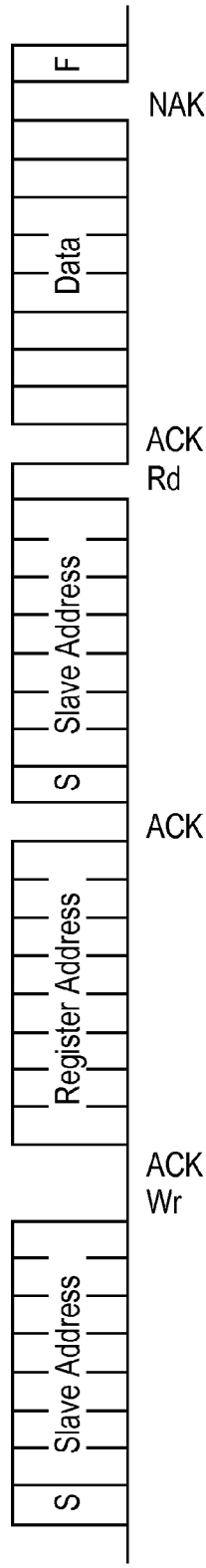
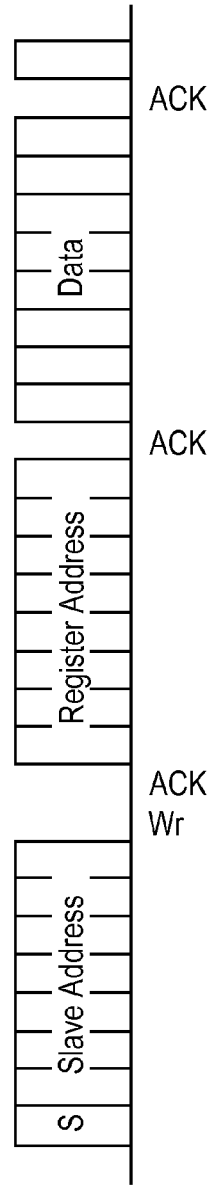
FIG. 3A I2C Read Sequence
FIG. 3B I2C Write Sequence

| | 7 | 6 | 5 | 4 | 3 | 2 | 1 | 0 |
|---|---|---|---|---|---|---|---|---|
| 0x00 | Reserved | | | CLR INPUT FORMAT | CLR_TX | CLR_RX | SW_RST | NW_RST |

FIG. 11

| | 7 | 6 | 5 | 4 | 3 | 2 | 1 | 0 |
|---|---|---|---|---|---|---|---|---|
| 0x05 | Reserved | | RX READY | TX READY | INPUT FORMAT RXD | DEVCAP RXD | WiHD ON | CHIP LOAD |

FIG. 12

| | 7 | 6 | 5 | 4 | 3 | 2 | 1 | 0 |
|---|---|---|---|---|---|---|---|---|
| 0x07 | Reserved | | | MEMORY FAILURE | AVD FAILURE | MAC FAILURE | RADIO FAILURE | DRIVER FAILURE |

FIG. 13

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 14

| | 7 | 6 | 5 | 4 | 3 | 2 | 1 | 0 |
|---|---|---|---|---|---|---|---|---|
| 0x04 | Reserved | | | RX DONE | TX READY | INPUT FORMAT DONE | DEVCAP DONE | CLR CHIP LOAD |

FIG. 15

| | 7 | 6 | 5 | 4 | 3 | 2 | 1 | 0 |
|---|---|---|---|---|---|---|---|---|
| 0x05 | Reserved | | RX READY | TX DONE | INPUT FORMAT RXD | DEVCAP RXD | WiHD ON | CHIP LOAD |

FIG. 16

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 17

| | |
|---|---|
| 0x00 | device ID |
| 0x01 | device major revision |
| 0x02 | device minor revision |
| 0x03 | vendor ID |

FIG. 18

| | |
|---|---|
| 0x04 | device category |
| 0x05 | device version |
| 0x06 | A/V type/CF |
| 0x07 | w-type/FC/FV/FA/PT* |
| 0x08 | MAC-extension |
| 0x09 | |
| 0x0A | |
| 0x0B | |
| 0x0C | MAC address |
| 0x0D | |
| 0x0E | |
| 0x0F | |
| 0x10 | manufacturer name |
| 0x11 | |
| 0x12 | |
| 0x13 | |
| 0x14 | |
| 0x15 | |
| 0x16 | |
| 0x17 | |
| 0x18 | |
| 0x19 | device name |
| 0x1A | |
| 0x1B | |
| 0x1C | |
| 0x1D | |
| 0x1E | |
| 0x1F | |
| 0x20 | |

FIG. 19

| | 7 | 6 | 5 | 4 | 3 | 2 | 1 | 0 |
|---|---|---|---|---|---|---|---|---|
| 0x04 | Reserved | | | RX DONE | TX READY | INPUT FORMAT DONE | DEVCAP DONE | INIT WiHD |

FIG. 20

|      | 7  | 6  | 5  | 4  | 3  | 2  | 1  | 0  |
|------|----|----|----|----|----|----|----|----|
| 0x08 | 7  | 6  | 5  | 4  | 3  | 2  | 1  | 0  |
| 0x09 | 16 | 14 | 13 | 12 | 11 | 10 | 9  | 8  |
| 0x0A | 23 | 22 | 21 | 20 | 15 | 18 | 17 | 16 |
| 0x0B | 31 | 30 | 29 | 28 | 27 | 26 | 25 | 24 |
| 0x0C | 39 | 38 | 37 | 36 | 35 | 34 | 33 | 32 |
| 0x0D | 47 | 46 | 45 | 44 | 43 | 42 | 41 | 40 |
| 0x0E | 55 | 54 | 53 | 52 | 51 | 50 | 49 | 48 |
| 0x0F | 63 | 62 | 61 | 60 | 59 | 58 | 57 | 56 |

FIG. 25

|      | 7 | 6 | 5 | 4 | 3 | 2 | 1 | 0 |
|------|---|---|---|---|---|---|---|---|
| 0x08 | 0 | 0 | 0 | 0 | 0 | 1 | 0 | 0 |
| 0x09 | 0 | 0 | 0 | 0 | 0 | 0 | 0 | 0 |
| 0x0A | 0 | 0 | 0 | 0 | 0 | 0 | 0 | 0 |
| 0x0B | 0 | 0 | 0 | 0 | 0 | 0 | 0 | 0 |
| 0x0C | 0 | 0 | 0 | 0 | 0 | 0 | 0 | 0 |
| 0x0D | 0 | 0 | 0 | 1 | 0 | 0 | 0 | 0 |
| 0x0E | 0 | 0 | 0 | 0 | 0 | 0 | 0 | 0 |
| 0x0F | 0 | 0 | 0 | 0 | 0 | 0 | 0 | 0 |

|      | 7 | 6 | 5 | 4 | 3 | 2 | 1 | 0 |
|------|---|---|---|---|---|---|---|---|
| 0x10 | 0 | 0 | 0 | 0 | 1 | 0 | 0 | 0 |
| 0x11 | 0 | 0 | 0 | 0 | 0 | 0 | 0 | 0 |
| 0x12 | 0 | 0 | 0 | 0 | 0 | 0 | 0 | 0 |
| 0x13 | 0 | 0 | 0 | 0 | 0 | 0 | 0 | 0 |
| 0x14 | 0 | 0 | 0 | 0 | 0 | 0 | 0 | 0 |
| 0x15 | 0 | 0 | 0 | 1 | 0 | 0 | 0 | 0 |
| 0x16 | 0 | 0 | 0 | 0 | 0 | 0 | 0 | 0 |
| 0x17 | 0 | 0 | 0 | 0 | 0 | 0 | 0 | 0 |

FIG. 26

| | 7 | 6 | 5 | 4 | 3 | 2 | 1 | 0 |
|---|---|---|---|---|---|---|---|---|
| 0x05 | Reserved | | RX DONE | TX DONE | INPUT FORMAT DONE | DEVCAP RXD | WiHD ON | CHIP LOAD |

FIG. 27

| | 7 | 6 | 5 | 4 | 3 | 2 | 1 | 0 |
|---|---|---|---|---|---|---|---|---|
| 0x08 | 0 | 1 | 0 | 0 | 0 | 1 | 0 | 0 |
| 0x09 | 0 | 0 | 0 | 0 | 0 | 0 | 0 | 0 |
| 0x0A | 0 | 0 | 0 | 0 | 0 | 0 | 0 | 0 |
| 0x0B | 0 | 0 | 0 | 0 | 0 | 0 | 0 | 0 |
| 0x0C | 0 | 0 | 0 | 0 | 0 | 0 | 0 | 0 |
| 0x0D | 0 | 0 | 0 | 1 | 0 | 0 | 0 | 0 |
| 0x0E | 0 | 0 | 0 | 0 | 0 | 0 | 0 | 0 |
| 0x0F | 0 | 0 | 0 | 0 | 0 | 0 | 0 | 0 |

| | 7 | 6 | 5 | 4 | 3 | 2 | 1 | 0 |
|---|---|---|---|---|---|---|---|---|
| | 0 | 0 | 0 | 0 | 1 | 0 | 0 | 0 |
| 0x11 | 0 | 0 | 0 | 0 | 0 | 0 | 0 | 0 |
| 0x12 | 0 | 0 | 0 | 0 | 0 | 0 | 0 | 0 |
| | 0 | 0 | 0 | 0 | 0 | 0 | 0 | 0 |
| 0x14 | 0 | 0 | 0 | 0 | 0 | 0 | 0 | 0 |
| | 0 | 0 | 0 | 1 | 0 | 0 | 0 | 0 |
| 0x16 | 0 | 0 | 0 | 0 | 0 | 0 | 0 | 0 |
| 0x17 | 0 | 0 | 0 | 0 | 0 | 0 | 0 | 0 |

FIG. 28

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXC | CLR DEVCAP/ RXC | CLR WiHD ON | CLR CHIP LOAD |

FIG. 29

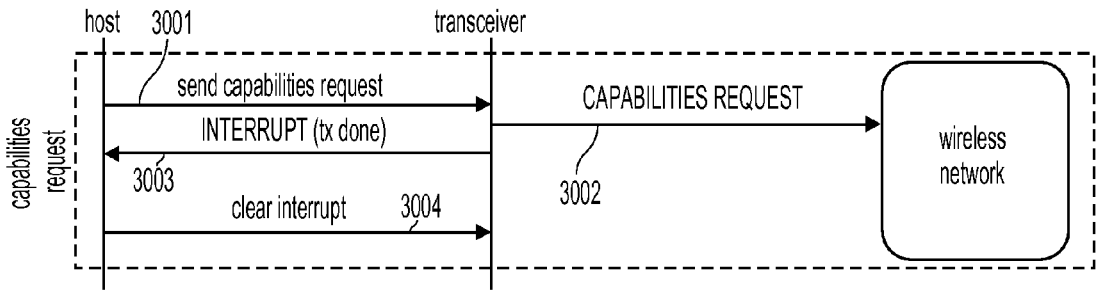
FIG. 30
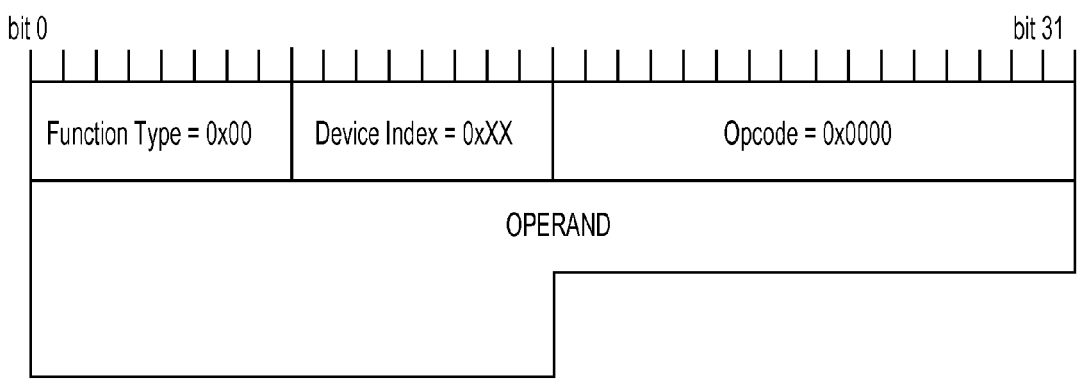
FIG. 31
| 0x00 | Bus ID = 0x01 |
| --- | --- |
| 0x01 | Length = 0x0A |
| 0x02 | Sequence ID = 0xC0 |
| 0x03 | Function Type = 0x00 |
| 0x04 | Device Index = 0xXX |
| 0x05 | Opcode = 0x0000 |
| 0x06 | |
| 0x07 | |
| 0x08 | |
| 0x09 | OPERAND |
| 0x0A | |
| 0x0B | |
| 0x0C | |
| 0x0D | Checksum Byte |
FIG. 32

| | 7 | 6 | 5 | 4 | 3 | 2 | 1 | 0 |
|---|---|---|---|---|---|---|---|---|
| 0x04 | Reserved | | | RX DONE | TX READY | INPUT FORMAT DONE | DEVCAP DONE | INIT WiHD |

| | 7 | 6 | 5 | 4 | 3 | 2 | 1 | 0 |
|---|---|---|---|---|---|---|---|---|
| 0x05 | Reserved | | RX READY | TX DONE | INPUT FORMAT DONE | DEVCAP RXD | WiHD ON | CHIP LOAD |

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

| | 7 | 6 | 5 | 4 | 3 | 2 | 1 | 0 |
|---|---|---|---|---|---|---|---|---|
| 0x05 | Reserved | | RX READY | TX DONE | INPUT FORMAT DONE | DEVCAP RXD | WiHD ON | CHIP LOAD |

FIG. 39

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 40

| | | |
|---|---|---|
| 0x00 | Bus ID = 0x01 | |
| 0x01 | Length = 0x0A | |
| 0x02 | Sequence ID = 0xC0 | |
| 0x03 | Function Type = 0x00 | |
| 0x04 | Device Index = 0xXX | |
| 0x05 | Opcode = 0x0002 | |
| 0x06 | | |
| 0x07 | | |
| 0x08 | | |
| 0x09 | OPERAND | |
| 0x0A | | |
| 0x0B | | |
| 0x0C | | |
| 0x0D | Checksum Byte | |

FIG. 47

| | 7 | 6 | 5 | 4 | 3 | 2 | 1 | 0 |
|---|---|---|---|---|---|---|---|---|
| 0x04 | Reserved | | | RX DONE | TX READY | INPUT FORMAT DONE | DEVCAP DONE | INIT WiHD |

FIG. 48

| | 7 | 6 | 5 | 4 | 3 | 2 | 1 | 0 |
|---|---|---|---|---|---|---|---|---|
| 0x05 | Reserved | | RX READY | TX DONE | INPUT FORMAT DONE | DEVCAP RXD | WiHD ON | CHIP LOAD |

FIG. 49

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 50

| | |
|---|---|
| 0x00 | Bus ID = 0x01 |
| 0x01 | Length = 0x0A |
| 0x02 | Sequence ID = 0xC0 |
| 0x03 | Function Type = 0x00 |
| 0x04 | Device Index = 0xXX |
| 0x05 | Opcode = 0x0003 |
| 0x06 | |
| 0x07 | |
| 0x08 | |
| 0x09 | OPERAND |
| 0x0A | |
| 0x0B | |
| 0x0C | |
| 0x0D | Checksum Byte |

FIG. 54

| | 7 | 6 | 5 | 4 | 3 | 2 | 1 | 0 |
|---|---|---|---|---|---|---|---|---|
| 0x05 | Reserved | | RX READY | TX DONE | INPUT FORMAT DONE | DEVCAP RXD | WiHD ON | CHIP LOAD |

FIG. 55

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 56

| | |
|---|---|
| 0x00 | Bus ID = 0x01 |
| 0x01 | Length = 0x0A |
| 0x02 | Sequence ID = 0xC0 |
| 0x03 | Function Type = 0x00 |
| 0x04 | Device Index = 0xXX |
| 0x05 | Opcode = 0x0005 |
| 0x06 | |
| 0x07 | |
| 0x08 | |
| 0x09 | OPERAND |
| 0x0A | |
| 0x0B | |
| 0x0C | |
| 0x0D | Checksum Byte |

FIG. 62

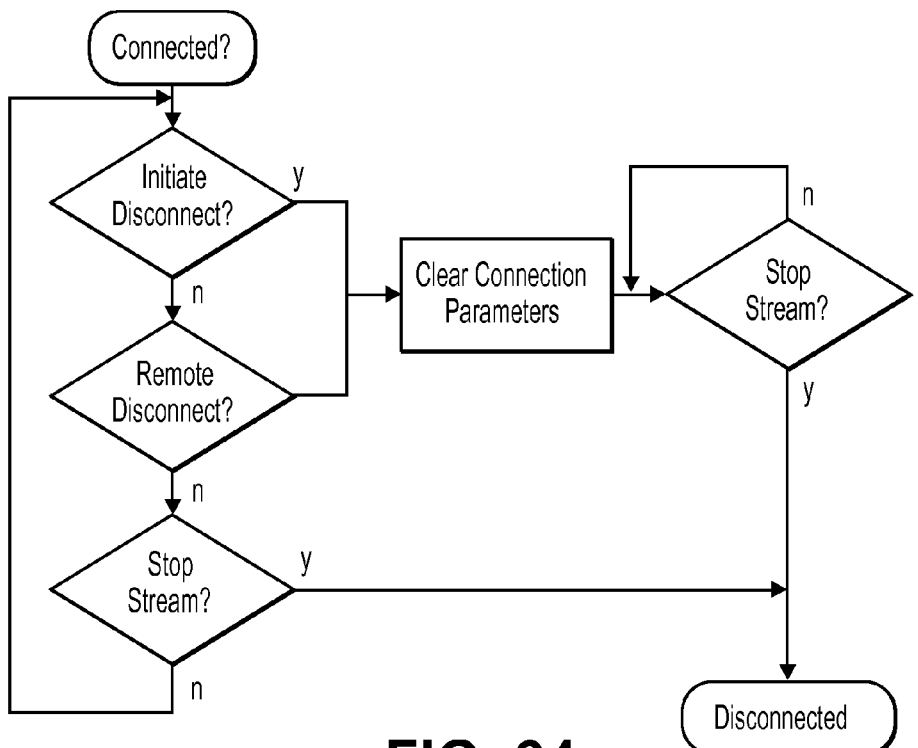
FIG. 64
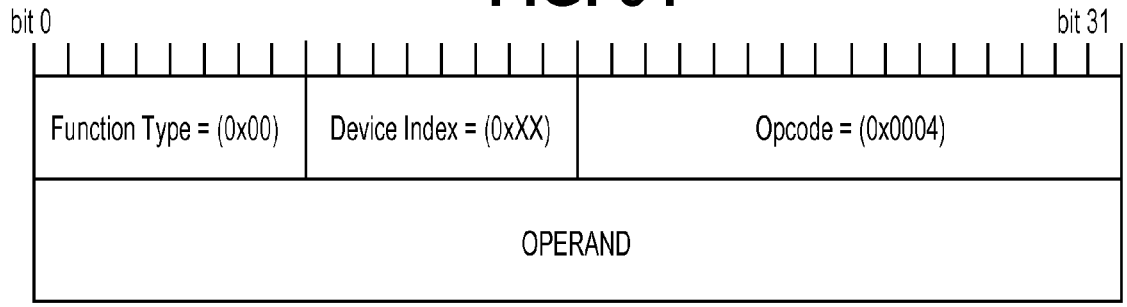
FIG. 65
FIG. 66

| | 7 | 6 | 5 | 4 | 3 | 2 | 1 | 0 |
|---|---|---|---|---|---|---|---|---|
| 0x05 | Reserved | | | RX READY | TX READY | INPUT FORMAT DONE | DEVCAP DONE | INIT WiHD |

FIG. 67

| | 7 | 6 | 5 | 4 | 3 | 2 | 1 | 0 |
|---|---|---|---|---|---|---|---|---|
| 0x05 | Reserved | | RX READY | TX READY | INPUT FORMAT RXD | DEVCAP RXD | WiHD ON | CHIP LOAD |

FIG. 68

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 69

| | 7 | 6 | 5 | 4 | 3 | 2 | 1 | 0 |
|---|---|---|---|---|---|---|---|---|
| 0x05 | Reserved | | RX READY | TX READY | INPUT FORMAT RXD | DEVCAP RXD | WiHD ON | CHIP LOAD |

FIG. 70

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 71

| | | | | |
|---|---|---|---|---|
| 0x00 | device ID | 0x21 | color space |
| 0x01 | device major revision | 0x22 | aspect ratio/QY*** |
| 0x02 | device minor revision | 0x23 | color depth |
| 0x03 | vendor ID | 0x24 | colorimetry |
| 0x04 | device category | 0x25 | format number |
| 0x05 | device version | 0x26 | VIC 1 |
| 0x06 | A/V type/CF* | 0x27 | VIC 2 |
| 0x07 | w-type/FC/FV/FA/PT** | 0x28 | VIC 3 |
| 0x08 | MAC-extension | 0x29 | VIC 4 |
| 0x09 | | 0x2A | VIC 5 |
| | | 0x2B | VIC 6 |
| | | 0x2C | |
| | | | RESERVED |
| 0x0F | manufacturer name | 0x0F | |
| | | | timing ID (1) |
| 0x11 | | 0x11 | pixel clock (1) |
| | | | horizontal active (1) |
| | | | horizontal blanking (1) |
| | device name | | vertical active (1) |
| | | | vertical blanking (1) |
| | | | horizontal sync offset (1) |
| | | | vertical sync offset (1) |
| | | | horizontal sync pulsewidth (1) |
| | | | vertical sync pulsewidth (1) |

FIG. 77

| Addr | Field |
|---|---|
| 0x42 | horizontal image size (1) |
| 0x44 | vertical image size (1) |
| 0x46 | horizontal border (1) |
| 0x47 | vertical border (1) |
| 0x48 | flag (1) |
| 0x49 | timing ID (2) |
| 0x4A | pixel clock (2) |
| 0x4C | horizontal active (2) |
| 0x4E | horizontal blanking (2) |
| 0x50 | vertical active (2) |
| 0x52 | vertical blanking (2) |
| 0x54 | horizontal sync offset (2) |
| 0x56 | vertical sync offset (2) |
| 0x57 | horizontal sync pulsewidth (2) |
| 0x59 | vertical sync pulsewidth (2) |
| 0x5A | horizontal image size (2) |
| 0x5C | vertical image size (2) |
| 0x5E | horizontal border (2) |
| 0x5F | vertical border (2) |
| 0x60 | flag (2) |
| 0x61 | timing ID (3) |
| 0x62 | pixel clock (3) |
| 0x64 | horizontal active (3) |
| 0x66 | horizontal blanking (3) |

| Addr | Field |
|---|---|
| 0x68 | vertical active (3) |
| 0x6A | vertical blanking (3) |
| 0x6C | horizontal sync offset (3) |
| 0x6E | vertical sync offset (3) |
| 0x6F | horizontal sync pulsewidth (3) |
| 0x71 | vertical sync pulsewidth (3) |
| 0x72 | horizontal image size (3) |
| 0x74 | vertical image size (3) |
| 0x76 | horizontal border (3) |
| 0x77 | vertical border (3) |
| 0x78 | flag (3) |
| 0x79 | timing ID (4) |
| 0x7A | pixel clock (4) |
| 0x7C | horizontal active (4) |
| 0x7E | horizontal blanking (4) |
| 0x80 | vertical active (4) |
| 0x82 | vertical blanking (4) |
| 0x84 | horizontal sync offset (4) |
| 0x86 | vertical sync offset (4) |
| 0x87 | horizontal sync pulsewidth (4) |
| 0x89 | vertical sync pulsewidth (4) |
| 0x8A | horizontal image size (4) |
| 0x8C | vertical image size (4) |

FIG. 78

| Addr | Field | Addr | Field |
|---|---|---|---|
| 0x8E | horizontal border (4) | 0xAE | horizontal blanking (6) |
| 0x8F | vertical border (4) | | |
| 0x90 | flag (4) | 0xB0 | vertical active (6) |
| 0x91 | timing ID (5) | | |
| 0x92 | pixel clock (5) | 0xB2 | vertical blanking (6) |
| 0x94 | horizontal active (5) | 0xB4 | horizontal sync offset (6) |
| 0x96 | horizontal blanking (5) | 0xB6 | vertical sync offset (6) |
| | | 0xB7 | horizontal sync pulsewidth (6) |
| 0x98 | vertical active (5) | 0xB9 | vertical sync pulsewidth (6) |
| 0x9A | vertical blanking (5) | 0xBA | horizontal image size (6) |
| 0x9C | horizontal sync offset (5) | 0xBC | vertical image size (6) |
| 0x9E | vertical sync offset (5) | 0xBE | horizontal border (6) |
| 0x9F | horizontal sync pulsewidth (5) | 0xBF | vertical border (6) |
| | | 0xC0 | flag (6) |
| 0xA1 | vertical sync pulsewidth (5) | 0xC1 | audio format number |
| 0xA2 | horizontal image size (5) | 0xC2 | AIC |
| | | 0xC3 | max channel |
| 0xA4 | vertical image size (5) | 0xC4 | sample size |
| | | 0xC5 | sample frequency |
| 0xA6 | horizontal border (5) | | |
| 0xA7 | vertical border (5) | 0xC7 | max bit rate |
| 0xA8 | flag (5) | 0xC8 | AIC (2) |
| 0xA9 | timing ID (6) | 0xC9 | max channel (2) |
| 0xAA | pixel clock (6) | 0xCA | sample size (2) |
| | | 0xCB | sample frequency (2) |
| 0xAC | horizontal active (6) | 0xCD | max bit rate (2) |

FIG. 79

| | |
|---|---|
| 0xCE | AIC (3) |
| 0xCF | max channel (3) |
| 0xD0 | sample size (3) |
| 0xD1 | sample frequency (3) |
| 0xD3 | max bit rate (3) |
| 0xD4 | AIC (4) |
| 0xD5 | max channel (4) |
| 0xD6 | sample size (4) |
| 0xD7 | sample frequency (4) |
| 0xD9 | max bit rate (4) |
| 0xDA | AIC (5) |
| 0xDB | max channel (5) |
| 0xDC | sample size (5) |
| 0xDD | sample frequency (5) |
| 0xDF | max bit rate (5) |
| 0xE0 | AIC (6) |
| 0xE1 | max channel (6) |
| 0xE2 | sample size (6) |
| 0xE3 | sample frequency (6) |
| 0xE5 | max bit rate (6) |
| 0xE6 | AIC (7) |

| | |
|---|---|
| 0xE7 | max channel (7) |
| 0xE8 | sample size (7) |
| 0xE9 | sample frequency (7) |
| 0xEB | max bit rate (7) |
| 0xEC | AIC (8) |
| 0xED | max channel (8) |
| 0xEE | sample size (8) |
| 0xEF | sample frequency (8) |
| 0xF1 | max bit rate (8) |
| 0xF2 | RESERVED |
| 0xFE | speaker allocation |

FIG. 80

| 0x06 | 7 | 6 | 5 | 4 | 3 | 2 | 1 | 0 |
|---|---|---|---|---|---|---|---|---|
| | RESERVED | | | CF | a/v type | | | |

FIG. 81

| 0x07 | 7 | 6 | 5 | 4 | 3 | 2 | 1 | 0 |
|---|---|---|---|---|---|---|---|---|
| | PT | FA | FV | FC | wireless type | | | |

FIG. 82

| 0x22 | 7 | 6 | 5 | 4 | 3 | 2 | 1 | 0 |
|---|---|---|---|---|---|---|---|---|
| | QV | RESERVED | | | | | AR | |

FIG. 83

| | |
|---|---|
| 0x00 | Reset |
| 0x01 | Power Mode |
| 0x02 | Interface Control |
| 0x03 | Ready |
| 0x04 | Host Control |
| 0x05 | Status |
| 0x06 | Clear |
| 0x07 | SYS status |
| 0x08 ... ... | DEVCAF TABLE |
| 0x20 ... ... ... ... | RESERVED |
| 0x60 ... ... ... ... | Wireless Control |
| 0xA0 ... ... ... | RESERVED |
| 0xF7 0xFB | SoC S/W Version |
| 0xFC 0xFF | System Tick |

FIG. 84

| | 7 | 6 | 5 | 4 | 3 | 2 | 1 | 0 |
|---|---|---|---|---|---|---|---|---|
| 0x00 | Reserved | | | CLR INPUT FORMAT | CLR_TX | CLR_RX | SW_RST | HW_RST |

| 7 | 6 | 5 | 4 | 3 | 2 | 1 | 0 |
|---|---|---|---|---|---|---|---|
| Reserved | | | | | | PWR_MODE | |

| 7 | 6 | 5 | 4 | 3 | 2 | 1 | 0 |
|---|---|---|---|---|---|---|---|
| Reserved | | | | RST_POL | INT_POL | BAUD | |

| 7 | 6 | 5 | 4 | 3 | 2 | 1 | 0 |
|---|---|---|---|---|---|---|---|
| Reserved | | | CLR RX READY | CLR TX DONE | INPUT FORMAT READY | DEVCAP READY | WiHD READY | CHIP LOADED |

| 7 | 6 | 5 | 4 | 3 | 2 | 1 | 0 |
|---|---|---|---|---|---|---|---|
| Reserved | | | RX DONE | TX READY | INPUT FORMAT DONE | DEVCAP DONE | INT WiHD |

| 7 | 6 | 5 | 4 | 3 | 2 | 1 | 0 |
|---|---|---|---|---|---|---|---|
| Reserved | | | RX READY | TX READY | INPUT FORMAT RXD | DEVCAP RXD | WiHD ON | CHIP LOAD |

FIG. 90

| | 7 | 6 | 5 | 4 | 3 | 2 | 1 | 0 |
|---|---|---|---|---|---|---|---|---|
| 0x06 | Reserved | | CLR RX READY | CLR TX DONE | CLR INPUT FMT RXD | CLR DEVCAP RXD | CLR WiHD ON | CLR CHIP LOAD |

FIG. 91

| | 7 | 6 | 5 | 4 | 3 | 2 | 1 | 0 |
|---|---|---|---|---|---|---|---|---|
| 0x07 | Reserved | | | MEMORY FAILURE | AVC FAILURE | MAC FAILURE | RADIO FAILURE | DRIVER FAILURE |

FIG. 92

| | 7 | 6 | 5 | 4 | 3 | 2 | 1 | 0 |
|---|---|---|---|---|---|---|---|---|
| 0x08 | 7 | 6 | 5 | 4 | 3 | 2 | 1 | 0 |
| 0x09 | 16 | 14 | 13 | 12 | 11 | 10 | 9 | 8 |
| 0x0A | 23 | 22 | 21 | 20 | 15 | 18 | 17 | 16 |
| 0x0B | 31 | 30 | 29 | 28 | 27 | 26 | 25 | 24 |
| 0x0C | 39 | 38 | 37 | 36 | 35 | 34 | 33 | 32 |
| 0x0D | 47 | 46 | 45 | 44 | 43 | 42 | 41 | 40 |
| 0x0E | 55 | 54 | 53 | 52 | 51 | 50 | 49 | 48 |
| 0x0F | 63 | 62 | 61 | 60 | 59 | 58 | 57 | 56 |

FIG. 93

|      | 7  | 6  | 5  | 4  | 3  | 2  | 1  | 0  |
|------|----|----|----|----|----|----|----|----|
| 0x10 | 7  | 6  | 5  | 4  | 3  | 2  | 1  | 0  |
| 0x11 | 16 | 14 | 13 | 12 | 11 | 10 | 9  | 8  |
| 0x12 | 23 | 22 | 21 | 20 | 15 | 18 | 17 | 16 |
| 0x13 | 31 | 30 | 29 | 28 | 27 | 26 | 25 | 24 |
| 0x14 | 39 | 38 | 37 | 36 | 35 | 34 | 33 | 32 |
| 0x15 | 47 | 46 | 45 | 44 | 43 | 42 | 41 | 40 |
| 0x16 | 55 | 54 | 53 | 52 | 51 | 50 | 49 | 48 |
| 0x17 | 63 | 62 | 61 | 60 | 59 | 58 | 57 | 56 |

FIG. 94

|      | 7  | 6  | 5  | 4  | 3  | 2  | 1  | 0  |
|------|----|----|----|----|----|----|----|----|
| 0x18 | 7  | 6  | 5  | 4  | 3  | 2  | 1  | 0  |
| 0x19 | 16 | 14 | 13 | 12 | 11 | 10 | 9  | 8  |
| 0x1A | 23 | 22 | 21 | 20 | 15 | 18 | 17 | 16 |
| 0x1B | 31 | 30 | 29 | 28 | 27 | 26 | 25 | 24 |
| 0x1C | 39 | 38 | 37 | 36 | 35 | 34 | 33 | 32 |
| 0x1D | 47 | 46 | 45 | 44 | 43 | 42 | 41 | 40 |
| 0x1E | 55 | 54 | 53 | 52 | 51 | 50 | 49 | 48 |
| 0x1F | 63 | 62 | 61 | 60 | 59 | 58 | 57 | 56 |

FIG. 95

| 0xF7 | Major Version/Minor Version |
|------|-----------------------------|
| 0xF8 | Month                       |
| 0xF9 | Day                         |
| 0xFA | Year                        |
| 0xFB | Subscript                   |

FIG. 96

| | 7 | 6 | 5 | 4 | 3 | 2 | 1 | 0 |
|---|---|---|---|---|---|---|---|---|
| 0xF7 | Major Version | | | | Minor Version | | | |

FIG. 97

| | |
|---|---|
| 0xFC | System Tick (LSB) |
| 0xFD | ... |
| 0xFE | ... |
| 0xFF | System Tick (MSB) |

FIG. 98

| | |
|---|---|
| 0x00 | Bus ID |
| 0x01 | Length |
| 0x02 | Sequence |
| 0x03 | Payload |
| ... | Payload + 1 |
| ... | ... |
| ... | ... |
| ... | ... |
| 0x02 + Length | Payload + Length |
| 0x02 + Length + 1 | Checksum |

FIG. 99

| | 7 | 6 | 5 | 4 | 3 | 2 | 1 | 0 |
|---|---|---|---|---|---|---|---|---|
| 0x02 | Frame | | Sequence | | | | | |

FIG. 100

INITIALIZING A TRANSCEIVER IN A WIRELESS COMMUNICATION SYSTEM

FIELD OF THE INVENTION

The present invention relates to the field of communicating information between devices in a wireless communication system; more particularly, the present invention relates to a host and transceiver in a wireless communication system, including their interaction, communication, and/or initialization.

BACKGROUND OF THE INVENTION

WirelessHD™ is an industry-led effort to define a specification for the next generation wireless digital network interface specification for wireless high-definition (HD) signal transmission for consumer electronics products.

The WirelessHD™ (WiHD™) standard allows for uncompressed digital transmission of HD video and audio and data signals, with a goal of being the same or higher quality as wired HDMI. The specification has been designed and optimized for wireless display connectivity, achieving high-speed rates up to 4 Gbit/s.

The signal will operate on the 60 GHz band and support the bandwidth required to support both current and future HD signals. Operation in the 60 GHz band previously required line of sight to communicate between two devices. However, the WiHD standard overcomes this limitation through the use of beamforming at both the receiver and transmitter to achieve non line of sight communication.

SUMMARY OF THE INVENTION

A method and apparatus for initializing a transceiver in a wireless communication system. In one embodiment, a method for initializing a transceiver that is part of an apparatus for use in a wireless communication system for communicating with WirelessHD devices in a wireless network, where the apparatus comprises a host processor; a transceiver; a physical interface coupling the host processor and the transceiver; and a memory accessible by the host processor and the transceiver to exchange information between the host processor and the transceiver, the initialization method comprising resetting the transceiver by initializing internal hardware and software subsystems of the transceiver; after resetting the transceiver, the transceiver entering a configuration state to configure the transceiver; configuring the transceiver, such that the transceiver is configured as part of initialization; and after configuration, the transceiver entering a wait enable state during which the transceiver waits for its wireless interface to be enabled before wireless operation of the transceiver becomes active.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 illustrates a standard packet format.

FIG. 11 illustrates a field description of Reset register.

FIG. 12 illustrates a Location 0 of Status register being set to '1' by the transceiver when transceiver is loaded.

FIG. 13 illustrates a field description of a System status register.

FIG. 14 illustrates a host setting bit location 0 to '1' to clear status register bit location 0.

FIG. 15 illustrates a set bit location 0 of Host Control register to '1' to enable WIHD.

FIG. 16 illustrates bit location 1 is set to '1' by the transceiver when WIHD is enabled.

FIG. 17 illustrates a host must set bit location 1 to '1' to clear status register bit location 1.

FIG. 18 illustrates a transceiver chip information.

FIG. 19 illustrates a host capabilities block of AVC Information Register Bank.

FIG. 20 illustrates a host must set bit location 1 of Host Control register to '1' to set host device capabilities.

FIG. 25 illustrates a device list index to bitfield mapping.

FIG. 26 illustrates an example Device List with three active devices detected.

FIG. 27 illustrates Location 2 is set to '1' by the transceiver when device list is altered.

FIG. 28 illustrates an example device list update based on system of FIG. 26.

FIG. 29 illustrates a host setting bit location 2 to '1' to clear status register bit location 2.

FIG. 30 illustrates a Capability Request stage of discovery process.

FIG. 31 illustrates a payload structure of a Capabilities Request message.

FIG. 32 illustrates a Capabilities Request message.

FIG. 39 illustrates Location 5 being set to '1' by the transceiver after it finishes writing to the RX bank.

FIG. 40 illustrates bit location 5 being set to '1' to clear status register bit location 5.

FIG. 47 illustrates a Connect Request message as it would appear in the TX (0xAC) or RX (0xA8) register bank.

FIG. 48 illustrates bit location 3 being set to '1' to indicate that TX data is ready for the transceiver.

FIG. 49 illustrates Location 4 being set to '1' by the transceiver after it finishes extracting the TX message.

FIG. 50 illustrates bit location 4 being set to '1' to clear status register bit location 4.

FIG. 54 illustrates a Connect Response message as it would appear in the TX(0xAC) or RX(0xA8) register bank.

FIG. 55 illustrates Location 3 being set to '1' by the transceiver after it finishes writing the input format data.

FIG. 56 illustrates bit location 3 being set to '1' to clear status register bit location 3.

FIG. 62 illustrates a Start Stream Notify message as it would appear in the RX(0xA8) register bank.

FIG. 64 is a flow diagram of a wireless transceiver disconnect sequence.

FIG. 65 illustrates a payload structure of a Disconnect Notify message.

FIG. 66 illustrates a Disconnect Notify message as it would appear in the TX(0xAC) or RX(0xA8) register bank.

FIG. 67 illustrates bit location 3 being set to '1' to indicate that TX data is ready for the transceiver.

FIG. 68 illustrates Location 4 being set to '1' by the transceiver after it finishes extracting the TX message.

FIG. 69 illustrates bit location 4 being set to '1' to clear status register bit location 4.

FIG. 70 illustrates Location 5 being set to '1' by the transceiver after it finishes writing to the RX bank.

FIG. 71 illustrates bit location 5 being set to '1' to clear status register bit location 5.

FIG. 77 illustrates a register map of AVC Info Registers (1/4).

FIG. 78 illustrates a register map of AVC Info Registers (2/4).

FIG. 79 illustrates a register map of AVC Info Registers (3/4).

FIG. 80 illustrates a register map of AVC Info Registers (4/4).

FIG. 81 illustrates a bit-description of register 0x06.

FIG. 82 illustrates a bit-description of register 0x07.

FIG. 83 illustrates a bit-description of register 0x22.

FIG. 84 illustrates a Control Register space format.

FIG. 85 illustrates a field description of Reset register.

FIG. 86 illustrates a field description of Power Mode register.

FIG. 87 illustrates a field description of Interface Control register.

FIG. 88 illustrates a field description of Ready register.

FIG. 89 illustrates a field description of Host Control register.

FIG. 90 illustrates a field description of Status register.

FIG. 91 illustrates a field description of Clear register.

FIG. 92 illustrates a field description of System status register.

FIG. 93 illustrates a bit-map layout of Devcap HRRX registers.

FIG. 94 illustrates a bit-map layout of Devcap HRTX registers.

FIG. 95 illustrates a bit-map layout of Device Index registers.

FIG. 96 illustrates a SoC version label resides in the Control register bank (0xA4), offsets 0xF7-0xFB.

FIG. 97 illustrates a bit-description of register 0xF7.

FIG. 98 illustrates System Tick registers residing in the Control register bank (0xA4), offsets 0xFC-0xFF.

FIG. 99 illustrates a register space format of a receiver.

FIG. 100 illustrates a format of sequence field.

FIG. 118 illustrates a Feature Abort message indicating a failure to obtain an HDMI Pass-Through Response.

FIG. 119 illustrates an HDMI Pass-Through Response message.

FIG. 120 illustrates a Feature Abort message indicating a failure to send the HDMI Pass-Through Response.

FIG. 121 illustrates an EDID Request message.

FIG. 122 illustrates a Feature Abort message indicating a failure to obtain an EDID Response.

FIG. 123 illustrates an EDID Response message.

FIG. 124 illustrates a Feature Abort message indicating a failure to send the EDID Response.

FIG. 125 illustrates a Data Island Notify message.

FIG. 126 illustrates a Feature Abort message indicating a failure to send the Data Island Notify.

FIG. 127 illustrates a CEC Notify message.

FIG. 128 illustrates a Feature Abort message indicating a failure to send the CEC Notify.

FIG. 129 illustrates a CEC NAK message.

Figure 130:
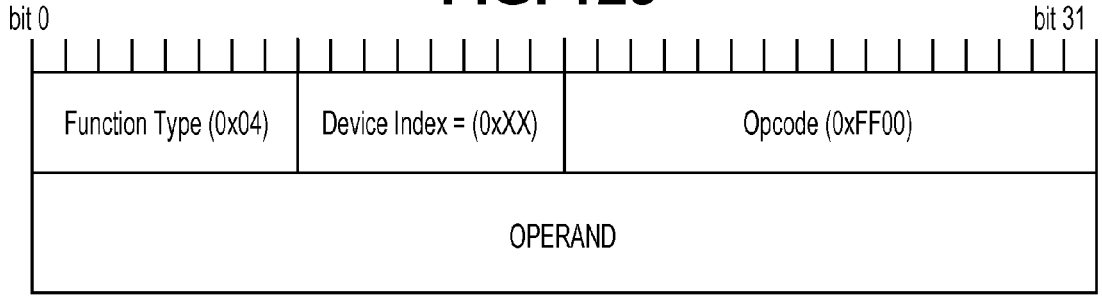

FIG. 130 illustrates a Feature Abort message indicating a failure to send the CEC NAK.

Figure 131:
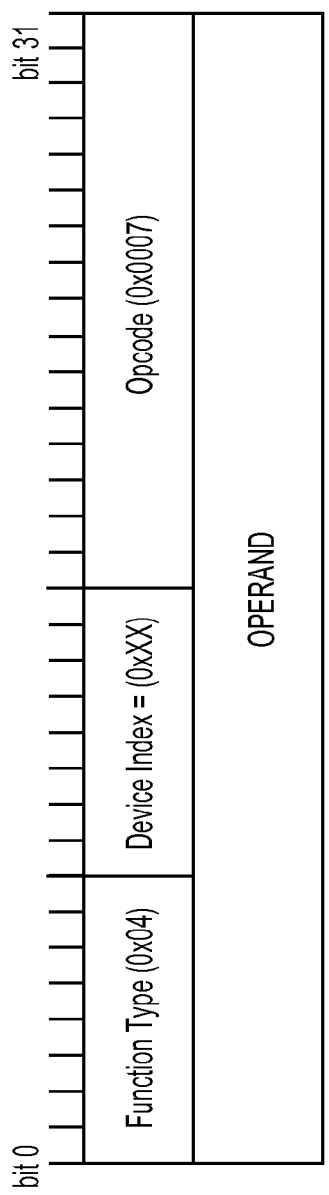

FIG. 131 illustrates a Logical Address Table Notify message.

Figure 132:
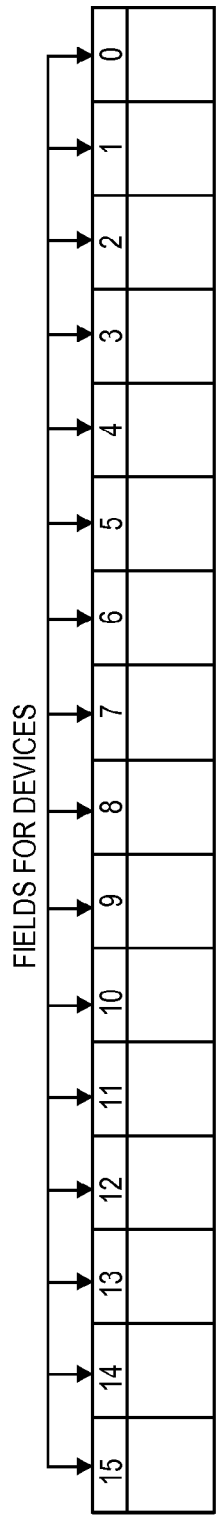

FIG. 132 illustrates definitions of the logical address bitmap.

Figure 133:
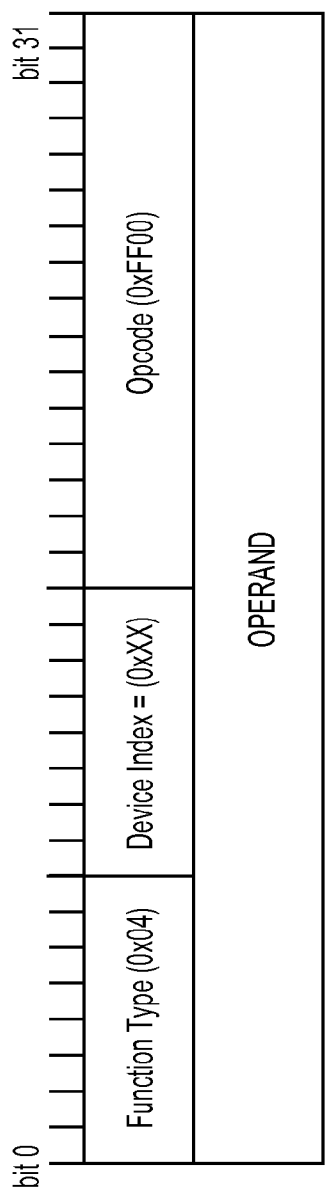
Figure 134:
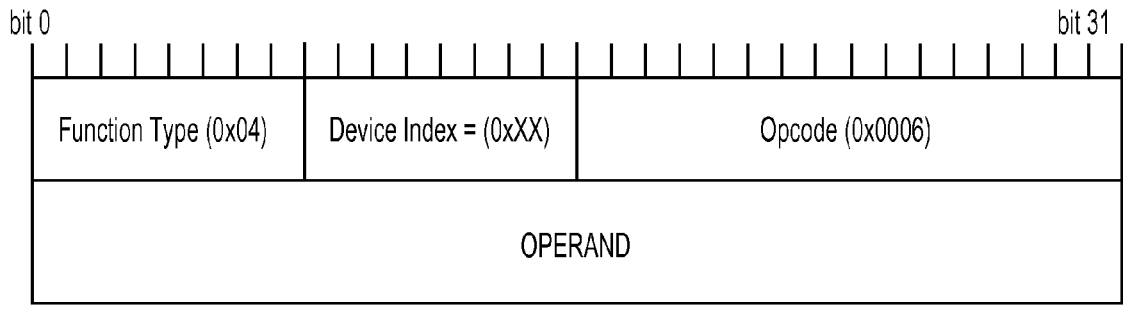

FIG. 133 illustrates a Feature Abort message indicating a failure to send the Logical Address Table Notify FIG. 134 illustrates an HPD Notify message.

Figure 135:
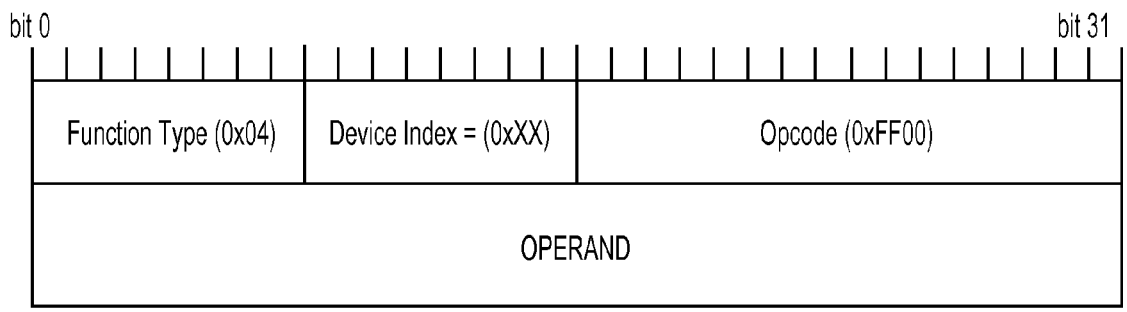

FIG. 135 illustrates a Feature Abort message indicating a failure to send the HPD Notify.

Figure 136:
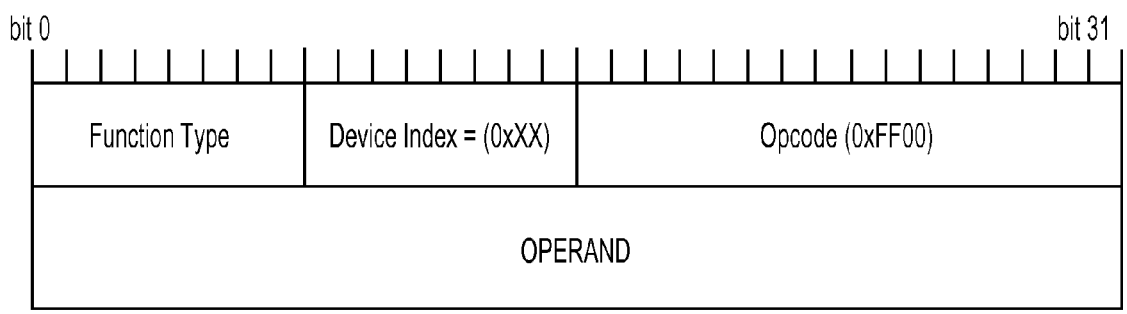

FIG. 136 illustrates a Feature Abort message indicating unrecognized opcode.

Figure 137:
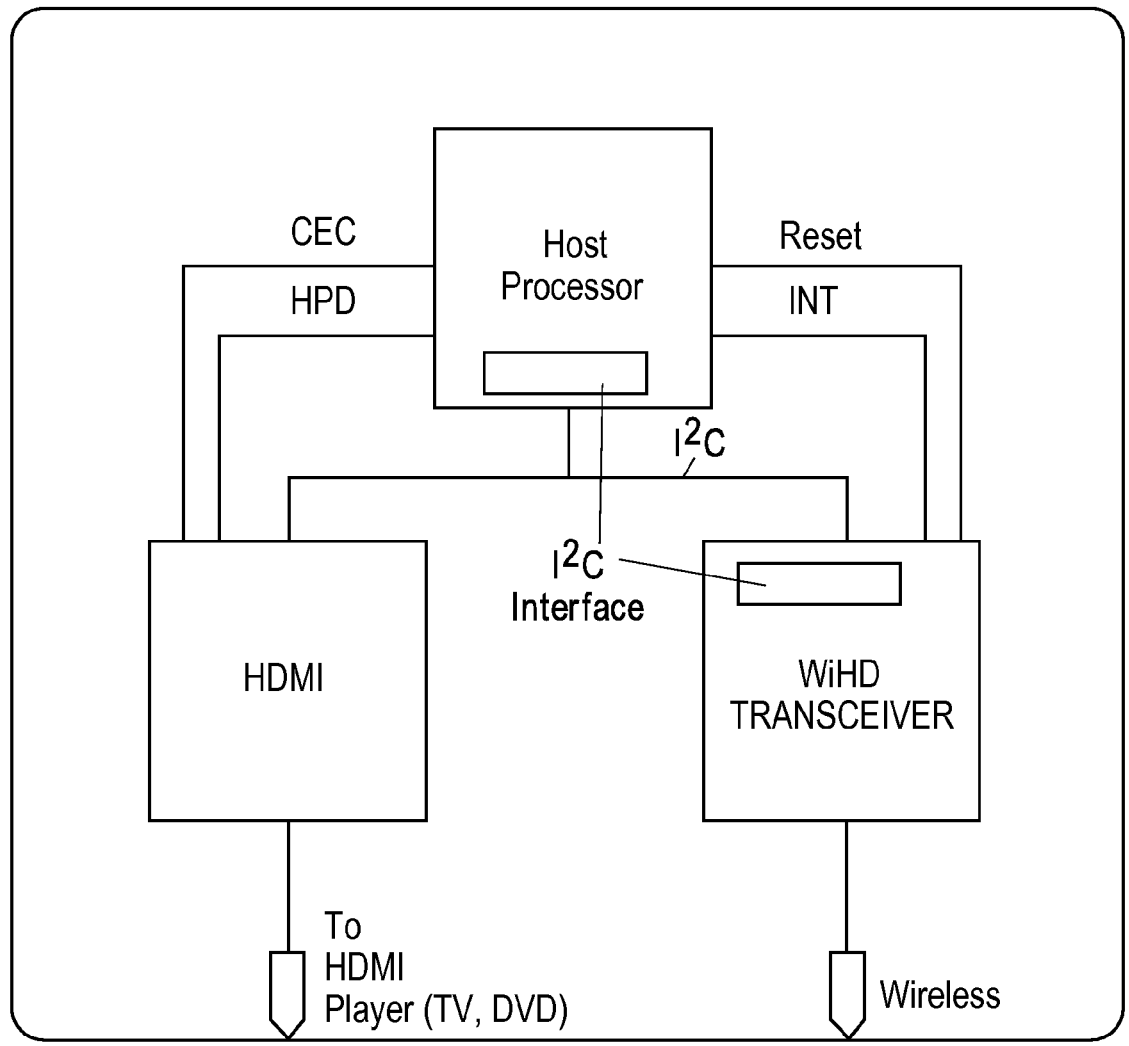

FIG. 137 is a block diagram of one embodiment of a radio chip.

Figure 138:
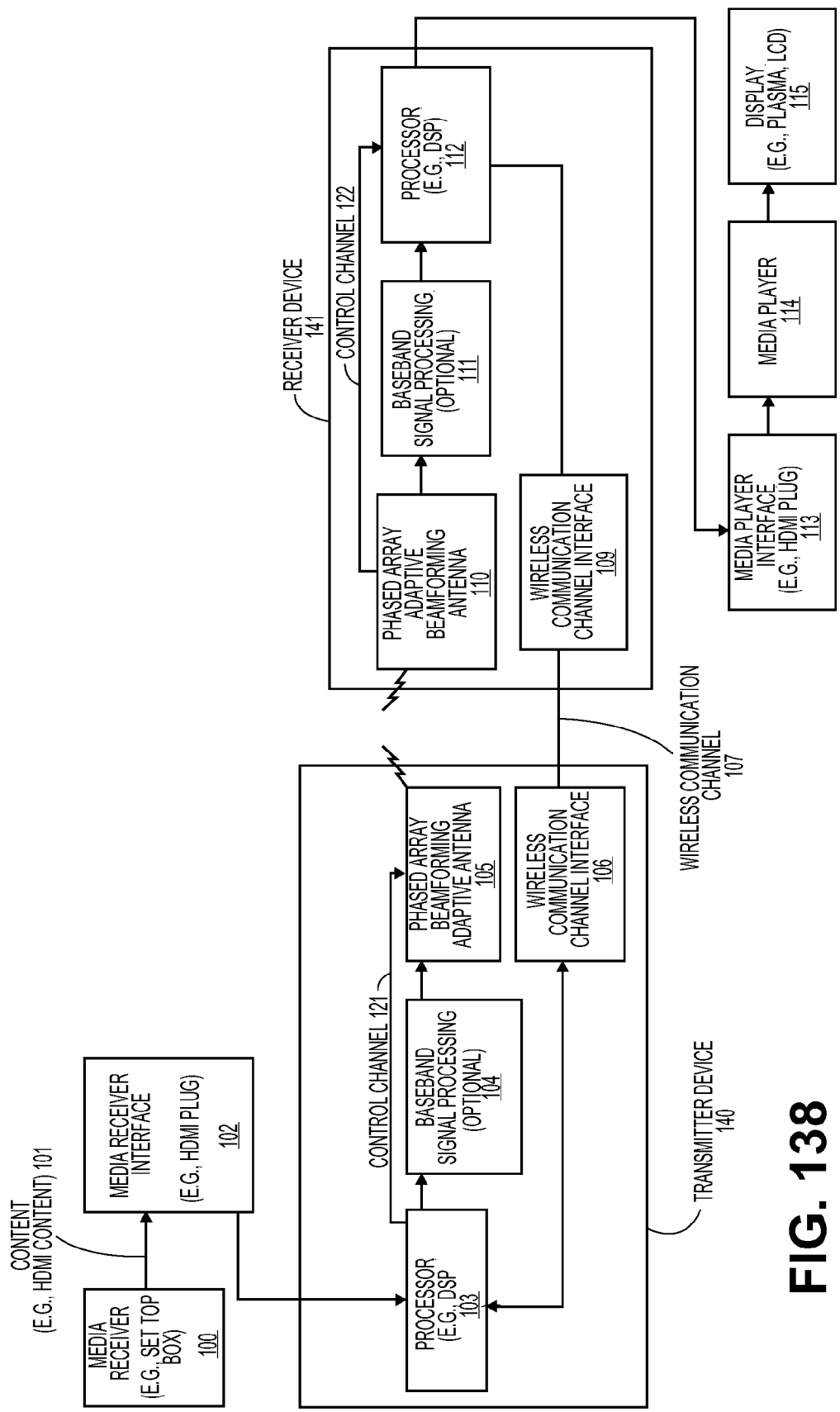

FIG. 138 is a block diagram of one embodiment of a communication system.

Figure 139:
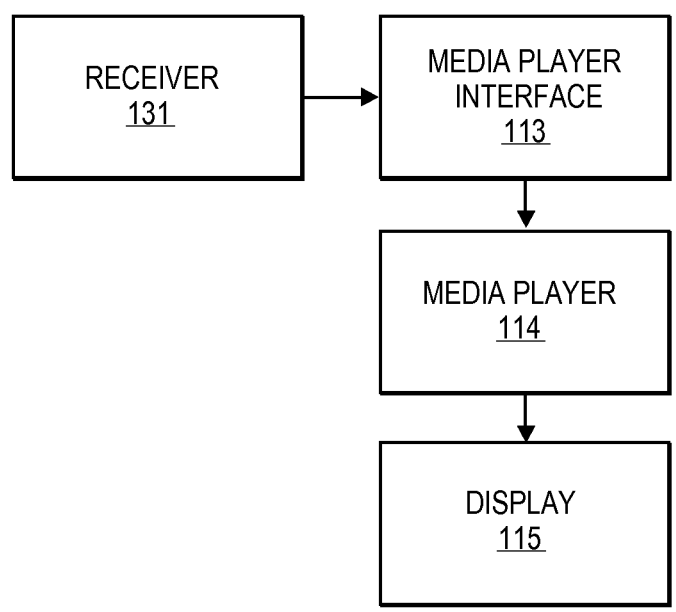

FIG. 139 is a block diagram of one embodiment of a receiver device that is part of a display.

Figure 140:
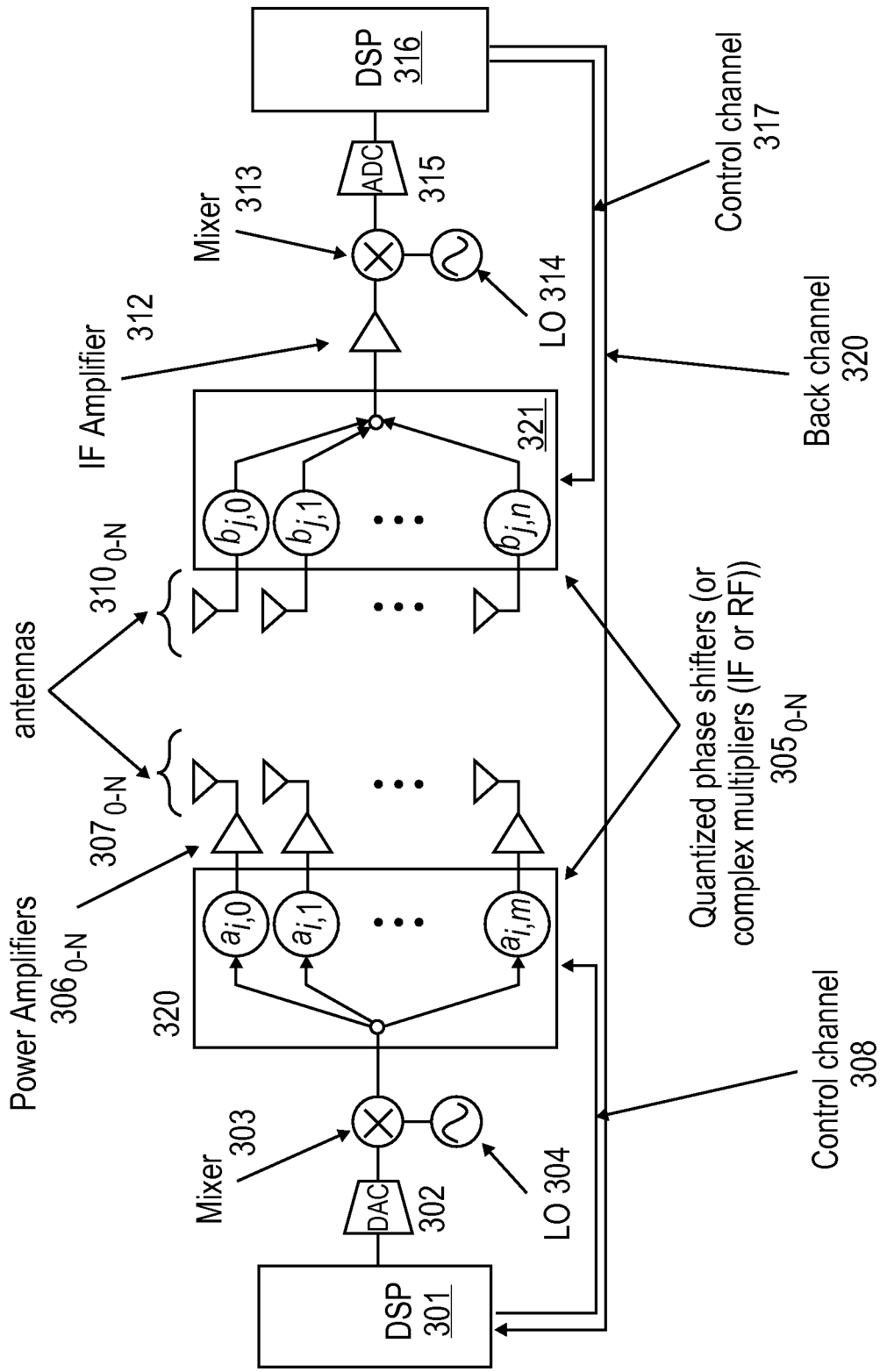

FIG. 140 is a block diagram of one embodiment of a transmitter device and a receiver device that are part of an adaptive beam forming multiple antenna radio system containing of FIG. 138.

Figure 141:
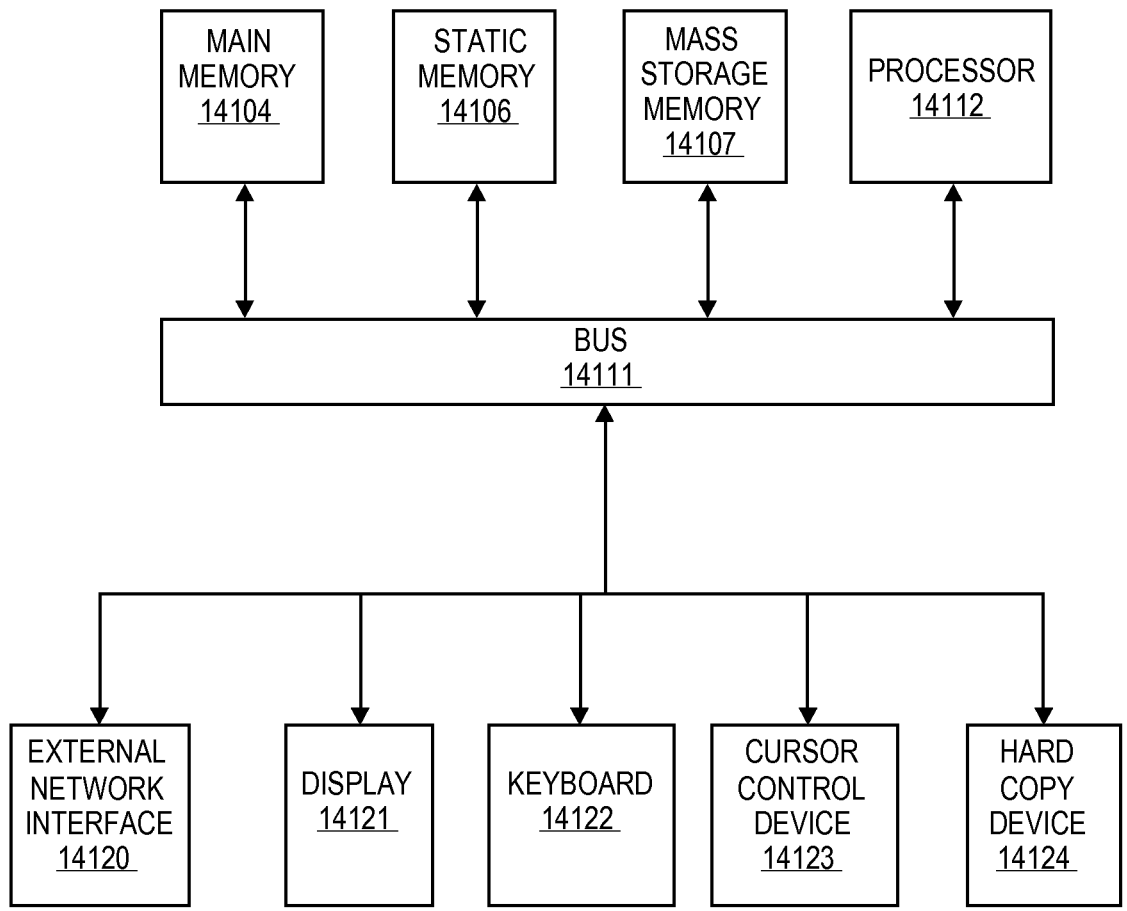

FIG. 141 is a block diagram of a computer system.

Figure 142:
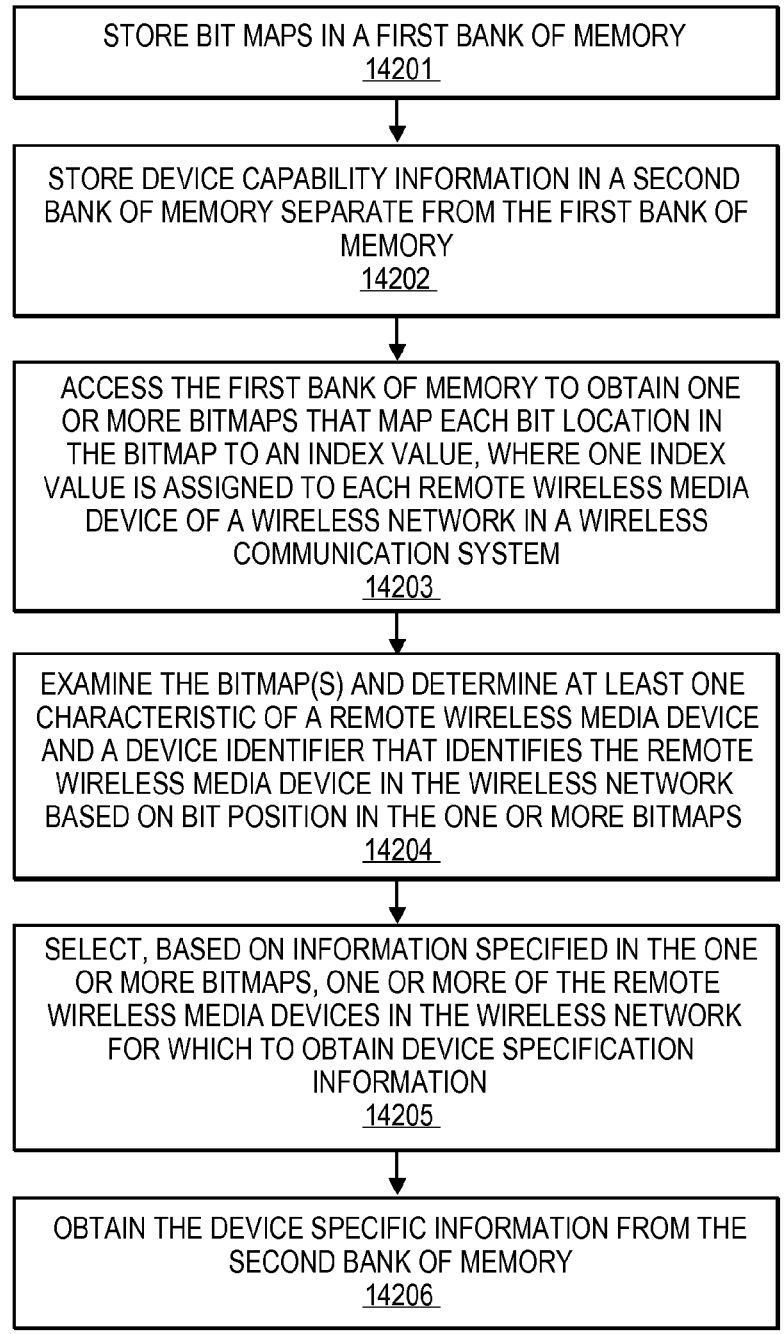

FIG. 142 is a flow diagram of one embodiment of a bitmap device identification process.

Figure 143:
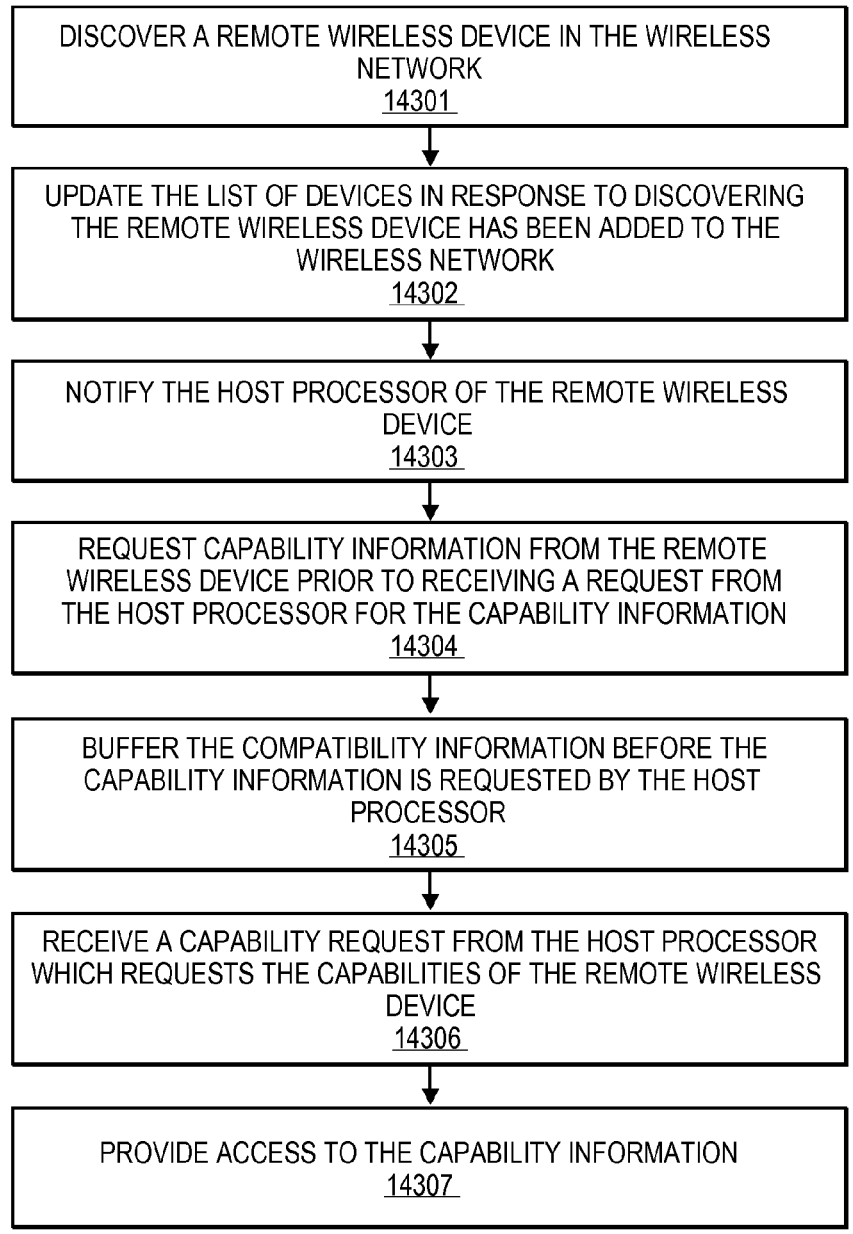

FIG. 143 is a flow diagram of one embodiment of a device discovery process for use in a wireless communication system.

Figure 144:
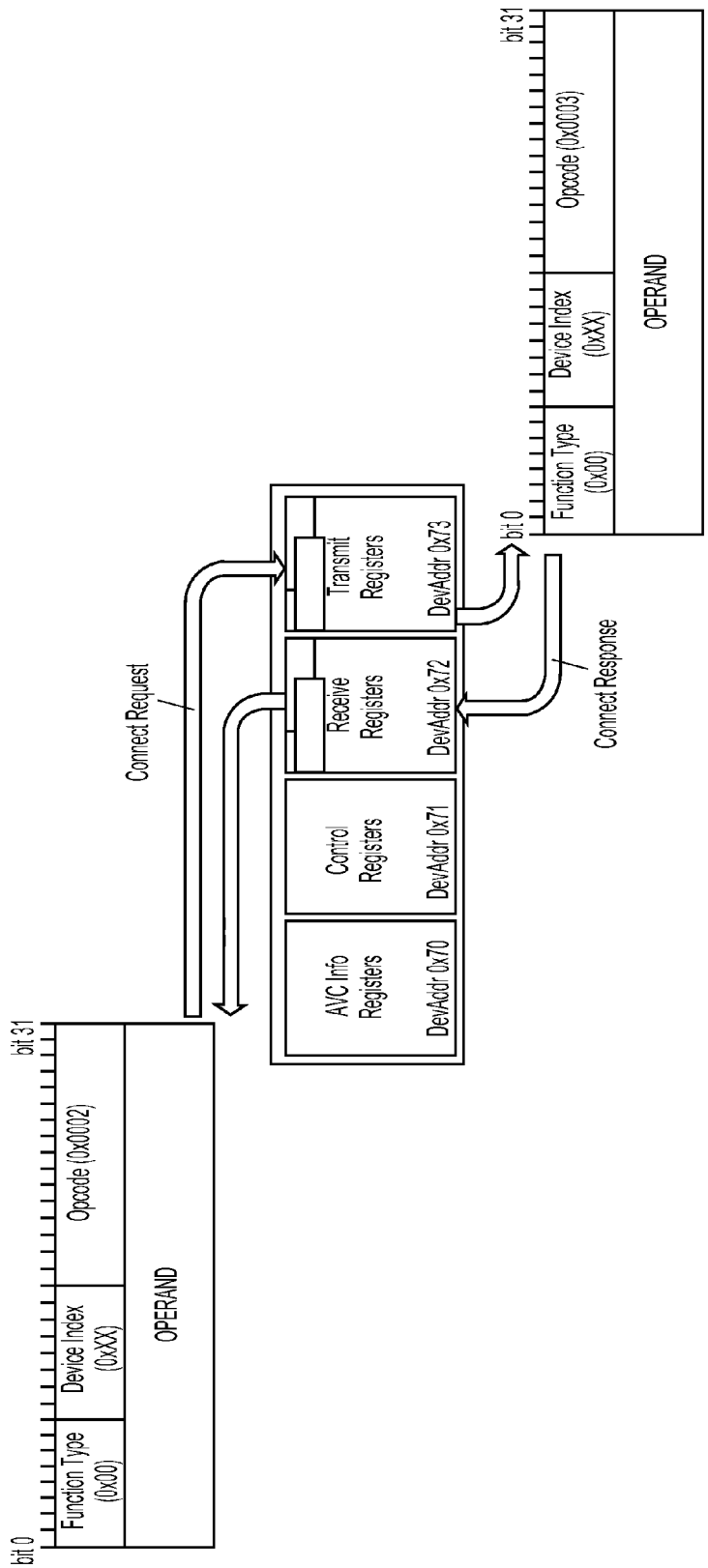

FIG. 144 illustrates a connection control flow through transmit and receive register banks.

Figure 145:
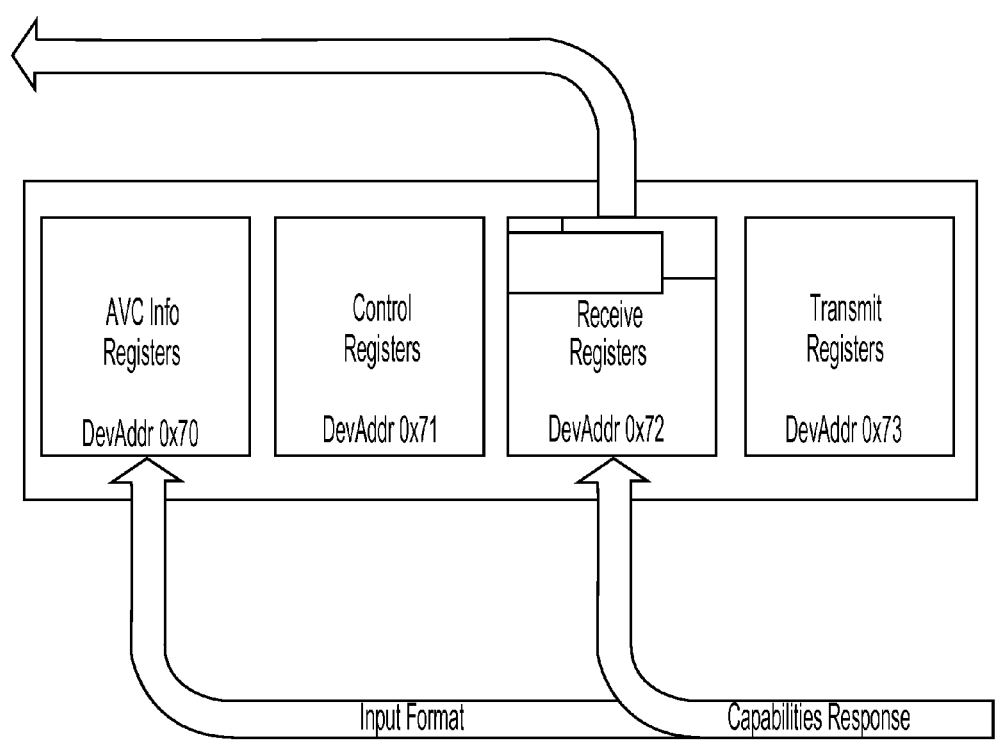

FIG. 145 illustrates a connection control flow through transmit and receive register banks with a separate data exchange through the AVC information register bank.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Methods, physical interface, and protocol of one embodiment of an AVC Host Interface are described. A host controller device to interface with a WirelessHD transceiver in a wireless network is also described.

For purposes herein an Audio/Video Controller (AVC) is an embedded component that interfaces between the host system and a wireless network. Consumer Electronics (CE) refers to a term referring to any of various electronic devices that a typical consumer might own such as a television, DVD player, etc. A Host Audio/Video Controller (Host AVC) is a component on the host system that understands how to communicate with the embedded AVC component. The Host AVC initiates and controls communications on the wireless network. The I²C Protocol, an Inter-Integrated Circuit Protocol, is a multi-master serial bus used to enable low-speed communications between processors or computers.

System Overview

The WirelessHD transceiver transfers high-definition audio-video (AV) content wirelessly between devices. From the host's perspective, there are several control operations that can be affected, including initialization of the transceiver; discovering remote WirelessHD devices on the network; connecting to/disconnecting from a remote WirelessHD device; executing device control commands on a remote WirelessHD device; and interfacing wireless controls and behavior. One embodiment of the interface to a WirelessHD transceiver to achieve the described operations is described herein.

Figure 1:
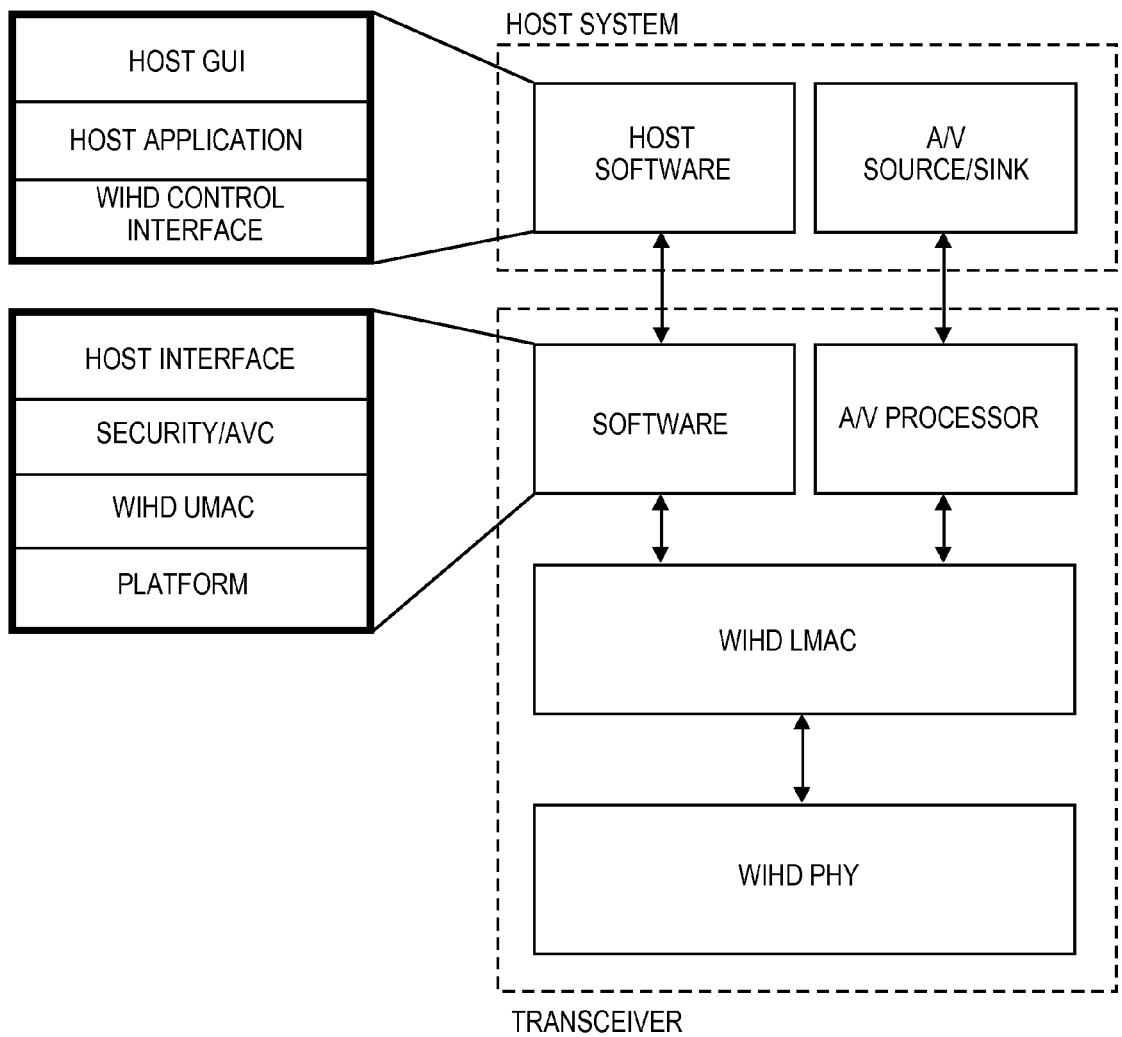
FIG. 1 illustrates a software architecture of host and transceiver.
Figure 2:
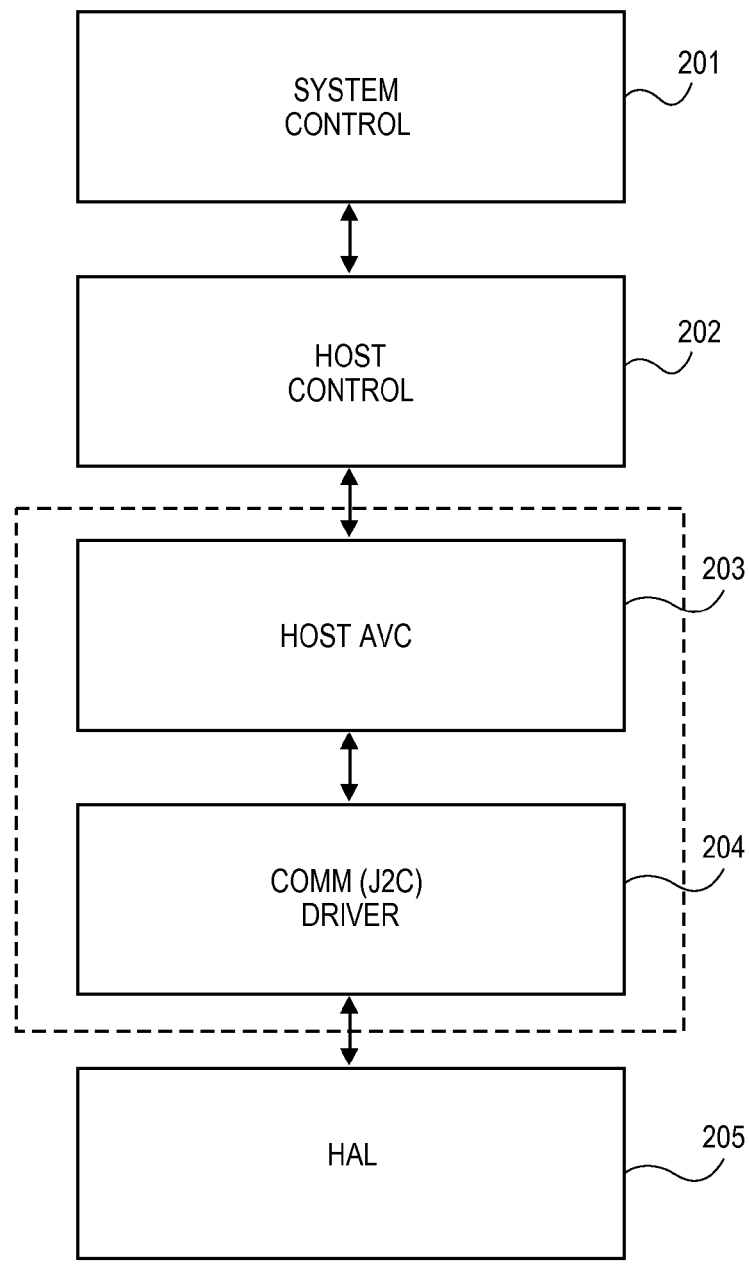
FIG. 2 illustrates a host system protocol stack needed to drive WirelessHD transceiver.

FIG. 1 is a block diagram of one embodiment of the system model. Referring to FIG. 1, the host software represents the host protocol stack that enables the consumer electronics (CE) device to interface with the transceiver. FIG. 2 illustrates one embodiment of a host system protocol stack. Referring to FIG. 2, system control 201 exercises high level system control and interface to the user, serving a similar role as the Application layer of the OSI model. In one embodiment, all wireless specific information is hidden from this layer. Host control 202 serves a similar role as the Presentation and Session layers of the OSI model by managing the state-machine associated with connection/disconnection and control dialogue. Host AVC 203 encapsulates WirelessHD and other specific packet formats and communication sequences in an API library for the layer of host control 202. Communication (comm) driver 204 has the capability to format messages properly and in proper sequence on the bus connecting the host system to the WirelessHD transceiver. Hardware Abstraction Layer (HAL) 205 is the physical driver of the interface. In one embodiment, transceiver uses the standard 8-bit addressing mode described in "The I²C-Bus Specification v.2.1, January 2000 (9398-393-40011)" with the transceiver being the slave device and the host being the master.

FIG. 3 illustrates generic read and writes sequences for I²C. In one embodiment, the generic read and write sequences used for I²C bus are the same protocol as used in HDMI.

Figure 4:
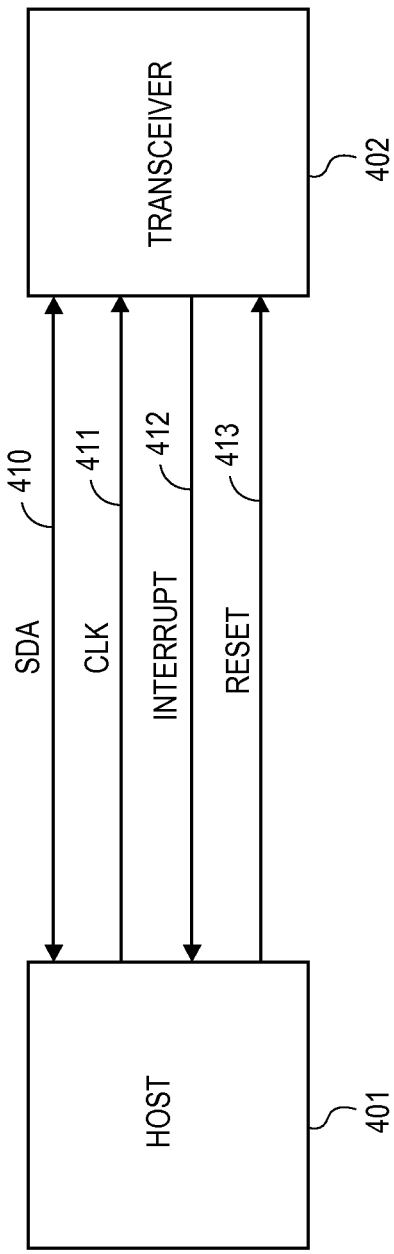
FIG. 4 illustrates a physical interface between host and transceiver.

FIG. 4 illustrates interface between a host and a transceiver. Referring to FIG. 4, host 401 and transceiver 402 are interfaced using 4 bus drivers: SDA 410, clock 411, Interrupt (INT) 412, and Reset 413. SDA 410 and clock 411 represent the two communication pins. Two communication pins 410 and 411, an INT (interrupt) pin 412 and RESET# (reset, active low) pin 413 exist as part of the interface. The RESET# pin 413 is an input into the transceiver that allows the host to force a hardware reset of the transceiver at certain times (e.g., in the event of a serious system failure). The INT pin 412 is an output of the transceiver which is asserted whenever the transceiver needs to notify host 411 of an event. In one embodiment, an event is indicated by a non-zero status of the status register which resides in bank 0xA4, offset 0x05. Optionally, the INT 412 and RESET# 413 functionality is available by polling the status register or reset register directly.

Use of interrupt pin 412 controls the packet interface. The interrupt is incorporated here to eliminate the need of a poll driven architecture and the host.

In one embodiment, this physical interface between the host and the transceiver is HDMI compatible. That is, in one embodiment, the wireless communication system includes an apparatus to communicate with remote wireless devices (e.g., WirelessHD devices) in the wireless network, where the apparatus comprises: a host processor having an I²C interface; a transceiver having an I²C interface; and a physical interface coupling the host processor and the transceiver that includes an I²C bus coupled to the I²C interfaces of both the host processor and the transceiver, and where the host processor maps a message-based communication protocol to a register-based communication protocol of an HDMI controller device to communicate with that device using the I²C bus. Thus, while an HDMI interface is register-based, the host processor that uses a message-based protocol to communicate can interface with the HDMI device over the I²C bus. In one embodiment, the host processor controls the transceiver using the physical interface as an AVC host. In another embodiment, the apparatus includes an HDMI device coupled to the I²C bus, wherein the host processor communicates with both HDMI device and the transceiver as an AVC host using the I²C bus. Note that this I²C bus is not the I²C bus that runs from the HDMI controller to the HDMI player (e.g., DVD player, TV, etc.). This is shown in FIG. 137. Because the HDMI controller interface is used, there is no need for a separate GPIO to be used by the host to communicate to the controller; it can use the same interface it uses to communicate with the transceiver. Thus, for a party at an HDMI device, the host doesn't need to set up a new driver on their host in order to talk to that device. By allowing the WirelessHD controller interface codes using the same bus as the HDMI device, and no extra pins are required to support WIHD controller interface and the host's support of HDMI In one embodiment, actions and communications on the wireless network are initiated by the host system in one of two ways—writing to specific control registers that enable specific action, or by sending packet data through the wireless network. Packet formats and register definitions are described in detail. In one embodiment, the format of packet messages, for the most part, maintains the same packet format described in Section 10 of the WirelessHD specification, "WirelessHD Specification rev.1.0, Dec. 12, 2007" for connection control and device control messages.

Figure 5:
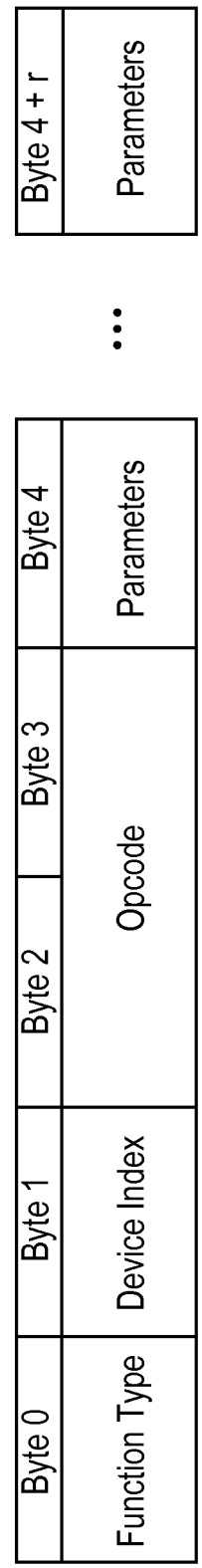
FIG. 5 illustrates a packet format of host AVC messages.

FIG. 5 illustrates one embodiment of the packet format of host AVC messages. Referring to FIG. 5, the packet format includes the following fields:

Function Type (byte 0)—As defined in the WirelessHD specification, this field describes the function of this operation:
  connection control=0x00
  device control=0x01
  content protection=0x03
  HDMI pass-through=0x04
Device Index (byte 1)—The index of the device as provided by the transceiver in the device list. For more information, see section 0.
Opcode (bytes 2 and 3)—The opcode mirrors exactly the definitions outlined in the WirelessHD specification for audio/video control
Parameters (byte 4-byte 4 and 8)—These follow the parameter definition and ordering shown in the WirelessHD specification for audio/video control opcodes.

Figure 6:
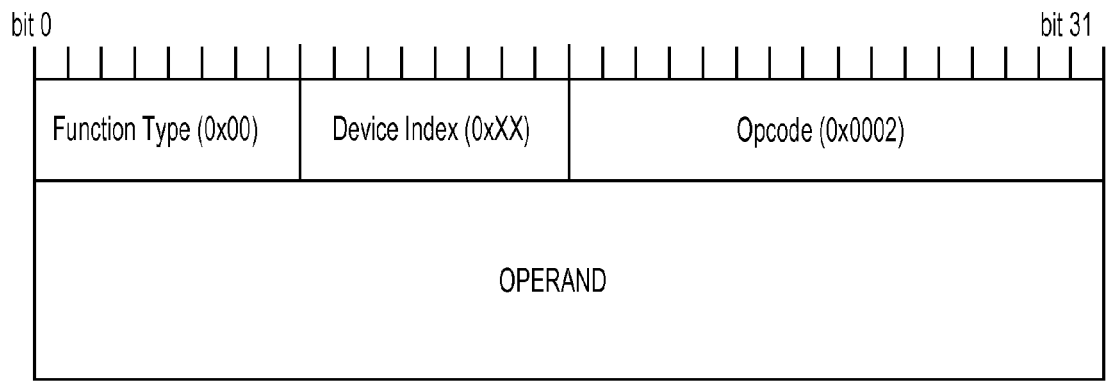
FIG. 6 illustrates an example Connect Request message packet.
Figure 7:
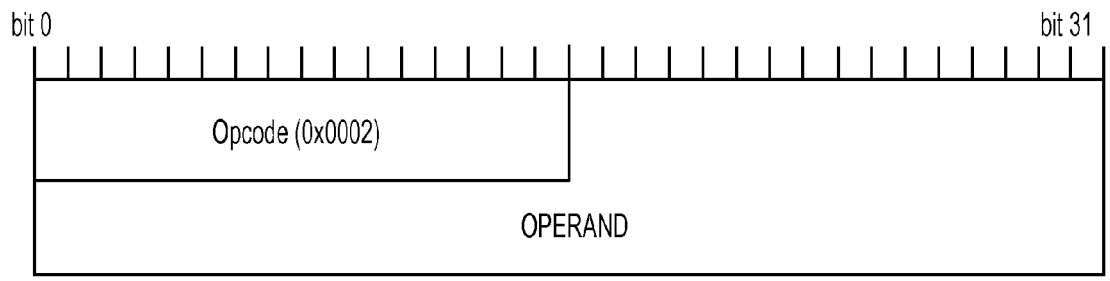
FIG. 7 illustrates a WirelessHD Connect Request format.

Example usages of this packet format are shown herein, but for completeness, a brief example is shown in FIG. 6. FIG. 6 describes the packet format of one embodiment of a Connect Request message from a host system, which sends this message in order to initiate a connection sequence to a remote device. Contrast this format with the WirelessHD format for AVC shown in FIG. 7.

In one embodiment, in the event that a message sent by the host is rejected by the transceiver, a "Feature Abort" message is sent back to the host from the transceiver to indicate that the operation is rejected. A reason for the rejection will also be available in the abort message.

Figure 8:
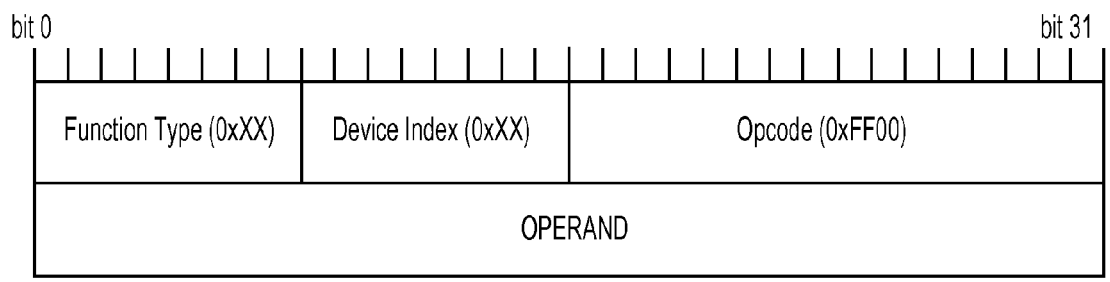
FIG. 8 illustrates a Feature Abort message format.

FIG. 8 illustrates one embodiment of a Feature Abort message format. Referring to FIG. 8, the Feature Abort message format has the following fields:

Function Type—function of the opcode being rejected
Opcode—the Feature Abort opcode is 0xFF00
Device Index—device list index that the host attempted to send a message to, but the transceiver needs to reject.
Rejected Opcode—the value of the rejected opcode
Reason Code—the cause of rejection
  Reserved=0x00 (reason code reserved for Success)
  Unrecognized Opcode=0x01
  Not in correct mode to respond=0x02
  Cannot provide source=0x03
  Invalid operand=0x04
  Refused=0x05
  Timeout=0x06
  Out of Sequence=0x07

Initialization

In one embodiment, the WirelessHD transceiver undergoes an initialization sequence in order to operate properly on the network. The initialization sequence differentiates between the "on" state vs. the "active" state and allows the configuration of the chip as part of the initialization stage. In one embodiment, when the transceiver powers on, the transceiver sends an interrupt to the host indicating that it is on line. The transceiver comes up in the configuration mode where the host can set specific parameters.

Figure 9:
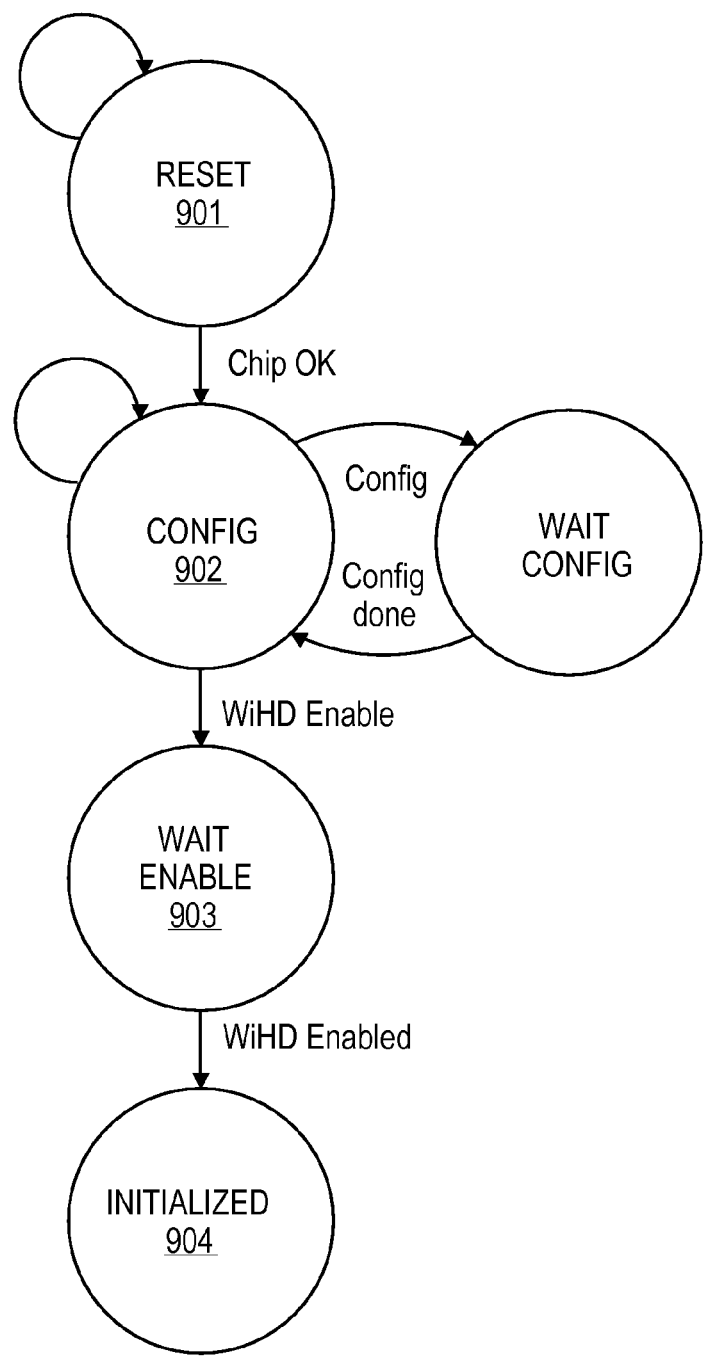
FIG. 9 illustrates a state machine diagram for initialization.

FIG. 9 illustrates the three states involved in one embodiment of the initialization process. These states include reset 901, configuration (config) 902, and wait enable 903. Referring to FIG. 9, the transceiver begins in reset state 901 where the transceivers initializes all internal hardware and software subsystems. Once this completes, the transceiver enters config state 902 where wireless activity is still unavailable, but configuration of the wireless system and debug diagnostics are available via register bank access, which is described in more detail below. After completing any necessary configurations, in one embodiment, the wireless interface is enabled before wireless operation become active. During this time, the transceiver is in wait enable state 903. Once the wireless interface is enabled, the transceiver is initialized (904).

Figure 10:
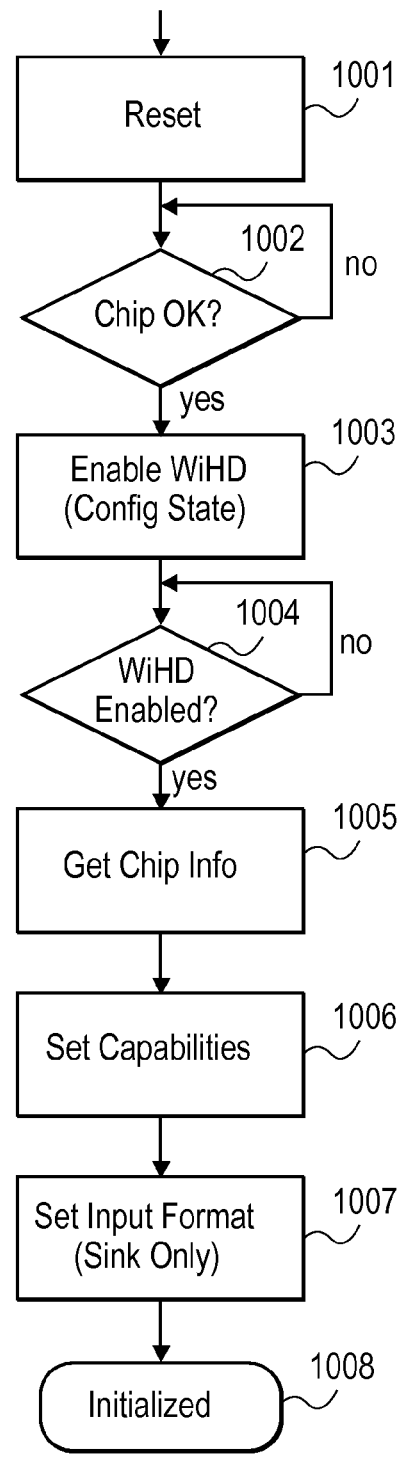
FIG. 10 is a flow diagram of a wireless transceiver initialization sequence.

FIG. 10 is a flow diagram of one embodiment of a wireless transceiver initialization process. The process is performed by processing logic that may comprise hardware (e.g., circuitry, dedicated logic, etc.), software (such as is run on a general purpose computer system or a dedicated machine), or a combination of both.

Reset WIHD (1001)

In one embodiment, there are a number of methods available to reset the transceiver chip. One method to reset the transceiver and all wireless state information is to assert the hardware reset pin.

In one embodiment, if the reset pin is not connected, a reset can be invoked by writing to register bank 0xA4 (FIG. 76B), offset 0x00 (a complete description of the registers is provided below). FIG. 11 illustrates a field description of a reset register. Referring to FIG. 11, in one embodiment, writing 0x01 to register 0x00 of bank 0xA4 (FIG. 76B) will cause a hardware reset to occur. Similarly, writing 0x02 to this register causes a software reset.

Chip OK Status (1002)

After reset 1001, processing logic performs a test to determine if the chip status is ready for use. When the transceiver is reset, none of the registers or banks are available for use until the transceiver completes re-initialization of its own internal states. When the transceiver completes the re-initialization process, the transceiver indicates to the host system that the re-initialization is complete by updating the value of a special control register called the status register. This register resides in bank 0xA4 (FIG. 76B), offset 0x05.

FIG. 12 illustrates Location 0 of Status register being set to '1' by the transceiver when transceiver is loaded As shown in FIG. 12, the least-significant bit (bit 0) will be logic '1' in this read-only register when the transceiver completes its own re-initialization process. Note that the optional hardware interrupt pin (412) will also assert to indicate to the host system that the status register is non-zero. The interrupt pin (412) stays asserted until the host clears all asserted bits of this register. In one embodiment, when the host detects a "CHIP LOAD" event, it should then read the contents of register bank 0xA4 (FIG. 76B), offset 0x07 (the system status register) to monitor whether any system failures occurred.

FIG. 13 is a field description of a System status register. Referring to FIG. 13, if all the bits of the system status register are zero, then all modules in the transceiver have been initialized and are operating normally.

When the host determines that the transceiver status is ok, the host clears the status register. This may be performed by writing a value of 0x01 to the write-only register in bank 0xA4, offset 0x06. As shown in FIG. 14, this action causes the "CHIP LOAD" bit in register 0x05 to clear. In one embodiment, the status register (bank 0xA4, offset 0x05) is a read-only register, and attempting to clear bits on this register by writing directly to offset 0x05 will have no effect.

At this point, the chip is now in a "configuration" state where wireless configurations and settings can be modified. Test and debug diagnostics settings can also be altered at this time. The wireless interface itself, however, is not active yet.

Enable (1003)

After the chip is ok (1002), the physical hardware is now online, but the wireless interface is not active until it is explicitly enabled by the host. In one embodiment, processing logic enables the wireless interface (WIHD) by causing a value of 0x01 to be written to the write-only register in bank 0xA4, offset 0x04 (the host control register). FIG. 15 illustrates bit location 0 of the Host Control register being set to '1' to enable WIHD.

Enabled Status (1004)

In one embodiment, the wireless interface activation is controlled by the host. When activated, set-up routines occur on the transceiver device to initialize and activate the radio. Once the radio is activated, the transceiver will join or initialize a WirelessHD network. At this point, the transceiver is considered to be enabled. The status register in bank 0xA4, offset 0x05 indicates that the wireless interface is available by setting bit 1 to '1'. FIG. 16 illustrates bit location 1 is to be set to '1' by the transceiver when WIHD is enabled.

The host acknowledges this status by clearing the corresponding bit in the clear register. FIG. 17 illustrates bit location 1 that the host sets to '1' to clear status register bit location 1

Get Chip Info (1005)

With the chip enabled, all register banks are now active. In one embodiment, the chip information consists of 3 bytes and is stored in register bank 0xA0, offsets 0x00-0x03. FIG. 18 illustrates the transceiver chip information. Referring to FIG. 18, the device ID is a bit field which will return 0x01, if the transceiver is configured for Sink devices, 0x02, if the transceiver is configured for Source devices, and 0x03 if the transceiver is configured to be either Sink or Source devices. The device revision provides version information of the software revision resident in the transceiver, and the vendor ID reveals the manufacturer of the transceiver.

Set Capabilities (1006)

In order for the transceiver to be visible on the wireless network as an A/V device, the host first communicates its capabilities information to the transceiver. As per the WiHD specification, the transceiver uses the capabilities information provided by the host in order to advertise itself as a node on the WirelessHD network to other host systems. More specifically, according to the WiHD specification on the AVC layer, the transceiver makes its presence known by communicating the capabilities of the host system that it is attached to. As a result, the transceiver cannot advertise itself (and thus, cannot be visible) unless it first receives information from the host describing this information. In one embodiment, the capabilities consist of 29 bytes of information and are stored in register bank 0xA0, offsets 0x04-0x20. FIG. 19 illustrates host capabilities block of AVC information register bank.

After populating the information of the host capabilities registers, the host notifies the transceiver that the information is ready. To achieve this, the host writes a value of 0x02 to the write-only register in bank 0xA4 (FIG. 76B), offset 0x04 (the host control register). Until this action is performed, the transceiver does not parse or use any of the values written to the host capabilities registers. FIG. 20 illustrates bit location 1 of Host Control register that the host sets to '1' to set host device capabilities.

When the host indicates that the host device capabilities fields are ready via the host control register, the transceiver then parses the fields and makes itself visible on the wireless network using the information provided by the host. The transceiver automatically engages in device discovery services and notifies the host asynchronously as remote devices are detected.

Set Input Format (Sink Only—1007)

In one embodiment, sink devices perform one more operations in order to complete the initialization procedure. The sink host provides the input format data to the transceiver, so that it can be made available to remote source devices. In one embodiment, input format data is similar to EDID formatting data which is used in some wired connections, and consists of 222 bytes of information and is stored in register bank 0xA0 (FIG. 76B), offsets 0x21-0xFE as shown in FIG. 77 through 80 described in more detail below.

Figures 21, 22:
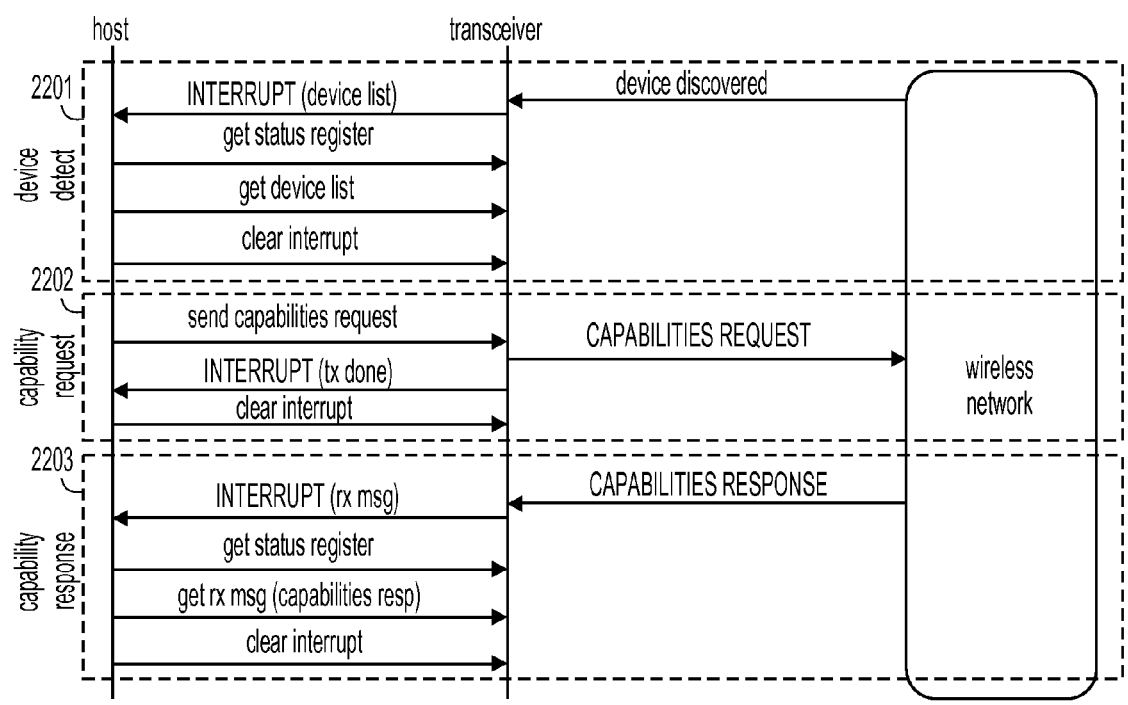
FIG. 21 illustrates bit location 2 being set to '1' to set host input format data.
FIG. 22 illustrates a three stages of the device discovery process.

After populating the information of the input format registers, the host notifies the transceiver that the information is ready. To achieve this, the host writes a value of 0x04 to the write-only register in bank 0xA4 (FIG. 71), offset 0x04 (the host control register). FIG. 21 illustrates bit location 2 that the host sets to '1' to set host input format data. Until this action is performed, the transceiver does not parse or use any of the values written to the input format registers.

When the sink host indicates that the host input format fields are ready via the host control register, the transceiver then parses the fields and makes the information available to any remote device requesting the input format of the sink device. Note that in one embodiment setting the "INPUT FORMAT DONE" bit on a source device has no effect.

Device Discovery

Device discovery is the operation whereby a system can detect remote devices on a WirelessHD network. In one embodiment, there are three stages to the discovery process which are illustrated in FIG. 22. Referring to FIG. 22, the three stages are:

device detect 2201—The transceiver receives the first stimulus to begin the device discovery process. Through the mechanisms provided by WirelessHD (which have not been included to avoid obscuring the invention), the transceiver discovers a remote device and indicates to the host that there is a change in the status of the network.

capability request 2202—The host can then make the determination of whether it needs to request information on a remote device.

capability response 2203—If the host needed to make a capability request, then a response stage is necessary to receive the requested information.

Figure 23:
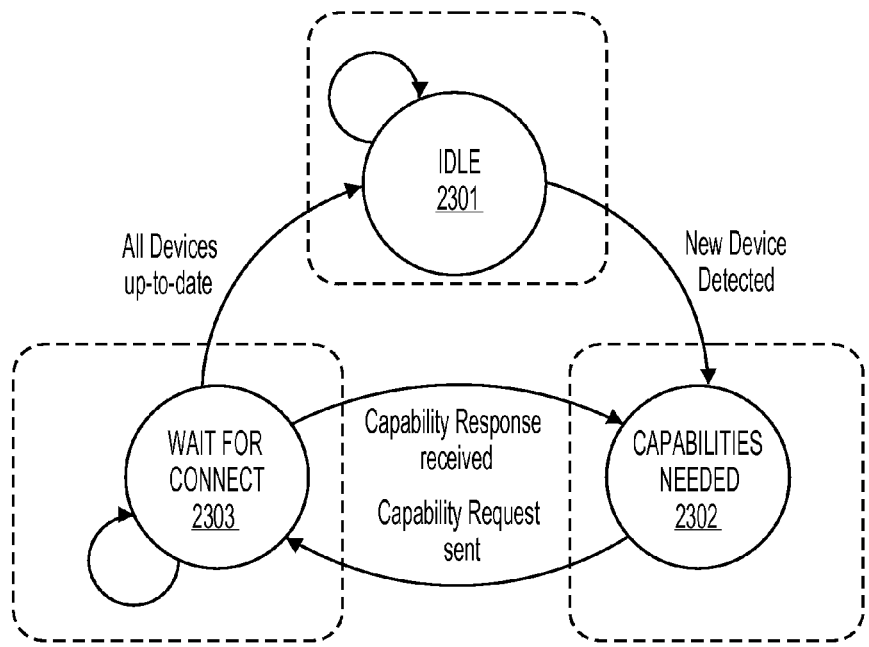
FIG. 23 illustrates a device discovery state-machine.

One embodiment of a corresponding state-machine of the device discovery process is shown in FIG. 23. Referring to FIG. 23, the device discovery state machine begins in the idle state 2301. When a new device is detected, the state machine transitions from 2301 to capabilities needed state 2302. When at the capabilities needed state 2302, a capabilities request is sent, at which time a state machine transitions to wait for connect state 2303. It remains in this state until the transitions back to the capabilities needed state 2302 with a capabilities response when a capabilities response is received or to idle state 2301 when all devices are up to date. The state machine remains in idle state 2301 until a new device is detected. At any point in the device discovery process, if the transceiver detects a failure, the transceiver indicates this to the host by issuing a "Feature Abort" command (opcode 0xFF00) to the host with an appropriate reason code. If the host receives a "Feature Abort" for a particular device, the host returns the state variables back to the "IDLE" state for that device.

Note that in one embodiment, a "Capabilities Request" is not issued from the transceiver to the host. It is unnecessary for the transceiver to request capabilities from the host because this information was already communicated to the transceiver during the initialization phase as discussed herein. For this reason, when a remote device requests capabilities, the transceiver responds without involving the host system. The following discussion describes each of the stages of the device discovery process in greater detail.

Device Detect

Figure 24:
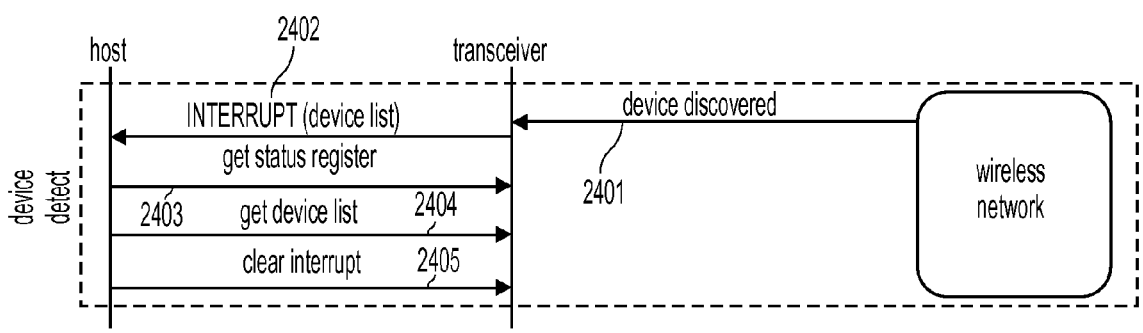
FIG. 24 illustrates a Device Detect stage of discovery process.

FIG. 24 illustrates one embodiment of a device detect stage of the discovery process. The transceiver receives the first stimulus to begin the device discovery process. Through the mechanisms enabled by WirelessHD, the transceiver discovers remote devices in the wireless network 2400 in real-time (2401). After the transceiver discovers a remote devices in the wireless network, transceiver sends an interrupt 2402 to the host. This interrupt includes a device list. The interrupt may comprise interrupt 412 of FIG. 4. After receiving the interrupt 2402, the host reads the device list directly from the transceiver's I²C register bank. When the device detection process is complete, the host sends a clear interrupt 2405 to the transceiver. As each new device is detected or existing devices leave the network, the transceiver notifies the host through an indexed bitmap table resident in the control register space. One embodiment of the detect process flow is as follows:

New Device Detected

When the transceiver detects a new WirelessHD device, the transceiver assigns an index value to that device and then makes this information available to the host via the control register bank 0xA4, offsets 0x08-0x1F. These 24 registers operate as 3 64-bit bitfields with each bit location representing an index value. FIG. 25 illustrates one embodiment of device list index to bitfield mapping.

In one embodiment, Registers 0x08 through 0x0F indicate which device indices are HRRX capable; and registers 0x10-0x17 indicate which device indices are HRTX capable. Registers 0x18-0x1F indicate all devices without filtering on HRRX or HRTX capability. Note that it is possible for a single device to be both HRRX capable and HRTX capable just as it is possible for a single device to be neither HRRX capable nor HRTX capable. FIG. 26 shows an example device list with three active devices detected. Referring to FIG. 26, the table indicates that there are 3 discovered devices in the wireless network at indices 0x02, 0x03, and 0x2C. Device index 0x02 is HRRX capable only, device 0x03 is simultaneously HRRX capable and HRTX capable, and device 0x2C is both HRRX and HRTX capable. In one embodiment, these register locations are read-only to the host system.

Thus the system uses bitmap device identification in a wireless HD network. In FIG. 25, 64 devices can be included in a wireless HD network. In a wireless HD network in prior art wireless HD networks, capabilities requests would have to be sent when discovering a new device to get the capability response obtained. To handle 64 different devices it would take extra bandwidth and force a lot of extra work when a single or new or subset of the 64 devices have been added to the network. The array in FIG. 25 makes it possible to know the characteristics and device idea remote devices based on good position memory. The network stairs can be immediately known without needing to query capabilities of all possible device IDs. The position in the array indicates what the device does (sink, transmitter, position also allows to know what the id of the device is as the bitmap location is its ID. The array of FIG. 25 is stored in the bank of the I²C. When the system wants to notify the host that there is at least one new device that has been discovered or detected, the transceiver sends an interrupt to the host which prompts the host to read the 64 bits and parks that information. The host is only interested in connecting to transmitter devices, and quickly scans the array to determine which those are by the position of the array and then sends capabilities requests to get the information.

In one embodiment, whenever the transceiver updates the device list, the transceiver also simultaneously asserts the interrupt pin (412 of FIG. 4) of the transceiver chip (2402 of FIG. 24) and updates bit 0x02 of the status control register which resides in register bank 0xA4 (FIG. 76B), offset 0x05. FIG. 27 illustrates location 2 being set to '1' by the transceiver when device list altered. Recall, that an action that requires the attention of the host system asserts the interrupt pin (412) and updates control register 0x05. In another embodiment, whenever the transceiver updates the device list, the transceiver also asserts the interrupt pin (412 of FIG. 4) of the transceiver chip (2402 of FIG. 24) substantially at the same time and updates bit 0x02 of the status control register which resides in register bank 0xA4 (FIG. 76B), offset 0x05.

Host Retrieval of New Device List

When the host detects a device list change, either by polling the status register shown in FIG. 27 or waiting for the INT pin to assert and then reading the status register, the host needs to determine which devices are new. This determination is largely dependent on the constraints of the host system. In one embodiment, there are two methods in which the device list determination can be accomplished.

One approach is for the host to renew the device list information each time a device list change is indicated. Specifically, when the "DEVCAP RXD" bit is set as shown in FIG. 27, the host can request device capabilities for all active indices every time. So, in the example device list of FIG. 26, the host would assume indices 0x02, 0x03, and 0x2C are new devices and request capabilities for all these devices. This approach is inherently inefficient, since the next time a device list update occurs, it will repeat capability requests to devices it already knew about. For example, if the example system of FIG. 26 received another device list update with the data shown in FIG. 28 (an example device list update based on the system of FIG. 26), the method described above would request capabilities of indices 0x02, 0x03, 0x06, and 0x2C. This is valid, but inefficient since the host already had the information for devices 0x02, 0x03, and 0x2C from the previous device list update notification.

An alternate approach is for the host to store its own local copy of the 64-bit device list. On each subsequent device list update, the host can filter out device indices that it already has capabilities information for by comparing it against its own local copy. For example, the example of FIG. 26 would result in device capabilities being requested of index 0x02, 0x03, and 0x2C. When the next device list update occurs and the host retrieves the device list shown in FIG. 28, it would recognize that the only new device added is index 0x06 and that capabilities do not need to be re-requested for the others.

To further enhance processing efficiency, both 64-bit tables do not need to be read if the host is only concerned about HRRX devices or only HRTX devices. In this case, the host may process only the bit table of interest and ignore the other table.

FIG. 142 illustrates one embodiment of the bitmap device identification. The process is performed by processing logic that may comprise hardware (circuitry, dedicated logic, etc.), software (such as is run on a general purpose computer system or a dedicated machine), or a combination of both.

Referring to FIG. 142, the process begins by processing logic storing the one or more bit maps in a first bank of memory (processing block 14201) and processing logic storing device capability information in a second bank of memory separate from the first bank of memory (processing block 14202). In one embodiment, one or more bitmaps are stored as 24 registers that operate as 3 64-bit bitfields. In one embodiment, the access of these memory banks is through an I²C bus.

Subsequently, processing logic accesses the first bank of memory to obtain one or more bitmaps that map each bit location in the bitmap to an index value, where one index value is assigned to each remote wireless media device of a wireless network in a wireless communication system (processing block 14203).

Next, processing logic examines the bitmap(s) and determines at least one characteristic of a remote wireless media device and a device identifier that identifies the remote wireless media device in the wireless network based on bit position in the one or more bitmaps (processing block 14204).

Using the information obtained from the bitmap(s) based on bit position therein, processing logic selects, based on information specified in the one or more bitmaps, one or more of the remote wireless media devices in the wireless network for which to obtain device specific information (processing block 14205) and obtains the device specific information from the second bank of memory (processing block 14206). In one embodiment, the processing logic selects, based on information specified in the one or more bitmaps, the one or more of the remote wireless media devices by comparing the one or more bitmaps with a previously received and stored version of the one or more bitmaps to identify which bit locations in the one or more bitmaps are different, and filtering out, based on results of comparing the one or more bitmaps to the previously received and stored version, device indices for which device specific information has already been obtained. In one embodiment, the device specific information comprises device capabilities information.

In one embodiment, a first portion of the one or more bit maps is reserved for a first type of remote wireless device (e.g., a HRRX-capable only device) and a second portion of the one or more bit maps, different than the first portion, is reserved for a second type of remote wireless device (e.g., a HRTX-capable only device), where the first and second types of remote wireless device are different. In another embodiment, a third type of remote wireless device (e.g., a both HRRX-capable and HRTX-capable device) has a characteristic of both the first and second type of remote wireless device and has a device identifier in both the first and second portions of the one or more bit maps. In a fourth embodiment, a fourth type of remote wireless device (e.g., a neither HRRX-capable nor HRTX-capable device) has a characteristic of neither the first nor second type of remote wireless device and has a device identifier only in the third portions of the one or more bit maps.

Confirm Receipt of Device List

The last step of the device detection stage is for the host to confirm that the device list information has been read. In one embodiment, the transceiver will not update the device list again until the host confirms the receipt of the existing list. Stated another way, the transceiver will not notify the host of new device list changes, if previous device list changes are not acknowledged.

To acknowledge the receipt of a device list update, the host clears the "DEVCAP RXD" flag of the status register (register bank 0xA4, offset 0x05) after reading the device list, and applicable supplemental information. To clear the "DEVCAP RXD" flag, the host writes the value 0x04 to register bank 0xA4, offset 0x06 (the status clear register). FIG. 29 illustrates the host setting bit location 2 to '1' to clear status register bit location 2.

Note that in one embodiment actions mentioned above in device detection stage should be performed prior to clearing the "DEVCAP RXD" bit. While the bit is set, the transceiver freezes the contents of the device list registers. After the bit is cleared, the transceiver may alter the data in the device list registers and it can no longer be assumed to reflect the state of the network (until the next time the transceiver asserts the "DEVCAP RXD" bit).

Capability Request

After completing the Device Detect stage, the host will have determined whether there are any new devices discovered on the wireless network. For each new device, the host can choose to send a capabilities request message to obtain additional information about that remote device. FIG. 30 illustrates one embodiment of the capabilities request stage of discovery process. Referring to FIG. 30, when performing the capabilities request, the host sends the capabilities request 3001 to the transceiver. In response to receiving the capabilities request 3001 from the host, the transceiver sends the capabilities request 3002 to the wireless network. After sending the capabilities request 3002, the transceiver sends an interrupt 3003 to the host indicating that the transmission has been completed, and thereafter, the host sends a clear interrupt 3004 to the transceiver to complete the capabilities stage of the discovery process.

In one embodiment, a capabilities request is made by utilizing the TX packet register bank 0xAC. The appropriate payload follows the format described in FIG. 5. So, for the capabilities request, the host constructs a payload message adhering to the structure depicted in FIG. 31. The definition of each field is consistent with the definition listed in the WirelessHD specification for the corresponding message. The only field that is unique is the "Device Index" field which corresponds to the index described in the device detect process.

FIG. 32 illustrates the capabilities request message as it would appear in register bank 0xAC (the I²C register bank). The portions of the register data that contain I²C header information are the first three rows, whereas the actual payload is the remainder.

The capabilities request message includes a bus identifier (bus ID) that identifies the wireless device (e.g., WirelessHD device) in the wireless network. Packets are encapsulated with the bus ID and with the payload being the actual message. The use of the bus ID in FIG. 31 provides the ability to read at the same memory region for multiple purpose/applications (e.g., there are different application or models that want to talk to disparate applications for different purposes). That is, the use of the bus ID allows for dispatch capability using the single physical interface that is between the host and the transceiver device and the same location in memory can be used at different times to store data for multiple wireless devices. Thus, the bus ID allows for packeting interface to be used in a memory protocol.

Figures 33, 34, 35, 36:
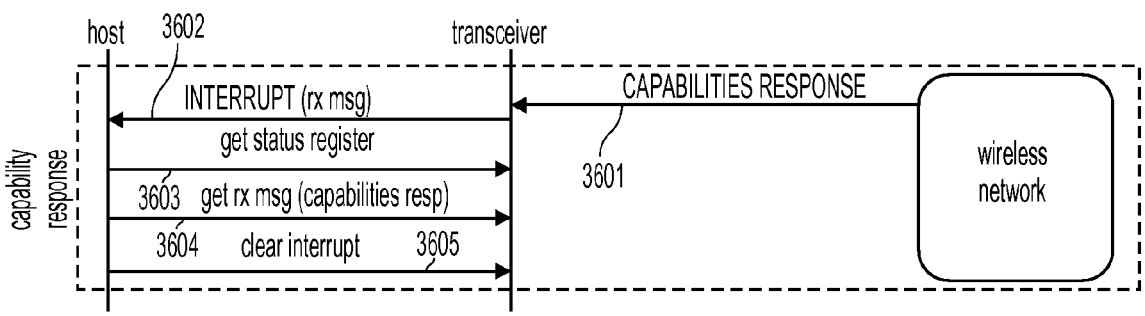
FIG. 33 illustrates bit location being set 3 to '1' to indicate that TX data is ready for the transceiver.
FIG. 34 illustrates Location 4 being set to '1' by the transceiver after it finishes extracting the TX message.
FIG. 35 illustrates bit location 4 being set to '1' to clear status register bit location 4.
FIG. 36 illustrates a Capability Response stage of discovery process.

Once the Capabilities Request message is written to the transmit register bank 0xAC, the transceiver is notified that a message is ready. This is accomplished by writing a value of 0x08 to control register bank 0xA4, offset 0x04. FIG. 33 illustrates the host setting bit location 3 to '1' to indicate that TX data is ready for the transceiver.

When the "TX READY" flag is asserted, the transceiver extracts the capabilities request from the register region. The transceiver then simultaneously asserts INTERRUPT pin 412 and the "TX DONE" status flag of register bank 0xA4, offset 0x05. FIG. 34 illustrates location 4 is set to '1' by the transceiver after it finishes extracting the TX message. Until the transceiver indicates status of "TX DONE", the register contents of bank 0xAC (the transmit bank) should remain unchanged.

To acknowledge receipt of the "TX DONE" flag and to clear INTERRUPT pin 412, the host writes a value of 0x10 to register bank 0xA4, offset 0x06 (the status clear register). FIG. 35 illustrates the setting bit location 4 to '1' to clear status register bit location 4.

In the Device Detection example of FIG. 26, the capabilities request process would need to be performed three times, once for each device index (i.e.—0x02, 0x03, 0x2C).

In one embodiment, the host should clear status flags promptly. Until the host clears a particular status flag, the transceiver cannot assume that the host is aware of the status change.

Capability Response

FIG. 36 illustrates one embodiment of capability response stage of discovery process. Referring to FIG. 36, the capabilities response stage of the discovery process begins with the transceiver receiving capabilities response 3601 from the wireless network. In response, the transceiver generates an interrupt 3602 (e.g., interrupt 412) to notify the host. Thereafter, the host reads the status register to determine the cause of interrupt 3603 and subsequently reads the receive message 3604 corresponding to the capabilities response. Thereafter, the host sends a clear interrupt signal 3605 to the transceiver to clear the interrupt and complete the capability response stage of the discovery process. When the transceiver receives a capabilities request from the host, the transceiver will obtain the requested information from the remote device. Once the transceiver gets the information from the network, it formulates an RX message in register bank 0xA8 consistent with the definition listed in FIG. 5. So, for the Capabilities Response, the transceiver constructs a payload message adhering to the structure depicted in FIG. 37. The definition of each field is consistent with the definition listed in the WirelessHD specification for the corresponding message. The only field that is unique is the "Device Index" field which corresponds to the index described in the device detect process of section 0.

Figures 37, 38:
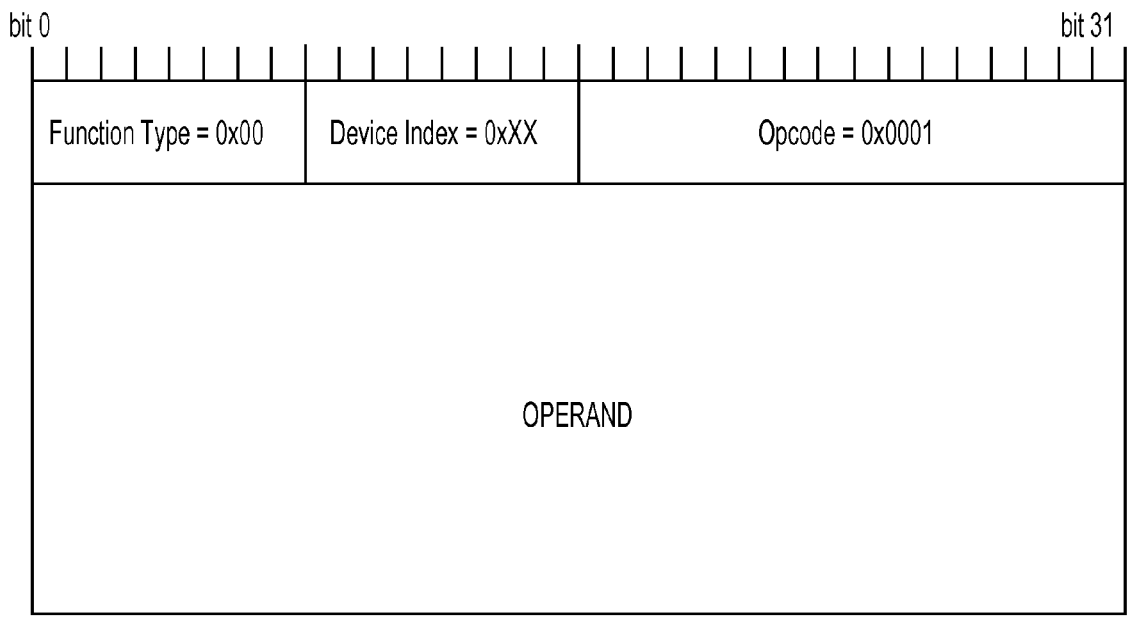
FIG. 37 illustrates a payload structure of a Capabilities Response message.
FIG. 38 illustrates a Capabilities Response message as it would appear in register bank 0xA8.

The properly formatted message as it would appear in the I²C register bank (bank 0xA8) is shown in FIG. 38. The portions of the register data that contain I²C header information are in the first three rows and the last row, whereas the actual payload is the remainder.

Note that, in one embodiment, using the properly formatted messages, the single physical interface between the host processor and the transceiver (as shown in FIG. 4) provides for dispatch capability. That is, the host processor and the transceiver use the single physical interface to gain access to a memory (e.g., 4 banks of memory) that is reusable by the host processor and the transceiver to exchange data, particularly with respect to remote wireless devices (e.g., WirelessHD devices). The memory is reusable in that regardless of the application involved, data that is stored in the memory corresponding to one of the remote wireless devices is identified with the use of two identifiers (e.g., BusID and Device Index) that identifies the function of the message and the remote wireless device. Thus, the memory is not assigned to a particular message format or remote device. Information can be moved into the memory as long as the function (and hence, structure of the message packet) and wireless device index is identified. The host processor can notify the transceiver that data is available for it in memory using one of two options. As one option, the host processor can use the interrupt signal. The second option is to periodically poll the status register (Bank 0xA4, offset 0x05). All stimulus which would cause the interrupt signal to assert also corresponds to a bit getting set in the status register, as discussed in the paragraph below.

Once the Capabilities Response message is written to the receive register bank 0xA8, the transceiver notifies the host that the message is ready by simultaneously asserting interrupt pin 412 and the "RX READY" status flag of register bank 0xA4, offset 0x05. Note that a "Capabilities Response" never needs to be generated by a host system (only received) since the transceiver can automatically issue a "Capabilities Response" to remote devices from the information provided by the host during the initialization phase. FIG. 39 illustrates Location 5 being set to '1' by the transceiver after it finishes writing to the RX bank.

To acknowledge receipt of the "RX READY" flag and to clear the INTERRUPT pin, the host writes a value of 0x20 to register bank 0xA4, offset 0x06 (the status clear register). FIG. 40 illustrates the host setting bit location 5 to '1' to clear status register bit location 5.

Note that the contents of the receive register bank (0xA8) should be read prior to clearing the "RX READY" bit. While the bit is set, the transceiver freezes the contents of the receive register bank. After the bit is cleared, the transceiver may alter the data in the receive registers.

FIG. 143 is a flow diagram of one embodiment of a device discovery process for use in a wireless communication system. The process is performed by processing logic that may comprise hardware (circuitry, dedicated logic, etc.), software (such as is run on a general purpose computer system or a dedicated machine), or a combination of both.

In one embodiment, the communication system in which the device discovery process occurs is a wireless communication system having an apparatus for communicating with WirelessHD devices in a wireless network, where the apparatus comprises a host processor; a transceiver; a physical interface coupling the host processor and the transceiver; and a memory accessible by the host processor and the transceiver to exchange information between the host processor and the transceiver.

Referring to FIG. 143, the process begins by processing logic in the transceiver discovering a remote wireless device in the wireless network (processing block 14301) and updates the list of devices in response to discovering the remote wireless device has been added to the wireless network (processing block 14302).

Next, processing logic in the transceiver notifies the host processor of the remote wireless device (processing block 14303). In one embodiment, notifying the host processor of the remote wireless device comprises asserting an interrupt to the host processor. In another embodiment, notifying the host processor of the remote wireless device is performed through an indexed bitmap table resident in the memory. This may occur by asserting the interrupt or setting a bit in a status register (Bank 0xA4, offset 0x05). Thus, this bit indicates to the host that the list of devices is available. In response, the host processor accessing memory to obtain the indexed bitmap table, comparing the indexed bitmap table with a previously stored table to determine any changes, and sending a capabilities request from the host processor to the transceiver for the remote wireless device if the host processor determines the remote wireless device is new based on results of comparing the indexed bitmap table with a previously stored table.

Then, processing logic in the transceiver requests capabilities information from the remote wireless device prior to receiving a request from the host processor for the capabilities information (processing block 14304) and buffers the capabilities information before the capabilities information is requested by the host processor (processing block 14305).

At this point, after beginning to receive the capabilities information from the remote wireless device, processing logic in the transceiver receives a capabilities request from the host processor which requests the capabilities of the remote wireless device (processing block 14306).

Thereafter, processing logic in the transceiver provides access to the capabilities information (processing block 14307).

In one embodiment, receiving the capabilities request from the host processor comprises the host processor storing a capabilities request message in a first bank of the memory, the host process sending a control message to a second bank of the memory, the control message indicating to the transceiver that the information exists in the first bank for the transceiver, and the transceiver reading the capabilities request message from the first buffer.

Connection Control

In order to appropriately establish streaming video/data between two wireless devices, a connection sequence is performed between the two devices. In one embodiment, the protocol is consistent with WirelessHD, which is the underlying technology of this interface. In one embodiment, the host processor and the transceiver use the memory banks to perform connection control, particularly for exchanging information for connection control information. More particularly, a first bank stores information being transferred from the host processor to the transceiver, and a second bank stores information being transferred from the transceiver to the host processor, to facilitate full-duplex communication of packet data between the host processor and the transceiver. In one embodiment, the full-duplex communication conforms to the WiHD packet structure. In one embodiment, the host processor is operable to store data in the first bank while the transceiver stores data in the second bank.

In one embodiment, the information stored by the host processor into the first bank of memory includes a connect request message for use in a connection control process, and the information stored by the transceiver into the second bank of memory includes a connect response message for use in a connection control process. This is shown in FIG. 144.

In one embodiment, the memory includes a third bank, different than the first and second banks, having audio-video information registers to store AV information obtained by the transceiver from the wireless network regarding one or more devices in the wireless network, and the transceiver stores a message (e.g., a Capabilities Response message) indicating that AV information associated with the one or more devices is available and stores the AV information (e.g., input format structure information) in the third bank for access by the host processor. This is shown in FIG. 145.

The discussion below describes the connection control process in more detail.

Figure 41:
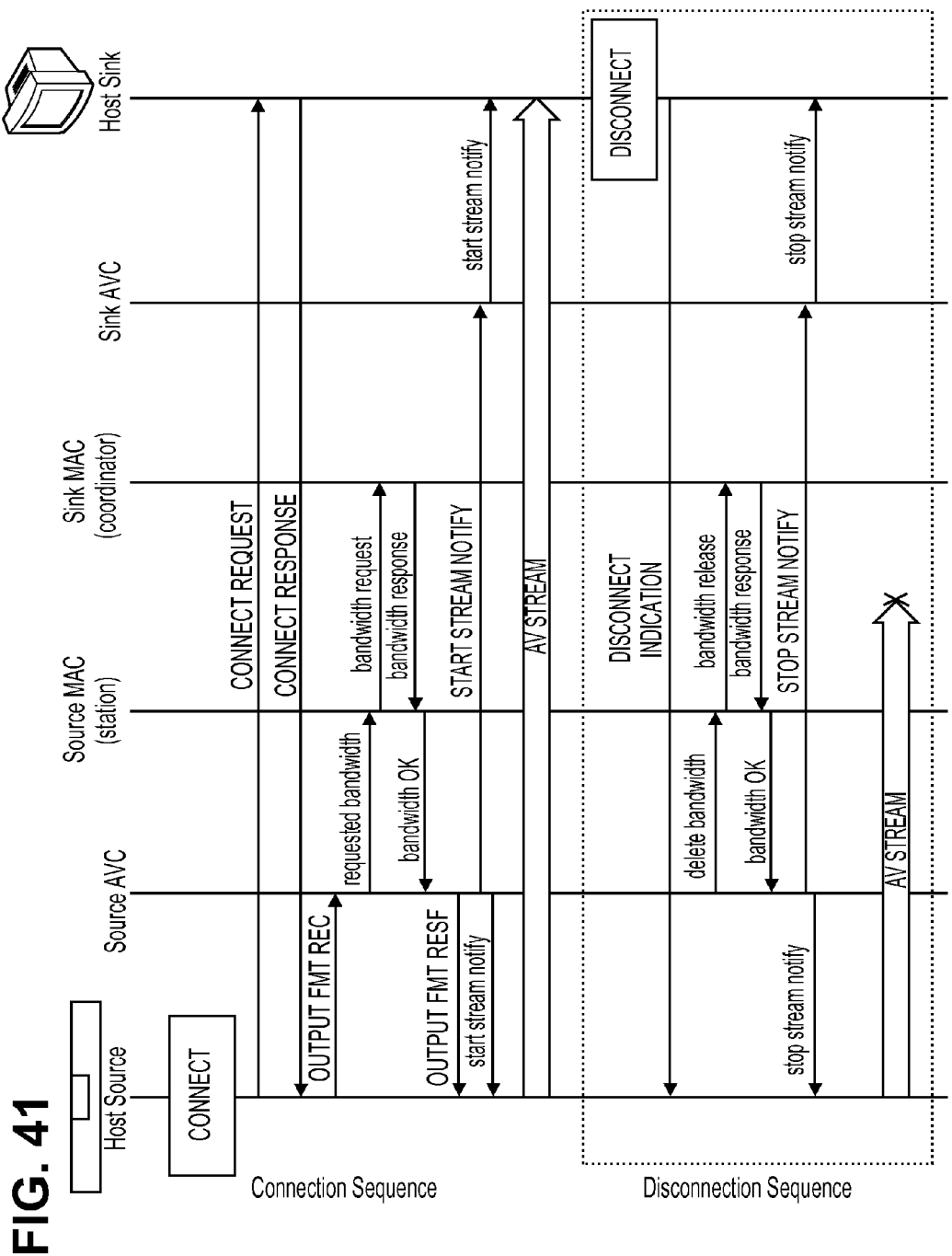
FIG. 41 illustrates a WirelessHD compliant connection/disconnection control sequence.

FIG. 41 illustrates one embodiment of the complete end-to-end message flow between a Sink and Source device for the connection and disconnection sequences. All connection control operations use the device indices generated as part of the device discovery process. Before connections can be established, the device discovery process described is performed.

Figure 42:
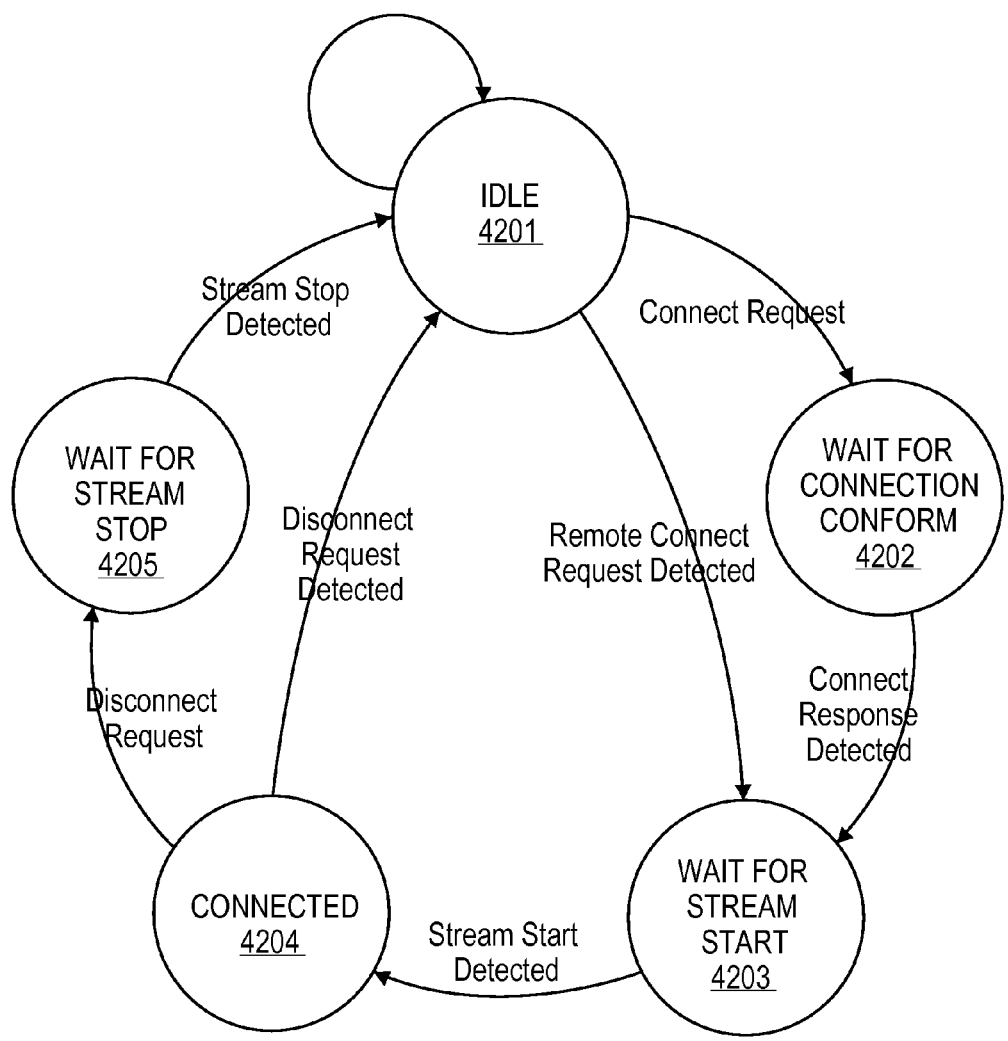
FIG. 42 illustrates a sink host connection control state-machine.
Figure 43:
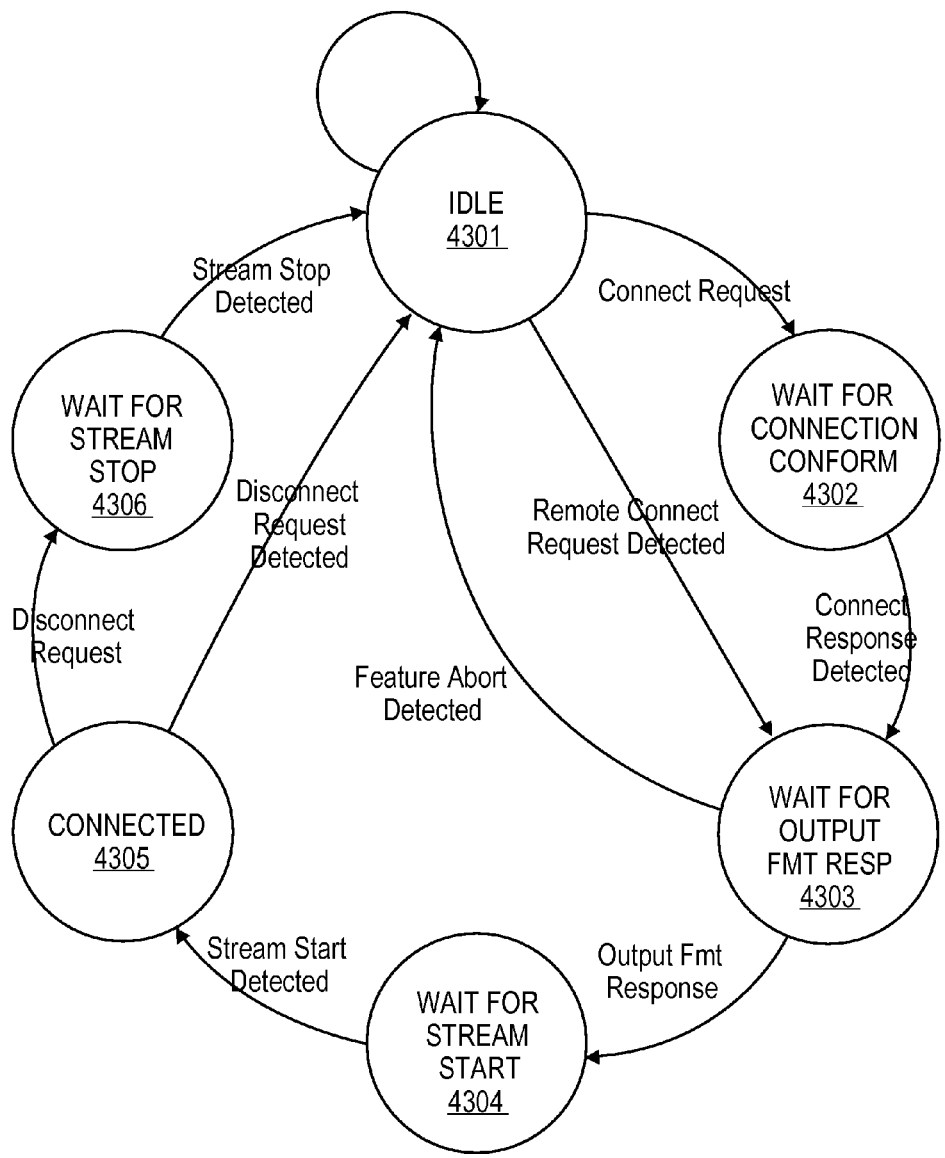
FIG. 43 illustrates a source host connection control state-machine.

One embodiment of a corresponding state-machine of the connection control process is shown in FIGS. 42 and 43 and for Sink and Source connection control state-machines, respectively. In one embodiment, at any point in the state-machine, if the transceiver detects a failure, the transceiver indicates this to the host by issuing a "Feature Abort" command (opcode 0xFF00) to the host with an appropriate reason code. If the host receives a "Feature Abort" for a particular device, it returns the state variables back to the "IDLE" state for that connection.

FIG. 42 illustrates the sink host connection control state machine. Referring to FIG. 42, the state process of the sink host connection control starts at idle state 4201 and remains there until there is a connection request from the host or a remote connection request detected from a remote system on the wireless network. Note that the connection request can come from either the host that we are directly connected to or from a remote host on the wireless network. In response to a connect request, the state machine transitions from idle state 4201 to wait-for-connection-confirm state 4202. The state machine waits in wait-for-connection-confirm state 4202 until a connect response is detected, at which time the state machine transitions to wait-for-stream-start state 4203. If in idle state 4201 and a remote connect request is detected, the state machine transitions directly to wait-for-stream-start state 4203. At wait-for-stream-start state 4203, the sink host waits for an indication that the stream has started.

When the start of the stream detected, the state machine transitions from wait-for-stream-start state 4203 to connected state 4204. Once at connected state 4204, the state machine transitions to idle state 4201 if a disconnect request initiated by a remote host is detected. If at connect state 4204 and a disconnect request is issued by the host that is connected to the transceiver, the state machine transitions to wait-for-stream-stop state 4205. When a stream stop is detected, the state machine transitions from wait-for-stream-stop state 4205 to idle state 4201.

FIG. 43 illustrates the source host connection control state machine. Referring to FIG. 43, the state process of the source host connection control starts at idle state 4301 and remains there until there is a connection request or a remote connection request detected. In response to a connect request, the state machine transitions from idle state 4301 to wait-for-connection-confirm state 4302. The state machine waits in wait-for-connection-confirm state 4302 until a connect response is detected, at which time the state machine transitions to wait-for-output-format(fmt)-response(resp) state 4303. If in idle state 4301 and a remote connect request is detected, the state machine transitions directly to wait-for-output-fmt-resp state 4303. At wait-for-output-fmt-resp state the source host waits until the output format response, and upon being received, the state machine transitions to wait-for-stream-start state 4204. At wait-for-stream-start state 4204, the source host waits for an indication that the stream has started.

When the start of the stream detected, the state machine transitions from wait-for-stream-start state 4303 to connected state 4305. Once at connected state 4305, the state machine transitions to idle state 4301 if a disconnect request initiated from a remote wireless device is detected. If in connect state 4305 and a disconnect request is issued by the host that is connected to the transceiver, the state machine transitions to wait-for-stream-stop state 4306. When a stream stop is detected, the state machine transitions from wait-for-stream-stop state 4306 to idle state 4301.

The following discussion describes the connection control state flow in greater detail.

Connect Procedure

Figure 44:
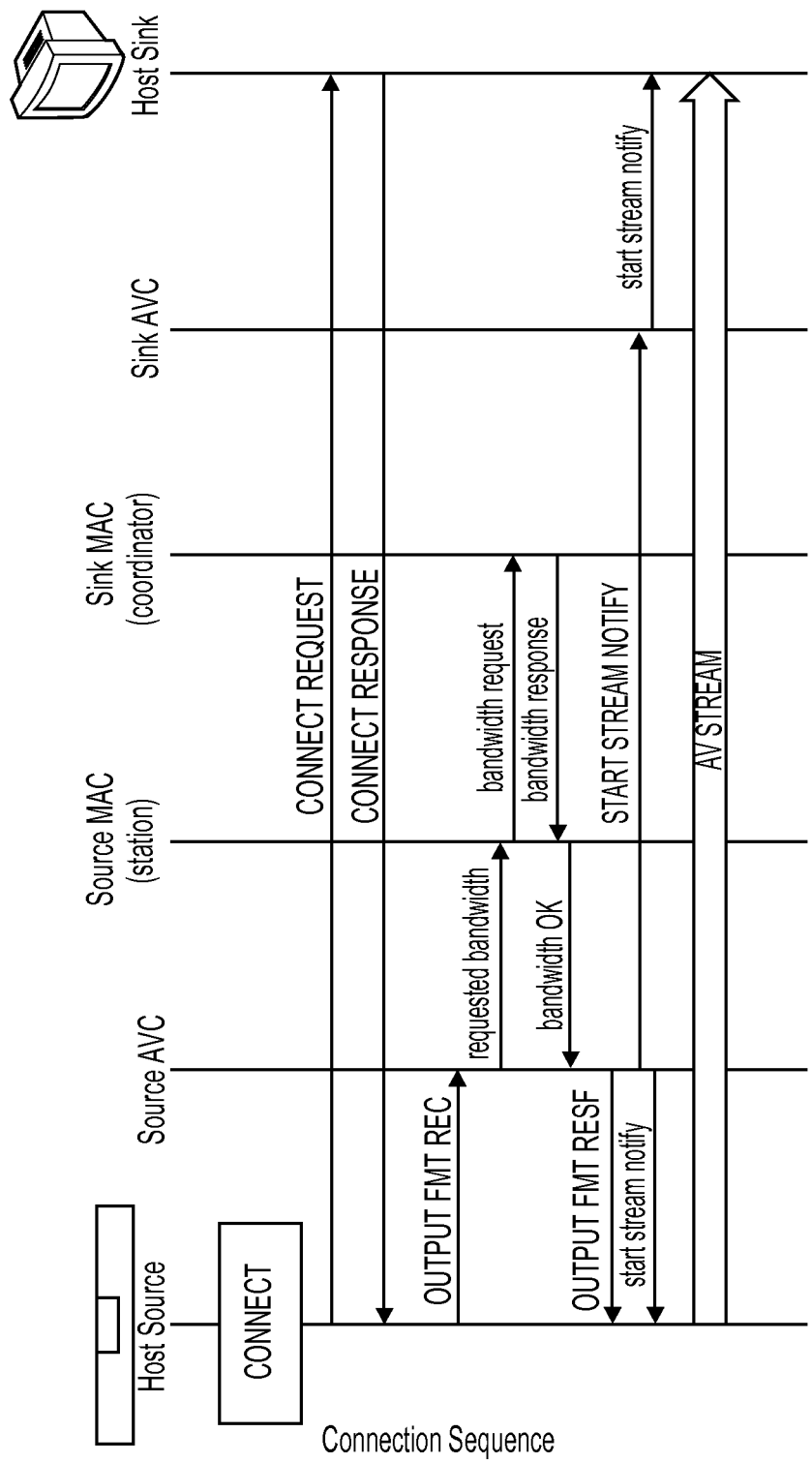
FIG. 44 illustrates an AVC Connect sequence.
Figure 45:
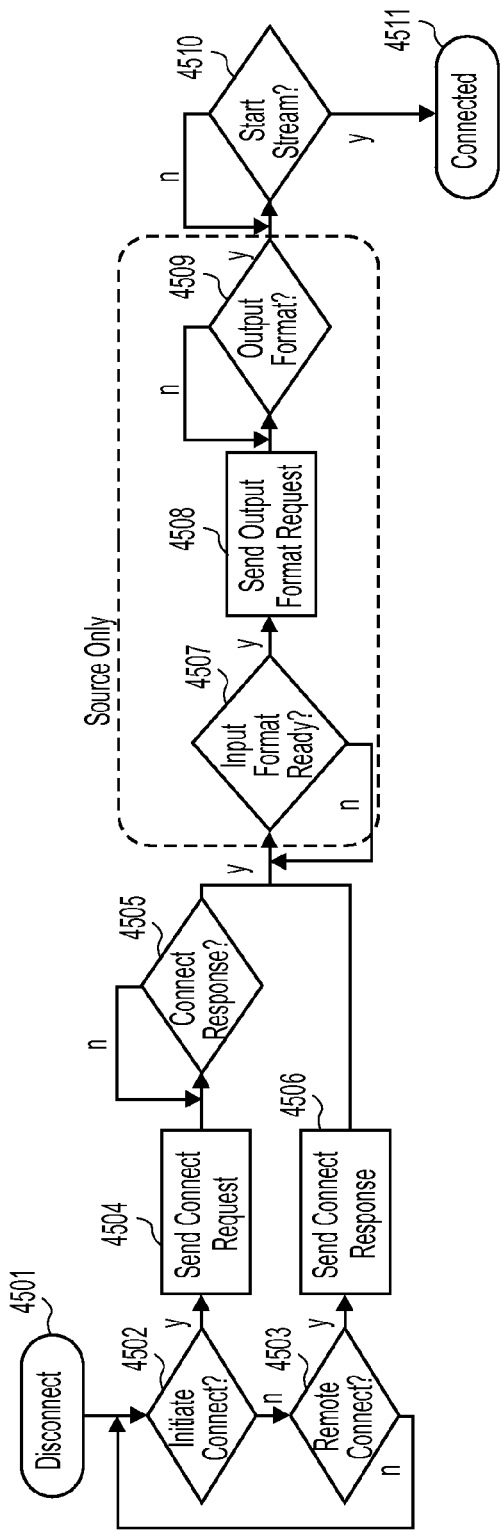
FIG. 45 is a flow diagram of a wireless transceiver connect sequence.

The transceiver host interface closely follows the connection sequence described in the WirelessHD specification. FIG. 44 shows one embodiment of the end-to-end communication sequences which occurs to establish a connection between two devices. The "Connect Request" and "Connect Response" are bold-faced to highlight the fact that these messages are bi-directional and can be initiated from either the Sink or Source device. FIG. 45 is a flow diagram of one embodiment of a wireless transceiver connect process. A portion is applicable only to a Source device and a portion applicable only to a Sink device, as indicated below.

Referring to FIG. 45, the process is performed by processing logic that may comprise hardware (e.g., circuitry, dedicated logic, etc.), software (such as is run on a general purpose computer system or a dedicated machine), or a combination of both. The process begins with the source and sink devices disconnected at processing block 4501. Thereafter, processing logic test whether there has been a connection initiated (processing block 4502). If not, processing logic tests whether a remote connection has occurred (processing block 4503). If not, the process transitions to processing block 4502 where the process repeats.

If processing logic determines a connection has been initiated at processing block 4502, the process transitions to processing block 4504 where processing logic of the source sends a connection request. Then processing logic tests whether there has been a connection response (processing block 4505). If not, the process repeats at processing block 4504 until a connection response is received. When one does occur, process transitions to processing block 4507.

If processing logic determines a remote connection has occurred at processing block 4503, the process transitions to processing block 4506 where processing logic of the device receiving the connect request (a source or a sink) sends the connection response and the process transitions to processing block 4507 for source devices and transitions to processing block 4510 for sink devices.

At processing block 4507, processing logic tests whether the input format is available in the A/V registers Bank 0xA0, offset 0x21-0xFE. Processing logic reads Bank 0xA4, offset 3, location 3 shown in FIG. 88 to determine if the Input Format is available. If not, the process at processing block

4507 repeats until the input format is ready. Once the input format is ready, processing logic sends the output format request (processing block 4508) and processing block checks whether the output format has been received (processing block 4509). If it has not, the process waits until the output format has been received, at which time the process transitions to processing block 4510. At processing block 4510, processing logic tests whether the start stream indication is provided by the transceiver. The start stream message indicates that the bandwidth to transmit the streaming content wirelessly is available. If the bandwidth is not available, the process repeats until the bandwidth for the stream is obtained. Once a stream start indication has been received, the sink and source are connected (processing block 4511) and the streaming content can be transmitted wirelessly.

The flow begins from a "disconnected" state. The device must wait for an event, either triggered by a local event (i.e., user initiates a connection to a remote device) or by a remote connection request. Once this occurs, information is passed between the two devices to establish a suitable connection. The following sub-sections describe each operation of the flow diagram in greater detail.

Connect Request

Figure 46:
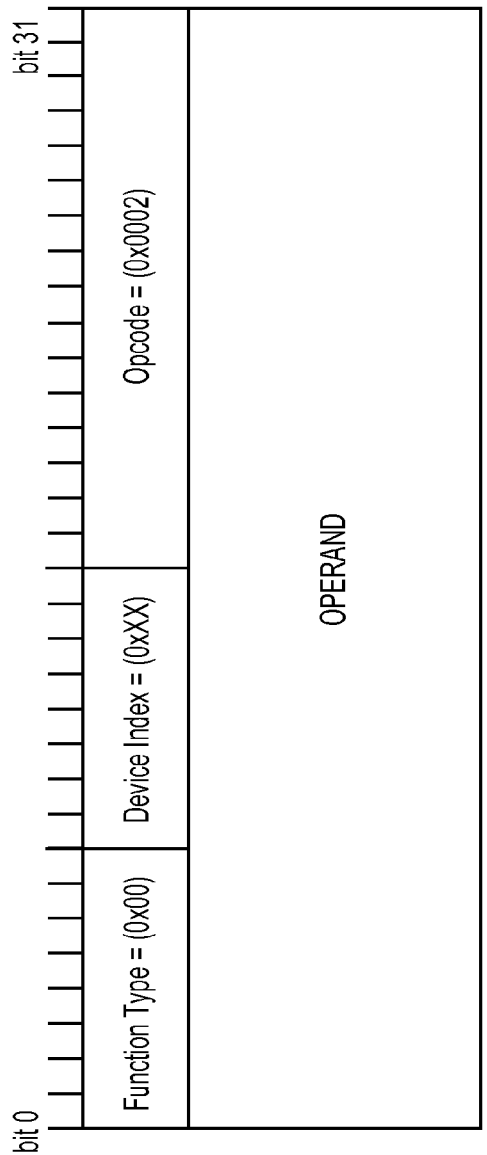
FIG. 46 illustrates a payload structure of a Connect Request message.

As indicated in FIG. 45, the host issues a Connect Request message to initiate a connection to a remote device. In one embodiment, a connect request is initiated by utilizing the TX packet register bank 0xAC. The appropriate payload follows the format described in conjunction with FIG. 5. For the Connect Request, the host constructs a payload message adhering to the structure depicted in FIG. 46. The definition of each field is consistent with the definition listed in the WirelessHD specification for the corresponding message. The only field which is unique is the "Device Index" field which corresponds to the index described above in conjunction with the device detect process.

The transceiver makes the input format information of one remote device available to the (Source) host via direct register access (bank 0xA0). To ensure that the input format data stored in the register bank corresponds with the current connecting device, the "RF" (Read Format) bit is set to '1' when initiating a connection from a Source host. FIG. 47 illustrates a connect request message as it would appear in the TX (0xAC) or RX (0xA8) register bank I²C register bank. The portions of the register data that contain I²C header information are in the first three rows and the last row, whereas the actual payload is the remainder.

Once the Connect Request message is written to the transmit register bank 0xAC, the host notifies the transceiver that the message is ready to be sent. In one embodiment, this is accomplished by the host writing a value of 0x08 to control register bank 0xA4. FIG. 48 illustrates the host setting bit location 3 to '1' to indicate that TX data is ready for the transceiver.

When the "TX READY" flag is asserted, the transceiver extracts the Connect Request from the register region. It then simultaneously asserts INTERRUPT pin 412 and the "TX DONE" status flag of register bank 0xA4 (FIG. 76B), offset 0x05. FIG. 49 illustrates Location 4 being set to '1' by the transceiver after it finishes extracting the TX message. Until the transceiver indicates status of "TX DONE", the register contents of bank 0xAC (the transmit bank) are not altered.

To acknowledge receipt of the "TX DONE" flag and to clear INTERRUPT pin 412, the host writes a value of 0x10 to register bank 0xA4, offset 0x06 (the status clear register). FIG. 50 illustrates the host setting bit location 4 to '1' to clear status register bit location 4.

Figures 51, 52, 53:
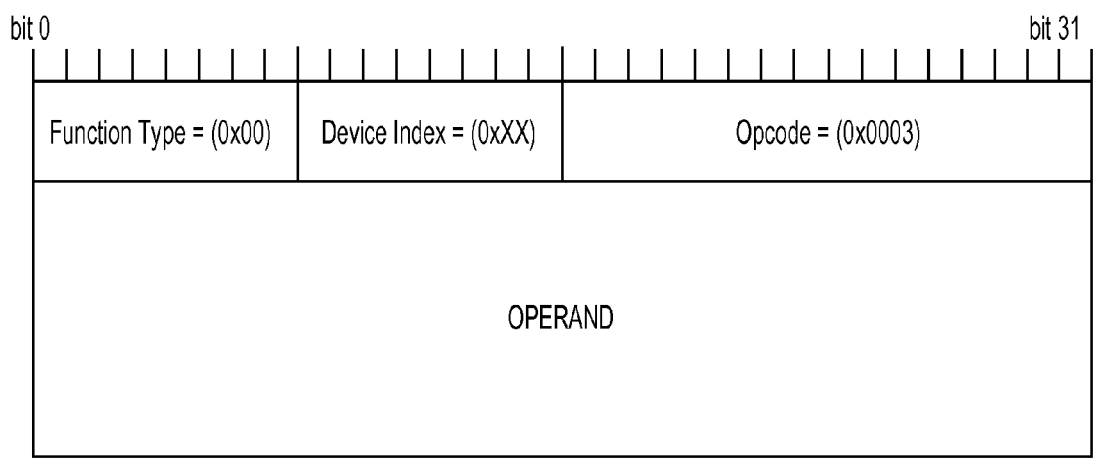
FIG. 51 illustrates Location 5 being set to '1' by the transceiver after it finishes writing to the RX bank.
FIG. 52 illustrates bit location 5 being set to '1' to clear status register bit location 5.
FIG. 53 illustrates a payload structure of a Connect Response message.

FIG. 45 also indicates that the connection can be initiated by the remote device, rather than the local host device. The process flow of a remotely initiated Connect Request is similar to the flow described above. The transceiver populates the receive register bank (0xA8) as shown in FIG. 47 and then notifies the host that the message is ready by simultaneously asserting interrupt pin 412 and the "RX READY" status flag of register bank 0xA4, offset 0x05. FIG. 51 illustrates Location 5 being set to '1' by the transceiver after it finishes writing to the RX bank.

To acknowledge receipt of the "RX READY" flag and to clear the INTERRUPT pin 412, the host writes a value of 0x20 to register bank 0xA4, offset 0x06 (the status clear register). FIG. 52 illustrates the host setting bit location 5 to '1' to clear status register bit location 5.

The host can now parse and use the information contained in the connect request to prepare a connection and issue an appropriate response.

Connect Response

When a Connect Request message is received from the transceiver, the host responds to the sender of the Connect Request with an appropriate Connect Response message as indicated in FIG. 45. A Connect Response message can be generated by utilizing the TX packet register bank 0xAC. The appropriate payload follows the format described in conjunction with FIG. 5. For the Connect Response, the host constructs a payload message adhering to the structure depicted in FIG. 53. The definition of each field is consistent with the definition listed in the WirelessHD specification for the corresponding message. The only field which is unique is the "Device Index" field which corresponds to the index described above in conjunction with the device detect process.

FIG. 54 illustrates Connect Response message as it would appear in the TX(0xAC) or RX(0xA8) register bank (I²C register bank). The portions of the register data that contain I²C header information are the first three rows, whereas the actual payload is in the remaining rows.

The host notifies the transceiver that the message is ready to be sent by observing basic transmit handshaking rules outlined in conjunction with FIG. 48-FIG. 50.

It is also possible to receive a Connect Response message from a remote device as shown in FIG. 45. The handling is similar to the flow described above and the description of remote vs. local initiated messages discussed herein. The transceiver populates the receive register bank (0xA8) as shown in FIG. 54. The portions of the register data that contain I²C header information are in the first three rows and the last row, whereas the actual payload is the remainder. It will then follow the same receive handshaking protocol as shown in FIG. 51-FIG. 52.

Output Format Request

Once both sides involved in a connection sequence are aware that a connection is being attempted (via the Connect Request/Response exchange described above), the Source host is ready to send the output format notification. If input format information is requested during the connect control sequence, the transceiver refreshes the input format information in the register bank. This is discussed in more detail below. Once it successfully refreshes the input format information, it notifies the host by simultaneously asserting interrupt pin 412 and the "INPUT FORMAT RXD" status flag of register bank 0xA4, offset 0x05. FIG. 55 illustrates Location 3 being set to '1' by the transceiver after it finishes writing the input format data.

The host clears the "INPUT FORMAT RXD" flag once this status is detected since the transceiver will not alter the input format register data until it is specifically requested to do so by the host. To clear the status and interrupt pin 412, the host writes a value of 0x08 to register bank 0xA4, offset 0x06 (the status clear register). FIG. 56 illustrates the host setting bit location 3 to '1' to clear status register bit location 3.

Figure 57:
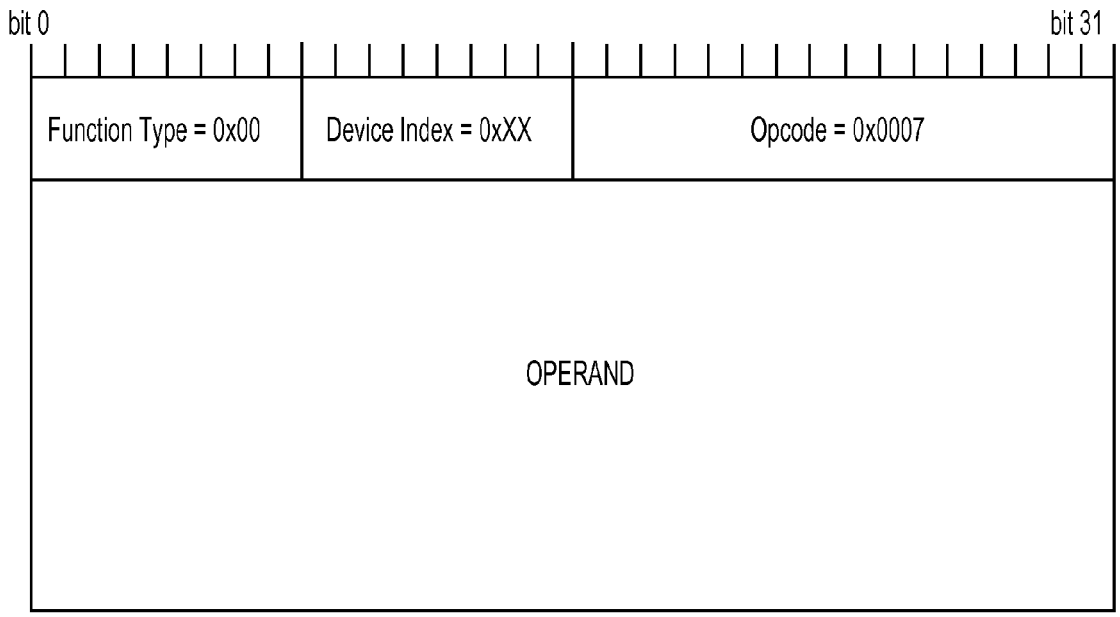
FIG. 57 illustrates a payload structure of an Output Format Request message.

With the input format information available in the AVC information register bank (bank 0xA0), the Source host can access this information to make a determination about the appropriate output format to establish between the Source and Sink devices. Once this determination is made, the Source issues an appropriate Output Format Request message as shown in the flow diagram of FIG. 45. A Connect Response message can be generated by utilizing the TX packet register bank 0xAC. The appropriate payload follows the format described in conjunction with FIG. 5. For the Output Format Request, the host constructs a payload message, referred to as the Output Format Request message adhering to the structure depicted in FIG. 57. The definition of each field is consistent with the definition listed in the WirelessHD specification for the corresponding message. The only field which is unique is the "Device Index" field which corresponds to the index described above in conjunction with the device detect process.

Figure 58:
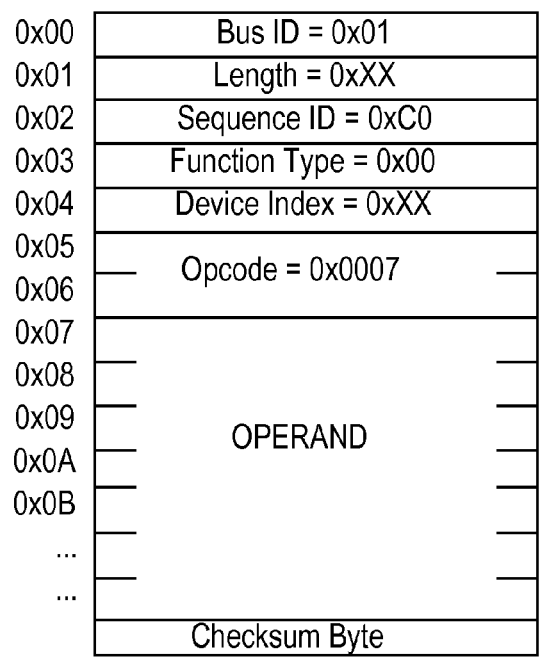
FIG. 58 illustrates an Output Format Request message as it would appear in the TX(0xAC) or RX(0xA8) register bank.

FIG. 58 illustrates Output Format Request message as it would appear in the TX(0xAC) or RX(0xA8) register bank ($I^2C$ register bank). The portions of the register data that contain $I^2C$ header information are in the first three rows and the last row, whereas the actual payload is the remainder. To clear the status and the interrupt pin, the host writes a value of 0x40 to register bank 0xA4, offset 0x06 (the status clear register).

Output Format Response

According to the WirelessHD specification, there are two situations in which Output Format data is sent by the Source; 1) to establish a connection between two devices, and 2) to update settings of an existing connection. During connection control operations, the Source-side transceiver automatically generates an Output Format Response on behalf of the Sink host based on the information it receives in the Output Format Request, Input Format information, and the ability to obtain bandwidth from the wireless network. After reviewing these pieces of information, the transceiver generates the appropriate Output Format Response message as indicated in FIG. 45. An Output Format Response message can be generated by utilizing the TX packet register bank 0xAC. The appropriate payload follows the format described in conjunction with FIG. 5. For the Output Format Response, the host constructs a payload message, referred to as the Output Format Response message adhering to the structure depicted in FIG. 59. The definition of each field is consistent with the definition listed in the WirelessHD specification for the corresponding message. The only field which is unique is the "Device Index" field which corresponds to the index described above in conjunction with the device detect process.

Figure 60:
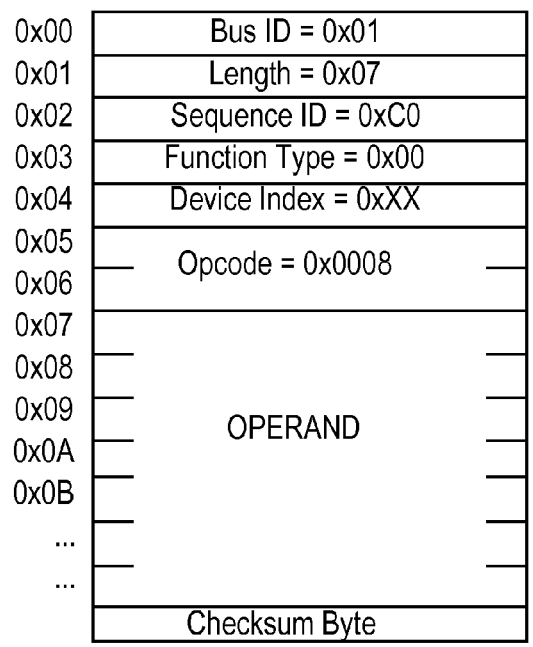
FIG. 60 illustrates an Output Format Response message as it would appear in the TX(0xAC) or RX(0xA8) register bank.

FIG. 60 illustrates Output Format Response message as it would appear in the TX(0xAC) or RX(0xA8) register bank ($I^2C$ register bank). The portions of the register data that contain $I^2C$ header information are in the first three rows, whereas the actual payload is in the remaining rows.

The source transceiver will populate the receive register bank (0xA8) as shown in FIG. 60. The portions of the register data that contain $I^2C$ header information are in the first three rows and the last row, whereas the actual payload is the remainder. It then follows the same receive handshaking protocol as in FIG. 51-FIG. 52.

Figure 59:
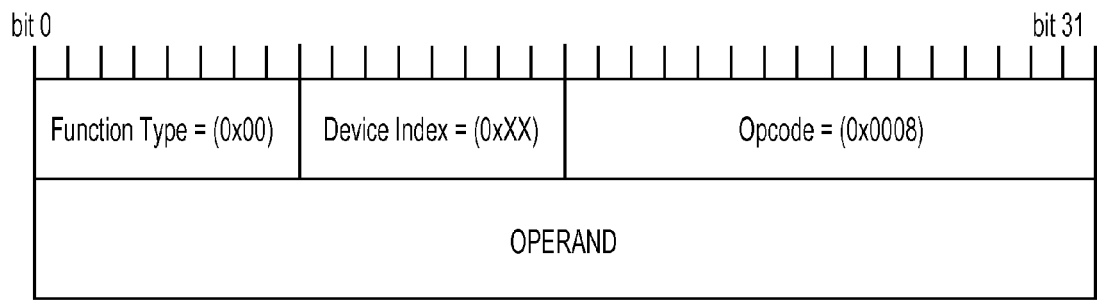
FIG. 59 illustrates a payload structure of an Output Format Response message.

Note the "Result Code" field of FIG. 59. It is possible that a particular Output Format requested by the Source is denied due to wireless bandwidth restrictions or other limitation. For this reason, the Source host is prepared to re-negotiate a different Output Format if a requested Format is denied.

Connection Complete

Figure 61:
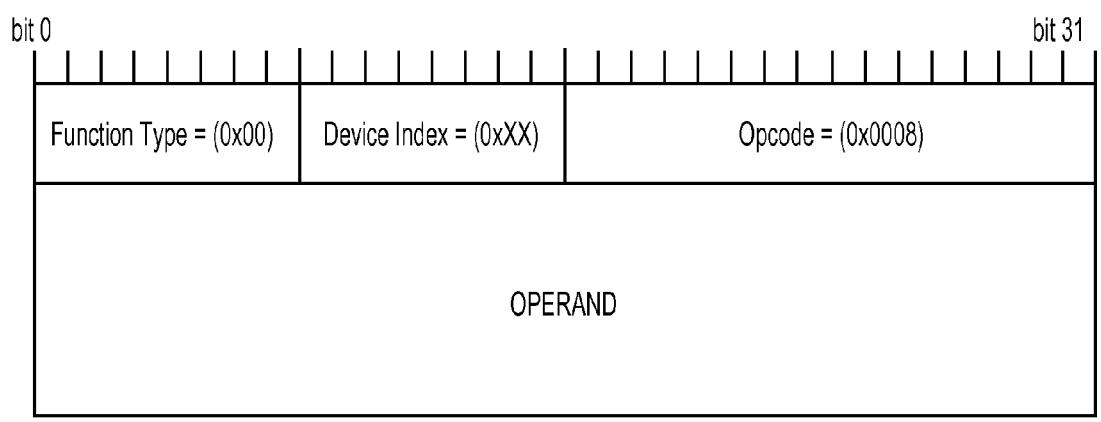
FIG. 61 illustrates a payload structure of a Start Stream Notify message.

Once both sides of a connection agree upon a common Output Format setting, the Source transceiver sends a Start Stream Notify message to both the Source and the Sink hosts. FIG. 61 illustrates a Payload structure of a Start Stream Notify message. The definition of each field is consistent with the definition listed in the WirelessHD specification for the corresponding message. The only field which is unique is the "Device Index" field which corresponds to the index described above in conjunction with the device detect process.

FIG. 62 illustrates Start Stream Notify message as it would appear in the RX(0xA8) register bank. The portions of the register data that contain $I^2C$ header information are in the first three rows and the last row, whereas the actual payload is the remainder.

After the transceiver writes this message to bank 0xA8, the transceiver asserts the "RX READY" bit of the control bank 0xA4, offset 0x05. The host must then follow the same receive handshaking protocol as in FIG. 51-FIG. 52. At this point, the host can consider the connection successful.

Disconnect Procedure

Figure 63:
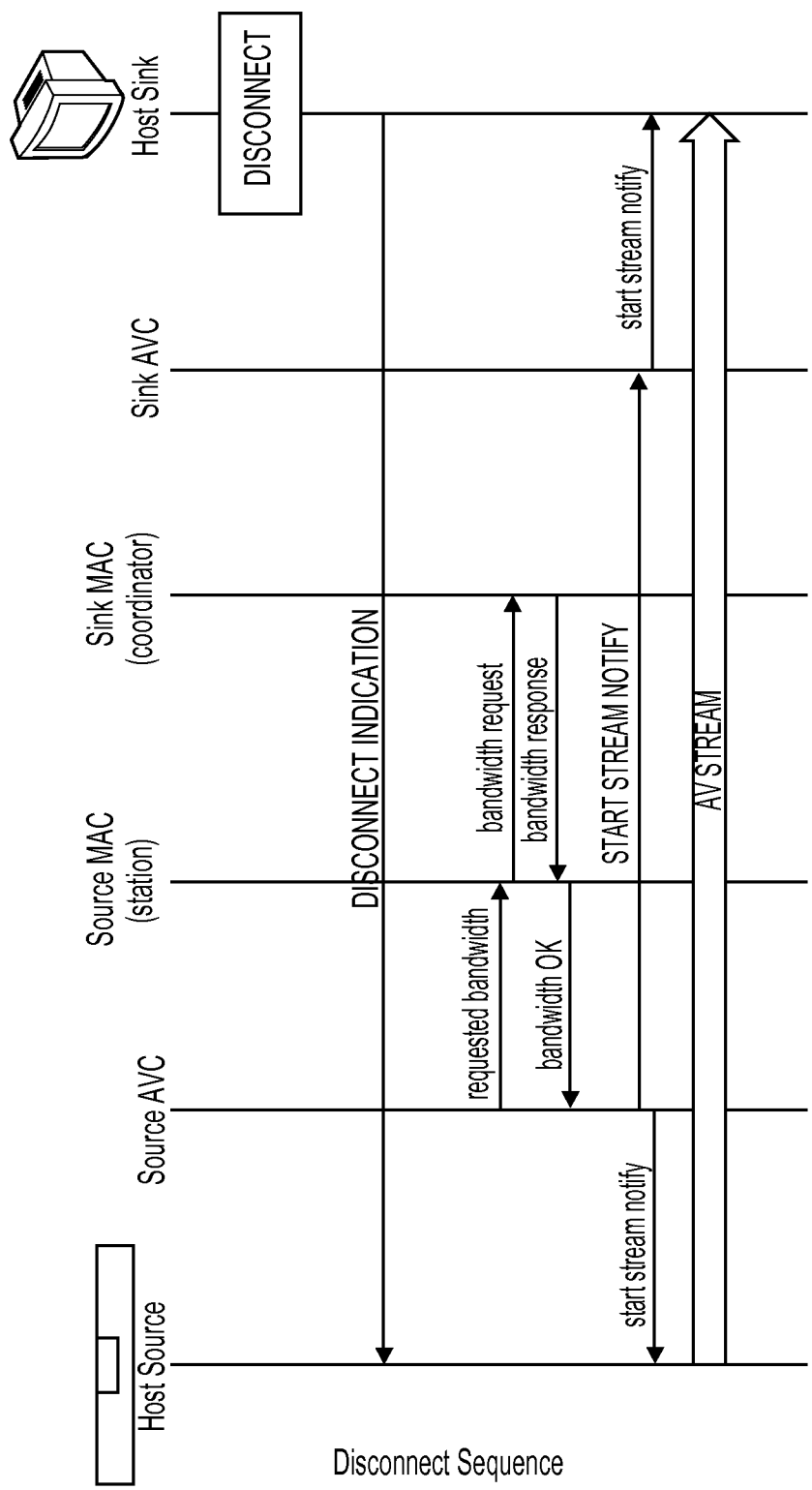
FIG. 63 illustrates an AVC Disconnect sequence.

FIG. 63 shows the end-to-end communication sequences which must occur to disconnect a connection between two devices. The "Disconnect Indication" is bold-faced to highlight the fact that this message is bi-directional and can be initiated from either the Sink or Source device. FIG. 64 is a flow diagram of one embodiment of a wireless transceiver disconnect process.

The flow begins from a "connected" state. The device waits for an event, either triggered by a local event (i.e.—user initiates a disconnect to a remote device), by a remote disconnect request, or if the transceiver itself detects a wireless event that requires it to intervene (i.e.—unexpected loss of device on the wireless network). Once this occurs, information is passed between the two devices to perform a mutual disconnection of the AV stream. The following sub-sections describe each step of the flow diagram in greater detail.

Clearing Connection

As indicated in FIG. 63, the Source or Sink host issues a Disconnect Notify message to initiate a disconnection from a remote device. This is accomplished by utilizing the TX packet register bank 0xAC. The appropriate payload follows the format described above in conjunction with FIG. 5. For the Disconnect Notify, the host constructs a payload message adhering to the structure depicted in FIG. 65. The definition of each field is consistent with the definition listed in the WirelessHD specification for the corresponding message. The only field which is unique is the "Device Index" field which corresponds to the index described in the device detect process of section 0.

FIG. 66 illustrates Disconnect Notify message as it would appear in the TX(0xAC) or RX(0xA8) register bank (the $I^2C$ register bank). The portions of the register data that contain $I^2C$ header information are in the first three rows and the last row, whereas the actual payload is the remainder.

Once the Disconnect Notify message is written to the transmit register bank 0xAC, the host notifies the transceiver that the message is ready to be sent. This is accomplished by writing a value of 0x08 to control register bank 0xA4, offset 0x04. FIG. 67 illustrates the host setting bit location 3 to '1' to indicate that TX data is ready for the transceiver.

When the "TX READY" flag is asserted, the transceiver extracts the Connect Request from the register region. It then simultaneously asserts INTERRUPT pin 412 and the "TX DONE" status flag of register bank 0xA4, offset 0x05. FIG. 68 illustrates Location 4 being set to '1' by the transceiver after it finishes extracting the TX message. Until the transceiver indicates status of "TX DONE", the register contents of bank 0xAC (the transmit bank) is not be altered.

To acknowledge receipt of the "TX DONE" flag and to clear the INTERRUPT pin, the host writes a value of 0x10 to register bank 0xA4, offset 0x06 (the status clear register). FIG. 69 illustrates the host setting bit location 4 to '1' to clear status register bit location 4.

FIG. 64 also indicates that the connection can be initiated by the remote device, rather than the local host device. The process flow of a remotely initiated Connect Request is similar to the flow described above. The transceiver populates the receive register bank (0xA8) as shown in FIG. 47. It then notifies the host that the message is ready by simultaneously asserting INTERRUPT pin 412 and the "RX READY" status flag of register bank 0xA4, offset 0x05. FIG. 70 illustrates Location 5 being set to '1' by the transceiver after it finishes writing to the RX bank.

To acknowledge receipt of the "RX READY" flag and to clear INTERRUPT pin 412, the host writes a value of 0x20 to register bank 0xA4, offset 0x06 (the status clear register). FIG. 71 illustrates the host setting bit location 5 to '1' to clear status register bit location 5.

Disconnect Complete

Figure 72:
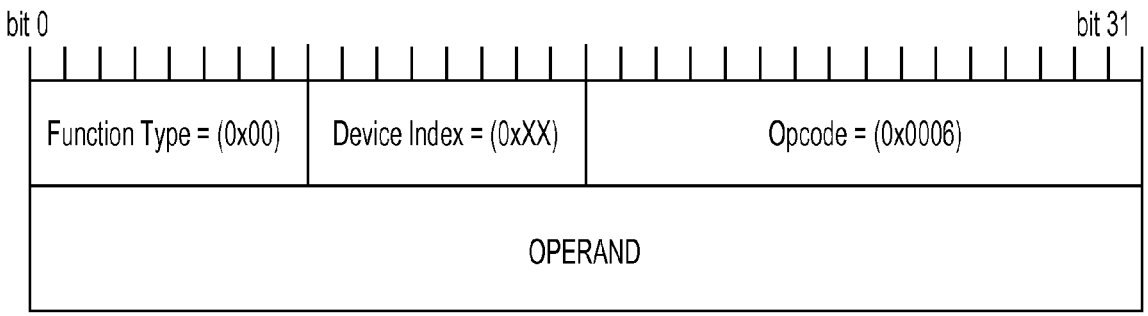
FIG. 72 illustrates a payload structure of a Stop Stream Notify message.

When the Source transceiver detects a Disconnect Notify message, it initiates a bandwidth release process. When this process completes, the Source transceiver sends a Stop Stream Notify message to both the Source and the Sink hosts. This message follows the payload structure depicted in FIG. 72. The definition of each field is consistent with the definition listed in the WirelessHD specification for the corresponding message. The only field which is unique is the "Device Index" field which corresponds to the index described above in conjunction with the device detect process.

Figure 73:
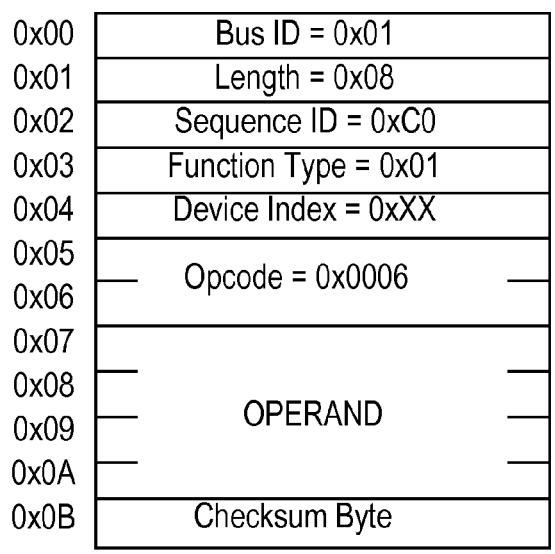
FIG. 73 illustrates a Stop Stream Notify message as it would appear in the RX(0xA8) register bank.

FIG. 73 illustrates Stop Stream Notify message as it would appear in the RX(0xA8) register bank (I²C register bank). The portions of the register data that contain I²C header information are in the first three rows and the last row, whereas the actual payload is the remainder.

After the transceiver writes this message to bank 0xA8, the transceiver asserts the "RX READY" bit of the control bank 0xA4, offset 0x05. The host then follows the same receive handshaking protocol as in FIG. 70-FIG. 71. At this point, the host can consider the disconnect complete.

Device Control

Figure 74:
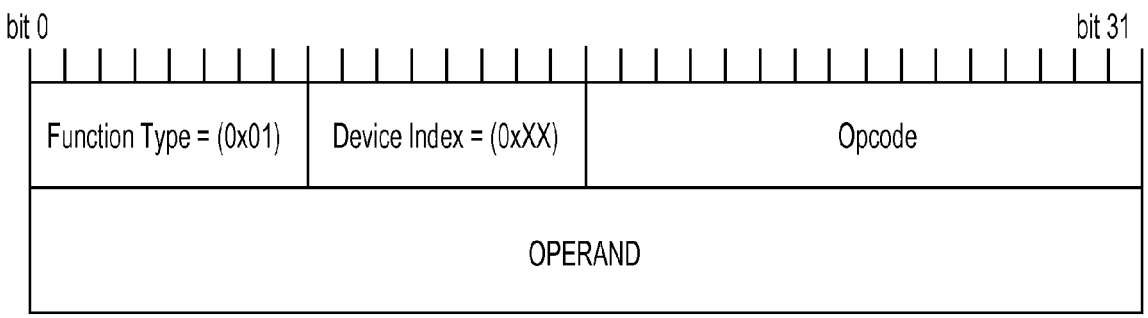
FIG. 74 illustrates a payload structure of a Device Control message.

Device control permits high-level control over any device in a WirelessHD network initiated by any of the constituent devices in the network. The device control messages are sent/received on the same RX/TX packet medium that device discovery and connection control messages use. A primary difference is that the function type for device control messages is 0x01, whereas it is 0x00 for device discovery and connection control messages. FIG. 74 illustrates Payload structure of a Device Control message. The opcode and parameters correspond to those described in the WirelessHD specification.

Figures 75, 76B:
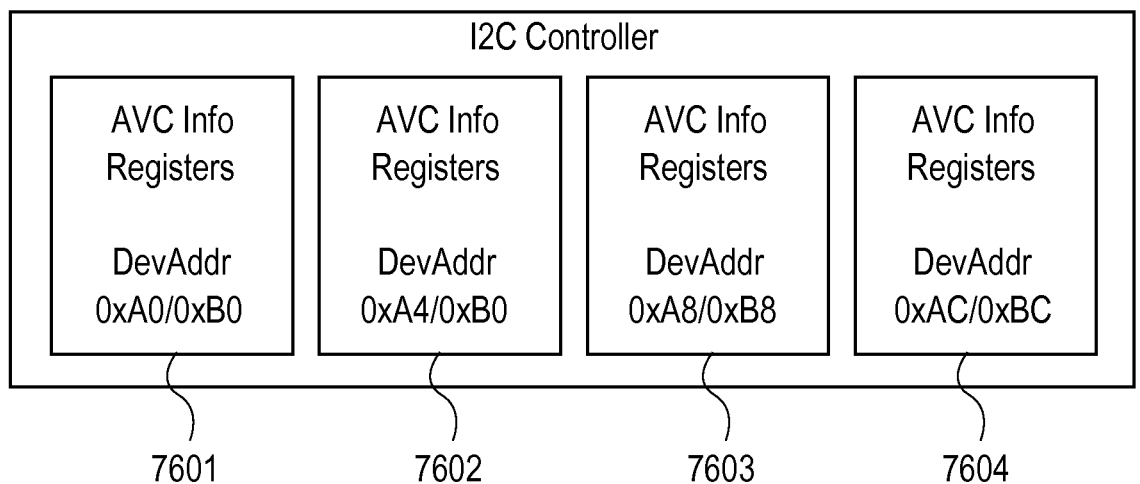
FIG. 75 illustrates a Device Control message as it would appear in the RX(0xA8) or TX(0xAC) register bank.
FIG. 76B illustrates a register bank summary.

FIG. 75 illustrates a Device Control message as it would appear in the RX(0xA8) or TX(0xAC) register bank. The portions of the register data that contain I²C header information are in the first three rows and the last row, whereas the actual payload is the remainder.

Register Banks

In one embodiment, the wireless communication system includes an apparatus to communicate with remote wireless devices (e.g., WirelessHD devices) in the wireless network. The apparatus comprises: a host processor having an I²C interface; a transceiver having an I²C interface; a physical interface coupling the host processor and the transceiver, the physical interface comprising an I²C bus coupled to the I²C interface of both the host processor and the transceiver; and multiple separate banks of memory in the transceiver and accessible by the host processor and the transceiver to exchange information between the host processor and the transceiver, where the host processor accesses the memory banks via its I²C interface.

In one embodiments, the multiple memory banks comprise: a first bank to store information being transferred from the host processor to the transceiver; a second bank to store information being transferred from the transceiver to the host processor; a third bank to store control registers to control interactions between the host processor and the transceiver; and a fourth bank to store audio-video information registers to store information obtained by the transceiver from the wireless network regarding one or more devices in the wireless network and for use by the host processor. In one embodiment, one or more of the control registers indicate when communications are ready and in which memory locations in the banks the data may be read or written to. In one embodiment, the third bank stores one or more bitmaps that provide information on a device list of devices in the wireless network.

Figure 76A:
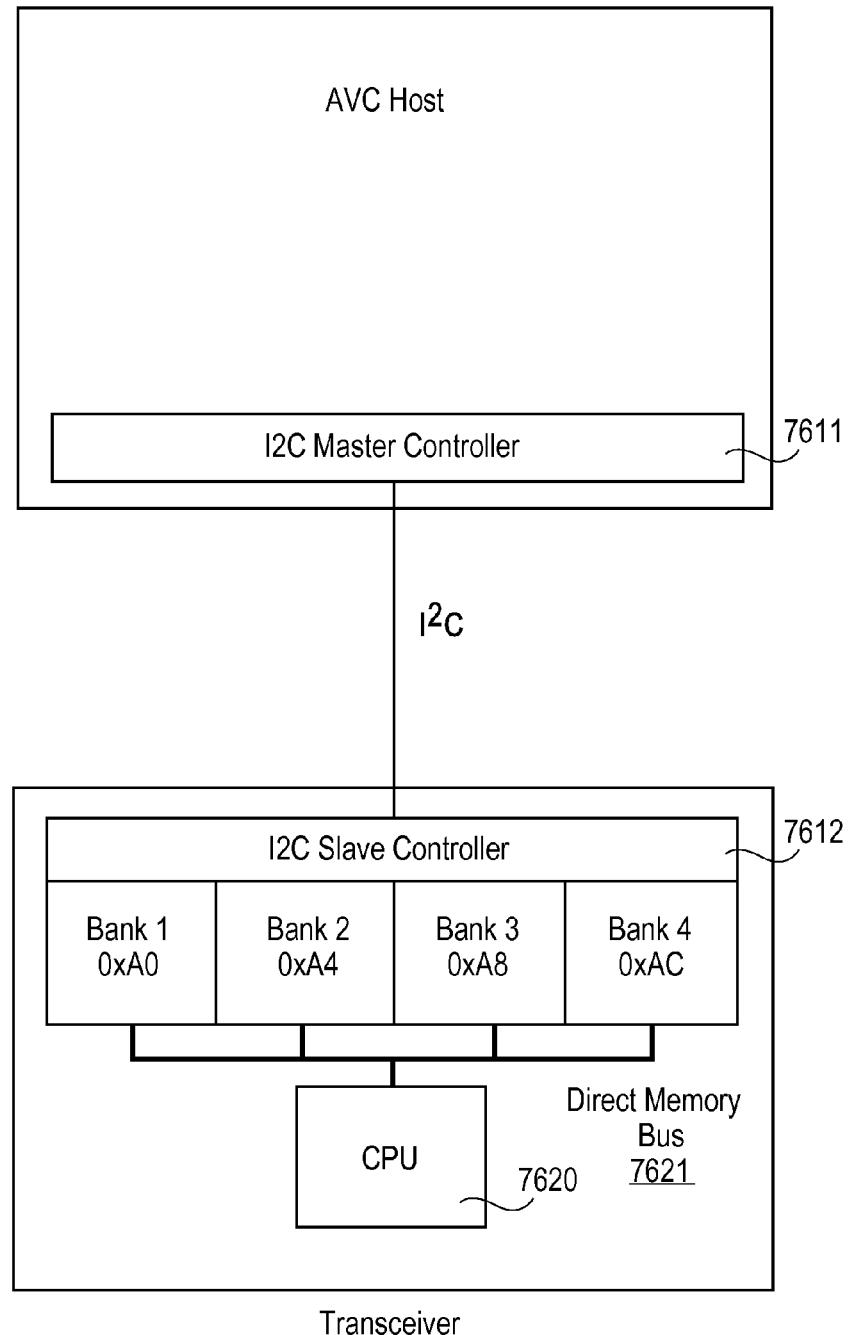
FIG. 76A is a block diagram of a host coupled to a transceiver.

In one embodiment, the four banks of memory are accessed through the SDA and CLK lines (FIG. 4). This is shown in FIG. 76A where the I²C bus (SDA and clk) runs between two I²C interfaces, I²C master controller 7601 and I²C slave controller 7612. The reset and interrupt lines have not been shown to avoid obscuring the invention. CPU 7620 interfaces to the four blocks of memory through direct memory bus 7621, while slave controller 7612 interfaces the other sides of the memory banks to the I²C bus (and the host processor). The host processor places the capabilities information as above described in the AVC information registers. The Sink side host places the Input Format in the AVC information registers, whereas the Source side host reads the Input Format from the AVC information registers.

In one embodiment, WirelessHD transceiver exposes four register banks to the host system to control and communicate on the wireless network. FIG. 76B illustrates one embodiment of the register blocks. Referring to FIG. 76B, the four register blocks comprise AVC information registers 7601, control registers 7602, receive registers 7603 and transmit registers 7604. In one embodiment, each of the banks have a unique I²C device address (0xA0-0xAC) to distinguish the bank and each of the banks are 256 bytes deep allowing for the standard 8-bit addressing mode of I²C. Each of these will be described in more detail below.

Note that use of bank separation of I²C information is particularly useful. It allows the host system to optimize interference to the radio and optimizes/reduces memory requirements of the whole system. More specifically, the host accesses these banks through the same I²C interface. The memory requirements are reduced by allowing contextual information to be stored in the AVC information registers bank and does not have to be passed on to the other entity. For example, the transceiver can have information about a wireless device in the wireless network stored in the AVC information registers and then can notify the host system that the information is there, instead of sending the information to the host itself. The host thereafter can access the information directly and only the portions that are applicable to that specific host. In one embodiment, the transceiver notifies the host at the same time the information being put in the AVC registers. Therefore, the host can optimize what they need to look at and if the host does not need to access any of the information in the memory, there is no communication bandwidth wasted in providing access to the information for the host.

AVC Information Bank (0xA0/0xB0)

The AVC Information registers constitute a 256 byte region which is used to store information that does not change or rarely changes during the course of normal operation. As a result, this section can be useful to the host to retrieve data on an as-needed basis. FIG. 77-80 illustrate Register map of AVC Info Registers. The registers in this bank would be understood by those skilled in the art. FIG. 81 illustrates the Bit-description of register 0x06. FIG. 82 illustrates the Bit-description of register 0x07. FIG. 83 illustrates the Bit-description of register 0x22.

Control Bank (0xA4/0xB4)

The control register space is a 256 byte region that is used to control interactions between the Host and transceiver. I²C is a Master/Slave interface so the transceiver cannot use the bus itself to throttle the Host communications. As a result, the value of specific registers in this register space are used to indicate when communications are ready and in which sections of the I²C register space the data can be read or written to. FIG. 84 illustrates Control Register space format. The following will describe these registers.

Reset Register

The reset register is used to cause the system to reset. There are two reset types available to the developer, namely software reset and hardware reset. A software reset causes the system software to invoke the sequences to re-initialize the embedded software code. A hardware reset causes the software to assert a hardware signal which causes the hardware (and software) to reset. FIG. 85 illustrates a Field description of one embodiment of a Reset register. Referring to FIG. 85, the fields may be sent as follows:

CLR_INPUT_FORMAT—write '1' to clear input format buffer
CLR_TX—write '1' to clear transmit register space
CLR_RX—write '1' to clear receive register space
SW_RST—write '1' to invoke software reset
HW_RST—write '1' to invoke hardware reset Power Mode The power mode register makes it possible to override the normal operational mode of the wireless system. Increasing the power savings operational mode can cause a degradation of the performance on the wireless link. FIG. 86 illustrates Field description of Power Mode register. Referring to FIG. 86, the PWR_MODE field may be set as follows:

PWR_MODE—'00'=Full
'01'=Wake
'10'=Sleep
'11'=Standby

Interface Control

The interface control register makes it possible to configure the behavior of the Host interface with the transceiver. FIG. 87 illustrates field description of Interface Control register. Referring to FIG. 87, the RST_POL, INT_POL and BAUD fields may be set as follows:

RST_POL—'0'=active high
'1'=active low
INT_POL—'0'=active high
'1'=active low
BAUD—'00'=100 kHz
'01'=400 kHz
'10'=3.4 MHz
'11'=Reserved Ready State The ready state register is a read-only register that the Host can use to get high-level state information about the status of the wireless device. FIG. 88 illustrates a field description of Ready register. Fields in the Ready register may be set as follows:

INPUT_FORMAT_READY—'0'=input format is not populated on this device
'1'=input format is populated on this device
DEVCAP_READY—'0'=device capabilities are not ready on this device
'1'=device capabilities are ready on this device
WIHD_READY—'0'=WiHD is off
'1'=WiHD is on
WIHD_LOADED—'0'=WiHD chip is undergoing reset
'1'=WiHD chip is ready to take commands Host Control The host control register is a write-only register that makes it possible for the Host to invoke various operations on the transceiver. In order to invoke any operation controlled by this register, a logic '1' is written to the corresponding bit location. FIG. 89 illustrates a field description of Host Control register. Fields in the Host Controls may be set as follows:

RX_DONE—'1' indicates that the Host has finished reading the data in the RX registers.
TX_READY—'1' indicates there is data waiting for the transceiver in the TX registers.
INPUT_FORMAT_DONE—'1' indicates that the Host finished writing to Input Format register space. Applies only to Sink. Source reserves this bit.
DEVCAP_DONE—'1' indicates that the Host finished writing to Device Capabilities region of register space.
INIT_WIHD—'1' causes transceiver to activate wireless operations.

Status

The status register is a read-only register that notifies the Host of an asynchronous event that needs to be serviced. In one embodiment, any bit in the state of logic '1' indicates that the event associated with the bit needs to be serviced. Whenever any bit is non-zero, the hardware interrupt pin to the Host will also assert. In one embodiment, status registers cannot be cleared by the Host by writing to this register. Bits in this register can only be cleared by writing to the Clear register (0x06). FIG. 90 illustrates a field description of Status register. Fields in the Host Controls may be set as follows:

RX_READY—'1' indicates that data in the RX registers needs to be serviced by Host.
TX_DONE—'1' indicates that transceiver finished servicing data in TX registers.
INPUT_FORMAT_RXD—'1' indicates that the transceiver finished receiving Input Format information from a remote Sink device and it is now ready in the register space. Applies only to Source. Sink reserves this bit.
DEVCAP_RXD—'1' indicates that the transceiver received an update to device capabilities list.
WIHD_ON—'1' indicates that the transceiver finished initializing WiHD and is fully operational.
CHIP_LOAD—'1' indicates that the transceiver finished reset sequence and is ready to accept commands. When this bit is asserted, the host should read register 0x07 to detect any system issues.

Clear

The Clear register is a write-only register which allows the Host to clear interrupt sources listed in register 0x05, the status register. FIG. 91 illustrates a field description of Clear register. Fields in the Host Controls may be set as follows:

CLR_RX_READY—'1' clears RX_READY bit (register 0x05).
CLR_TX_DONE—'1' clears TX_DONE bit (register 0x05).
CLR_INPUT_FMT_RXD—'1' clears INPUT_FORMAT_RXD bit (register 0x05).
CLR_DEVCAP_RXD—'1' clears DEVCAP_RXD bit (register 0x05).
CLR_WIHD_ON—'1' clears WIHD_ON bit (register 0x05).
CLR_WIHD_LOAD—'1' clears WIHD_ONLINE bit (register 0x05).

System Status

The system status register is a read-only register that notifies the Host of any system level failures. Whenever a failure occurs, the system will assert the "WiHD Load" bit in the status (0x05) register. At that time, the Host monitors the system status register for additional details. FIG. 92 illustrates a field description of System status register. Fields in the Host Controls may be set as follows:

MEMORY_FAILURE—'1' indicates that a memory failure has occurred.
AVC_FAILURE—'1' indicates that an error occurred in the AVC subsystem.
MAC_FAILURE—'1' indicates that an error occurred in the MAC subsystem.
RADIO_FAILURE—'1' indicates that an error occurred in the radio hardware.
DRIVER_FAILURE—'1' indicates that an error occurred in a peripheral driver.

Devcap Table

The devcap table is constructed of three 64-bit bitmaps which provide information on the device list stored within the transceiver hardware. The Host can use the information contained in these bitmaps to determine which devices, if any, to filter in obtaining device capabilities information of remote devices. FIG. 93 illustrates a Bit-map layout of Devcap HRRX registers.

Each time a "DEVCAP RXD" interrupt occurs, the Host reads registers 0x08-0x0F to obtain the device index of all wireless devices capable of receiving high-rate data. This bit-map indicates a logic '1' for each of the 64 entries in the device list of the transceiver which are HRRX capable. For example, if the 64-bit map was read as, "0x0000000000080014", this immediately indicates that there are 3 valid entries in the device list. The entries correspond to index 19, 4, and 2 of the transceiver's internal device list. If the Host needs to obtain the device capabilities for any of these entries, requests this information from the transceiver using the packet registers. FIG. 94 illustrates a Bit-map layout of Devcap HRTX registers.

The registers (0x10-0x17) can be used to determine which device indices are HRTX capable. This bit-map will indicate a logic '1' for each of the 64 entries in the device list of the transceiver which are HRTX capable. Note, this bit-map needs to be used in conjunction with the "Devcap HRRX" bit-map. It is possible for a device index to represent a device capable of both HRRX and HRTX. FIG. 95 illustrates a Bit-map layout of Device Index registers.

The registers (0x18-0x1F) indicate all devices in the network regardless of whether it is HRTX capable, HRRX capable, both, or neither. This table is useful when a host is trying to ascertain the general state of the wireless network or when looking for devices that include systems that have neither HRTX or HRRX capabilities.

In one embodiment, the devcap table is a particularly important array since addressing any device on the wireless network is based on the index entry in the devcap table array. For example, if there are three devices discovered on the wireless network, three corresponding entries will be flagged in the devcap table. In order to address any of those devices, the host system must use the index into the table to address that specific device.

Wireless Control
Reserved
SoC S/W Version

The SoC system software which resides on the digital chip of the WirelessHD radio makes its version available for read access. FIG. 96 illustrates the SoC version label resides in the Control register bank (0xA4), offsets 0xF7-0xFB. FIG. 97 illustrates a Bit-description of register 0xF7.

System Tick

The System Tick registers are comprised of four registers that are concatenated to form a 32-bit system clock value of the transceiver. This value is stored as a little-endian value with the least significant byte residing in register 0xFC and the most significant byte residing in register 0xFF. FIG. 98 illustrates System Tick registers reside in the Control register bank (0xA4), offsets 0xFC-0xFF. The tick registers are updated approximately every half-second. It is useful for diagnostics and also can be used as a system heartbeat monitor.

Receive (0xA8/0xB8)/Transmit (0xAC/0xBC) Bank

The receive/transmit register space is a 256 byte region that is provided to the host as a receive buffer. That is, when the transceiver needs to send packetized information to the Host, it places the packet in this register space and asserts a control flag to the Host. The format of this register space has the capability to handle fragmented data. This makes the use of this register space versatile providing a wide range of possible applications. FIG. 99 illustrates a Register space format of receiver. These registers are described in more detail below.

Bus ID

The Bus ID indicates the recipient application to receive the payload message. Though a major purpose of the TX/RX register banks is to convey AVC messages, the format has been designed for generic use. In one embodiment, bus ID definitions are as follows:

GENERIC BUS=0x00
AVC BUS=0x01
MAC BUS=0x02
DEBUG BUS=0x04

Length

The length field indicates the total number of payload bytes in this message. Due to header/checksum overhead, the maximum number of bytes possible is 252 bytes.

Sequence ID

The sequence field (address 0x02), which is a byte, is divided into two sections, a frame identifier and a sequence number as shown in FIG. 100. The frame identifier indicates which frame of a fragment this packet is associated with. The sequence identifier indicates the sequential order of the fragment. These two fields allow a recipient to reconstruct fragmented data. In one embodiment, the fields may be set as follows:

FRAME—'00'=first fragment
'01'=middle fragment
'10'=last fragment
'11'=no fragment SEQUENCE—indicates the sequential order of the fragmented data. Note that if a frame identifier of a packet is '11' (no fragment) this field is 'don't care'.

Payload

The payload data is application specific information. The I²C layer simply forwards this data.

Checksum

The checksum is a simple 8-bit checksum of the entire payload region of the packet. For example, if the payload data is: 0x1122334455667788, the checksum of this data is 0x65. The location of the checksum byte is at the end of the payload data.

Description of AVC Messages

The following contains a description of all AVC messages that can be issued by a host to the radio transceiver in one embodiment. The expected response, timeout scenario, and failure cases are described for each message.

Device Discovery Messages

Device Capabilities Request

Figure 101:
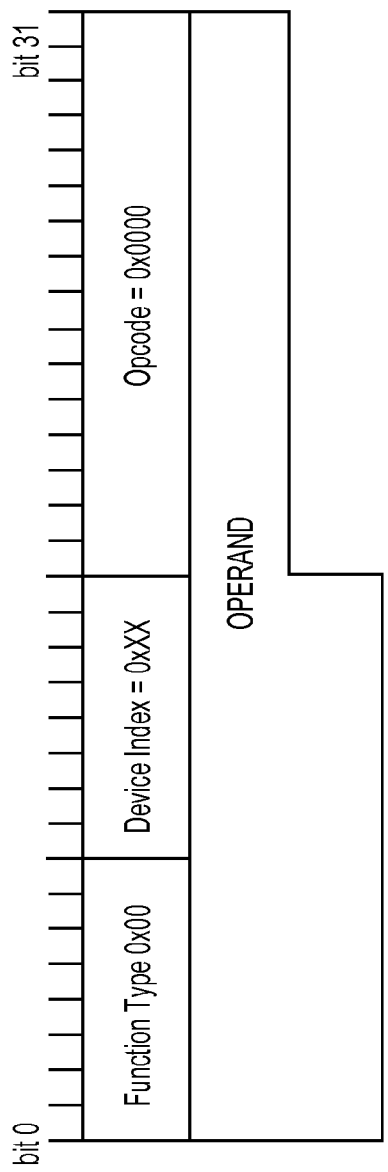
FIG. 101 illustrates a Device Capabilities Message.

FIG. 101 illustrates a device capabilities message. This command issues a request to obtain capabilities information from a remote WirelessHD compliant device.

Input Parameters:

Function Type—Indicates the function type of the opcode. This value is '0x00' to indicate the Connection Control function type.

Device Index—Indicates the device index to request capabilities for.

Opcode—The opcode corresponding to Capabilities Request. This value must be 0x0000 for Capabilities Request.

Figure 102:
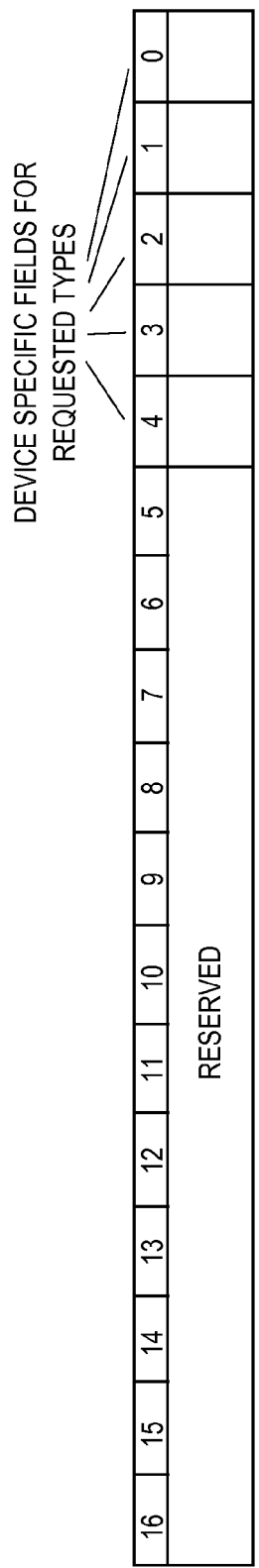
FIG. 102 illustrates a Requested Types bit-field.

Requested Types—The requested types is a bit-field that indicates which capabilities should be provided by the remote device. By asserting one or more of the bits in this bit-field, the host can requested specific capabilities information from a remote device. The remote device will package the requested information in a series of "type-length-value" (TLV) packets which are packaged in the "Capabilities Response" message. FIG. 102 illustrates field locations for the Requested Types bit-field.

Total Length—Indicates the total number of octets used by the Capabilities Request message to send "type-length-value" (TLV) data. Currently, this is a reserved feature so this value should be set to "0".

Expected Response:

The expected response to this message is a Capabilities Response message. The remote host does not need to generate the Capabilities Response message since the transceiver on the remote side has already obtained all the necessary information from the host during the initialization process.

Figure 103:
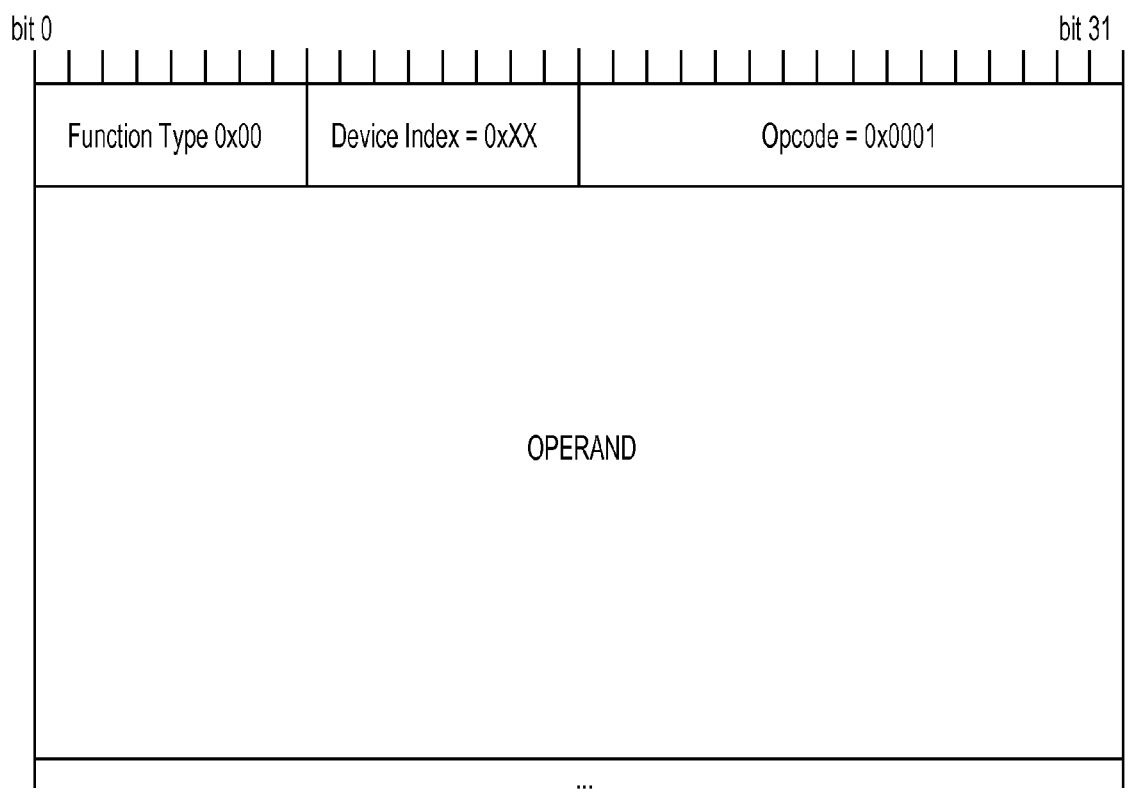
FIG. 103 illustrates a Capabilities Response message.

FIG. 103 illustrates a capabilities response message. The parameters of the message are:

Function Type—Indicates the function type of the opcode. This value is '0x00' to indicate the Connection Control function type.

Device Index—Indicates the device index of the sender of the Capabilities Response message.

Opcode—The opcode corresponding to Capabilities Response. In one embodiment, this value is 0x0001.

Total Length—Indicates the total number of octets used by the Capabilities Response message to send "type-length-value" (TLV) data.

Type-Length-Value packets—A series of "type-length-value" packets are appended to the end of the Capabilities Response message. These correspond to the "Requested Types" field in the Capabilities Request message. The numerical value of the "type" corresponds to the bit position of the requested type shown in FIG. 102. For example, the type value "2" corresponds to MAC address whereas a type value of "3" corresponds to Input Format.

Figure 104:
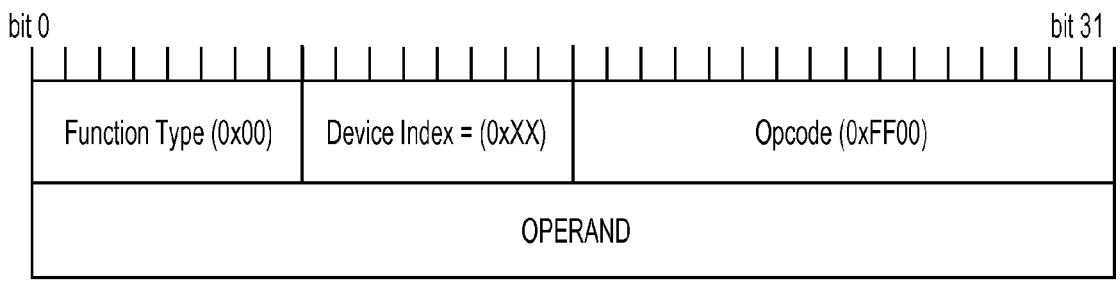
FIG. 104 illustrates a Feature Abort message indicating a failure to obtain Capabilities Request information.

Timeout:

For a properly formatted Capabilities Request message, the transceiver responds with a Capabilities Response almost immediately. If, for some reason, the transceiver is unable to obtain the capabilities of the remote device, a Feature Abort message will be generated and sent to the host indicating a timeout. FIG. 104 illustrates a Feature Abort message indicating a failure to obtain Capabilities Request information. The parameters of the message are:

Function Type—Indicates the function type of the opcode. This value is '0x00' to indicate the Connection Control function type.

Device Index—Indicates the device index of the remote unit that Capabilities are being requested from.

Opcode—The opcode corresponding to the Feature Abort message. This value is 0xFF00.

Rejected Opcode—The opcode of the message that failed. In this case, the Capabilities Request has failed, so the value is 0x0000.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued.

Invalid Operand (0x04)—If the device index or requested types field is invalid, a Feature Abort message with this reason code will be issued.

Connection Control Messages

Connect Request

Figure 105:
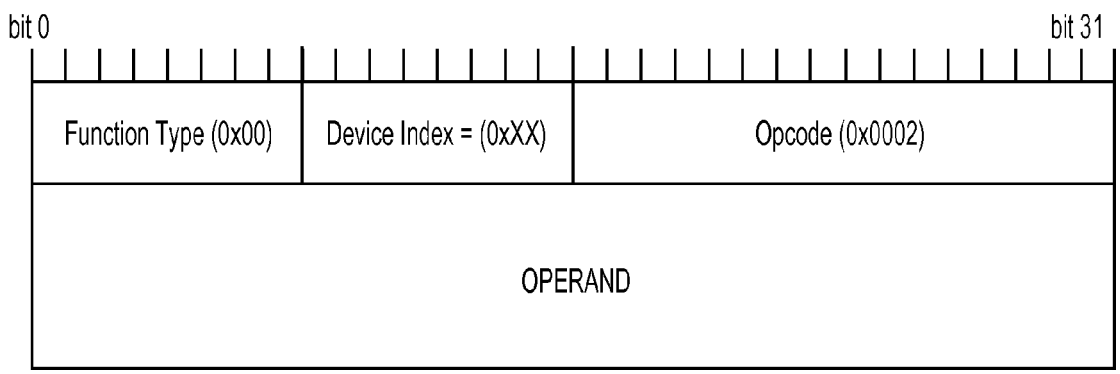
FIG. 105 illustrates a Connect Request message.

FIG. 105 illustrates a Connect Request message. This command issues a request to establish a streaming connection to a remote WirelessHD compliant device.

Input Parameters:

Function Type—Indicates the function type of the opcode. This value is '0x00' to indicate the Connection Control function type.

Device Index—Indicates the device index to connect to.

Opcode—The opcode corresponding to Connect Request. This value is 0x0002.

Port—The port is the local identifier on the local host that the remote device must connect to. The host can use any scheme to assign local identifiers. Port numbering becomes critical in systems that can support multiple streams simultaneously.

VP—Indicates that the port identified in this message will carry video data.

AP—Indicates that the port identified in this message will carry audio data.

S—Indicates that the port identified in this message will function as a sink device.

RF—Indicates that the source device in this connection needs the Input Format information to be sent from the sink.

Total Length—Indicates the total number of octets used by the Connect Request message to send "type-length-value" (TLV) data. Currently, this is a reserved feature so this value should be set to "0".

Expected Response:

The expected response to this message is a Connect Response message. This message is described in detail above.

Figure 106:
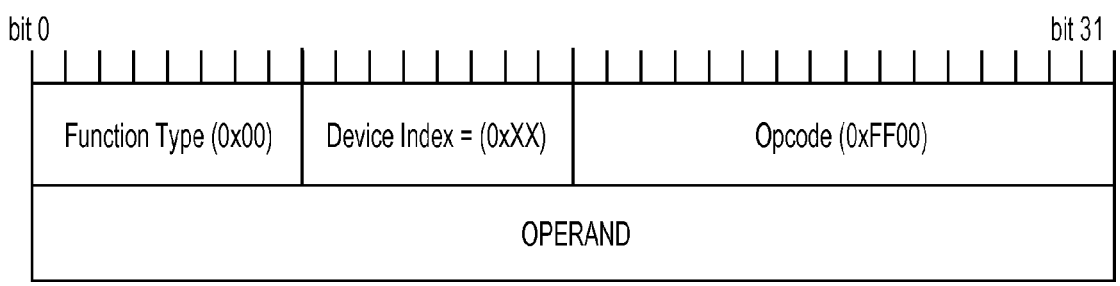
FIG. 106 illustrates a Feature Abort message indicating a failure to obtain a Connect Response.

Timeout:

For a properly formatted Connect Request message, the transceiver should responds with a Connect Response message. If, for some reason, the transceiver is unable to obtain the response of the remote device, a Feature Abort message will be generated and sent to the host indicating a timeout. FIG. 106 illustrates a Feature Abort message indicating a failure to obtain a Connect Response. Its parameters are:

Function Type—Indicates the function type of the opcode. This value is '0x00' to indicate the Connection Control function type.

Device Index—Indicates the device index of the remote unit that a connection is being attempted on.

Opcode—The opcode corresponding to the Feature Abort message. This value is 0xFF00.

Rejected Opcode—The opcode of the message that failed. In this case, the Connect Request has failed, so the value is 0x0002.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued.

Invalid Operand (0x04)—If the device index field is invalid, a Feature Abort message with this reason code will be issued.

Connect Response

Figure 107:
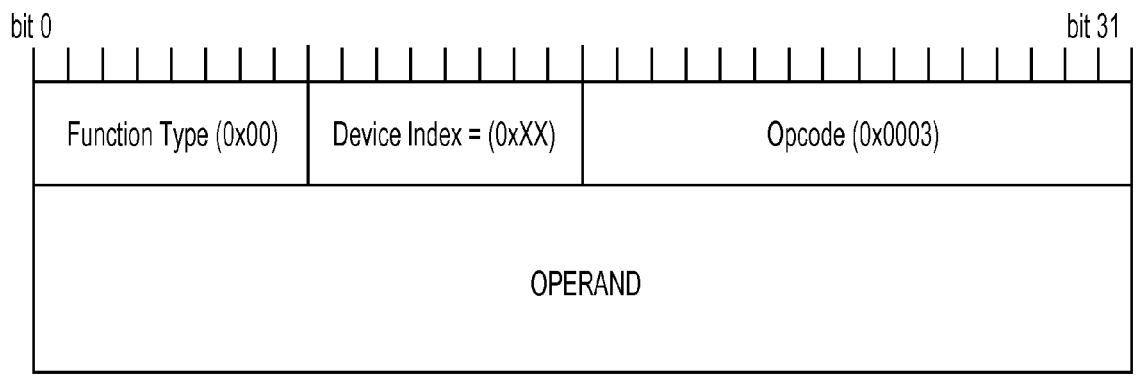
FIG. 107 illustrates a Connect Response message.

FIG. 107 illustrates a Connect Response message. This command issues a confirmation response to establish a streaming connection to a remote WirelessHD compliant device. This message is only sent in response to a Connect Request message.

Input Parameters:

Function Type—Indicates the function type of the opcode. This value is '0x00' to indicate the Connection Control function type.

Device Index—Indicates the device index to send response to.

Opcode—The opcode corresponding to Connect Response. This value is 0x0003.

Result Code—This field indicates the result of the connection request. A value of "0" indicates success, whereas "1" indicates failure.

Port—There are two ports associated with any connection—the logical port on the sink and the logical port of the source device. If the remote device indicated that the remote device is the sink device via the Connect Request message, then the recipient of the Connect Request message should serve as the Source for this connection sequence. As a result, the Port specified in the Connect Request message should be returned in the Connect Response as the Sink Port, and a numeric identifier should be generated by the local device as the Source Port.

VP—Indicates that the port identified in this message will carry video data.

AP—Indicates that the port identified in this message will carry audio data.

RF—Indicates that the source device in this connection needs the Input Format information to be sent from the sink.

Total Length—Indicates the total number of octets used by the Connect Response message to send "type-length-value" (TLV) data. Currently, this is a reserved feature so this value should be set to "0".

Expected Response:

None. No response is explicitly expected in response to a Connect Response message.

Figure 108:
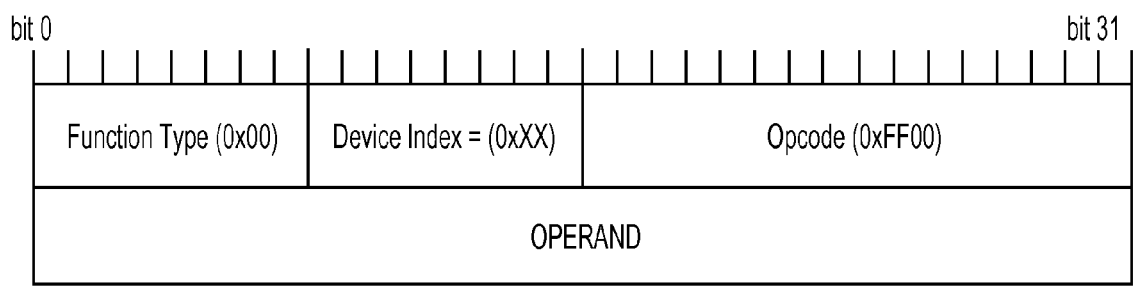
FIG. 108 illustrates a Feature Abort message indicating a failure to send the Connect Response.

Timeout:

For a properly formatted Connect Response message, the transceiver should not need to provide any further feedback to the host to indicate a success condition. If, for some reason, the transceiver is unable to send the message to the destination, a Feature Abort message will be generated and sent to the host indicating a timeout. FIG. 108 illustrates a Feature Abort message indicating a failure to send the Connect Response. Its parameters are as follows:

Function Type—Indicates the function type of the opcode. This value is '0x00' to indicate the Connection Control function type.

Device Index—Indicates the device index of the remote unit that the message is being sent to.

Opcode—The opcode corresponding to the Feature Abort message. This value is 0xFF00.

Rejected Opcode—The opcode of the message that failed. In this case, the Connect Response has failed, so the value is 0x0003.

Reason Code—This field will provide an indication of why the message has failed. In this case, a reason code of 0x06 will be issued to denote a timeout.

Failure Case Response:

A failure will be indicated by the transceiver with a Feature Abort message. The three possible causes of failure correspond to the following reason codes:

Not in correct mode to respond (0x02)—If the message was sent before the transceiver was initialized, a Feature Abort message with this reason code is issued.

Invalid Operand (0x04)—If the device index field is invalid, a Feature Abort message with this reason code will be issued.

Out of Sequence (0x07)—If the Connect Response is sent to a recipient that has not issued a Connect Request, the Out of Sequence reason code will be sent to the host.

Output Format Request

Figure 109:
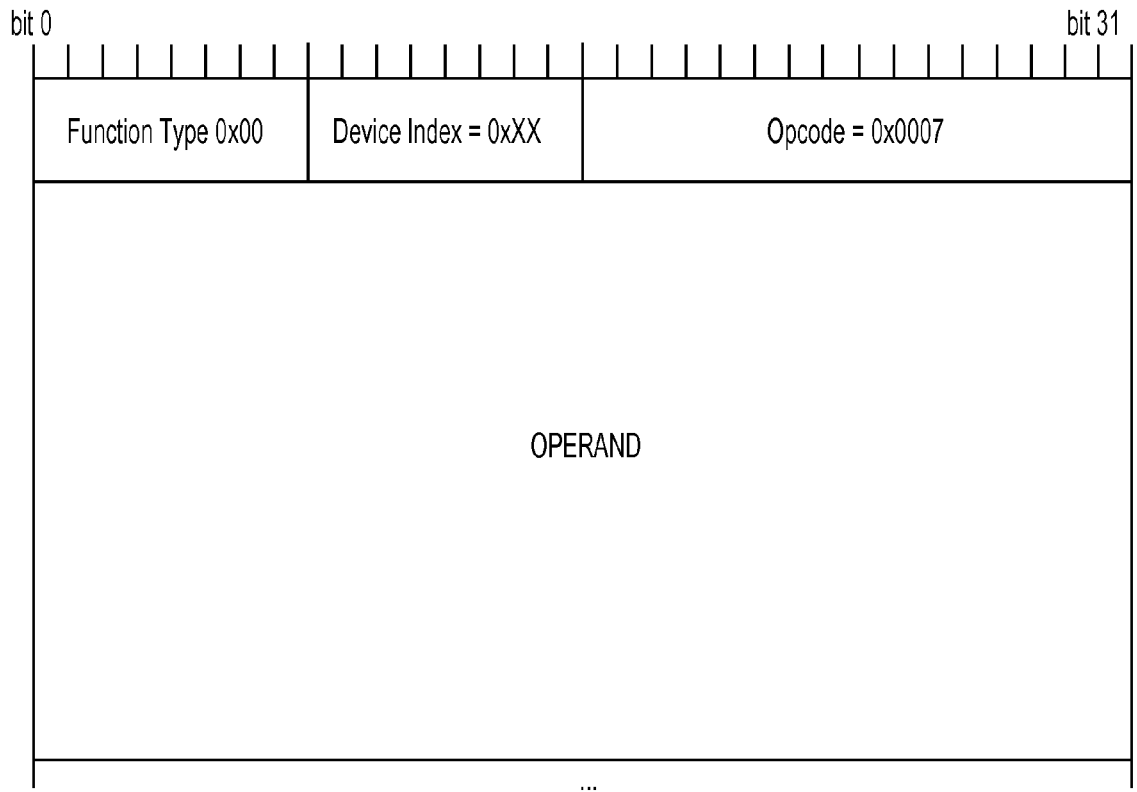
FIG. 109 illustrates an Output Format Request message.

FIG. 109 illustrates an Output Format Request message. This command issues a request to the transceiver to obtain wireless bandwidth to begin streaming data. This message is only valid from the Source device.

Input Parameters:

Function Type—Indicates the function type of the opcode. This value is '0x00' to indicate the Connection Control function type.

Device Index—Indicates the device index to establish stream to.

Opcode—The opcode corresponding to the Output Format Request message. This value must be 0x0007.

Result Code—This field is unused for the Output Format Request.

Port—There are two ports associated with any connection—the logical port on the Sink and the logical port of the Source device. The values of these fields and the determination of which device will perform Sink vs. Source role has already been established during the Connect Request/Response. This message must use values that were established at the time of the Connect Request/Response messages.

VP—Indicates that the port identified in this message will carry video data.

AP—Indicates that the port identified in this message will carry audio data.

Total Length—Indicates the total number of octets used by the Output Format Request message to send "type-length-value" (TLV) data. As per the WirelessHD specification, the host needs to send video and/or audio information to the transceiver so that it can determine the appropriate bandwidth to reserve on the wireless channel.

Expected Response:

There are two responses that follow the Output Format Request message. The first is the Output Format Response message. This message will indicate whether the corresponding bandwidth associated with the request can be obtained. The result code will indicate success (0) or failure (1). If the bandwidth reservation fails, the host must issue a new Output Format Request to attempt to reserve stream bandwidth. In order to increase the likelihood of success, the host may need to request lower resolution video or decreased resolution in audio.

Figure 110:
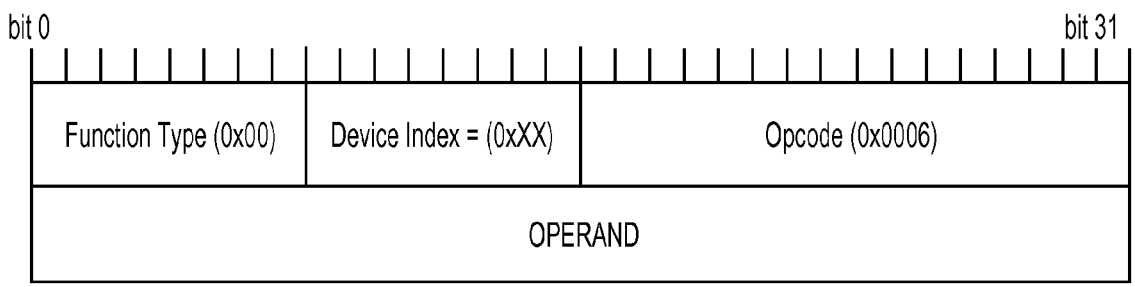
FIG. 110 illustrates an Output Format Response message.

FIG. 110 illustrates an Output Format Response message. Its parameters are:

Function Type—Indicates the function type of the opcode. This value is '0x00' to indicate the Connection Control function type.

Device Index—Indicates the device index of the remote device to which a stream is being established.

Opcode—The opcode corresponding to Output Format Response. This value is 0x0008.

Result Code—This field indicates the result of the Output Format Request. A value of "0" indicates success, whereas "1" indicates failure.

Port—There are two ports associated with any connection—the logical port on the Sink and the logical port of the Source device. he values of these fields and the determination of which device will perform Sink vs. Source role has already been established during the Connect Request/Response. This message must use values that were established at the time of the Connect Request/Response messages.

VP—Indicates that the port identified in this message will carry video data.

AP—Indicates that the port identified in this message will carry audio data.

Once the transceiver determines that sufficient bandwidth exists in order to establish a stream, the actual reservation process will be executed. When this successfully completes, a Stream Start message will be generated by the transceiver and sent to the host on both sides of the connection.

Figure 111:
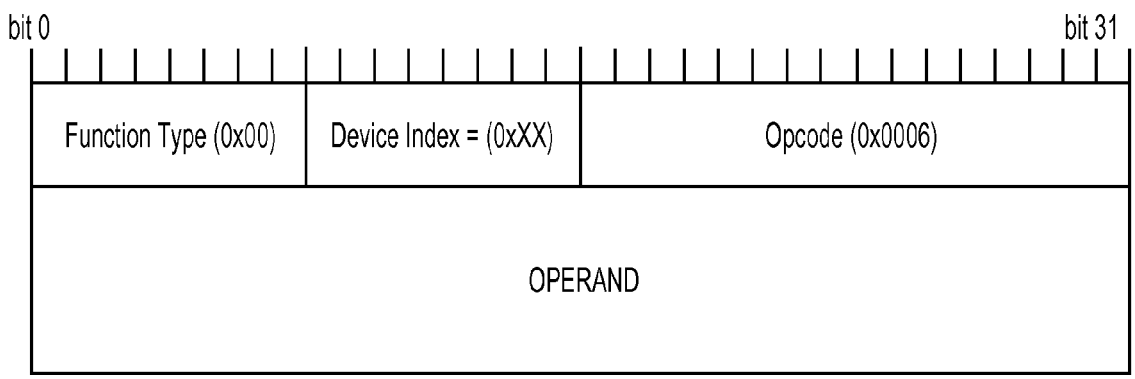
FIG. 111 illustrates a Stream Start Notify message.

FIG. 111 illustrates a Stream Start Notify message. Its parameters are:

Function Type—Indicates the function type of the opcode. This value is '0x00' to indicate the Connection Control function type.

Device Index—Indicates the device index of the remote device to which a stream is being established.

Opcode—The opcode corresponding to Stream Start Notify. This value is 0x0005.

Result Code—This field indicates the result of the Stream Start Notify message. A value of "0" indicates success, whereas "1" indicates failure.

Stream Index—The transceiver assigns every stream with a unique index. This can be used by the host to uniquely identify the active streams, particularly if the host is capable of supporting multiple streams.

Port—There are two ports associated with any connection—the logical port on the Sink and the logical port of the source device. The values of these fields and the determination of which device will perform sink vs. source role has already been established during the Connect Request/Response. This message must use values that were established at the time of the Connect Request/Response messages.

VP—Indicates that the port identified in this message will carry video data.

AP—Indicates that the port identified in this message will carry audio data.

Total Length—Indicates the total number of octets used by the Stream Start Notify message to send "type-length-value" (TLV) data. Currently, this is a reserved feature so this value should be set to "0".

In general, the Stream Start message will not fail since it implies that the Output Format Request succeeded. Though unlikely, it is possible that the Output Format Request succeeds but then bandwidth becomes unavailable due to an unexpected reason. Should this occur, the Stream Start message will fail (via Result Code). If this happens, the host issues a new Output Format Request message.

Timeout:

None. A timeout does not exist for the Output Format Request message. A response will be available upon performing a bandwidth check.

Failure Case Response:

A failure will be indicated by the transceiver with a Feature Abort message. The three possible causes of failure correspond to the following reason codes:

Not in correct mode to respond (0x02)—If the message was sent before the transceiver was initialized, a Feature Abort message with this reason code will be issued.

Invalid Operand (0x04)—If the device index field is invalid, a Feature Abort message with this reason code will be issued. This message is also generated if the Port and VP/AP information does not match the values that were set during the Connect Request/Response dialogue.

Out of Sequence (0x07)—If the Output Format Request message is sent by a device that is not the source, or is sent by a source that has not successfully undergone the Connect Request/Response dialogue, the Out of Sequence reason code is sent to the host.

Disconnect Notify

Figure 112:
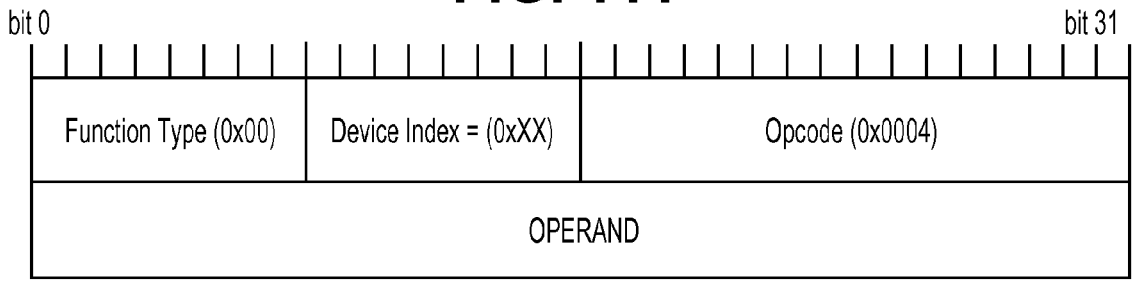
FIG. 112 illustrates a Disconnect Notify message.

FIG. 112 illustrates a Disconnect Notify message. This command notifies the remote device that the stream needs to be terminated.

Input Parameters:

Function Type—Indicates the function type of the opcode. This value is '0x00' to indicate the Connection Control function type.

Device Index—Indicates the device index to notify.

Opcode—The opcode corresponding to the Disconnect Notify message. This value is 0x0004.

Port—There are two ports associated with any connection—the logical port on the sink and the logical port of the source device. The values of these fields and the determination of which device will perform sink vs. source role has already been established during the Connect Request/Response. This message must use values that were established at the time of the Connect Request/Response messages.

VP—Indicates that the port identified in this message will carry video data.

AP—Indicates that the port identified in this message will carry audio data.

Figure 113:
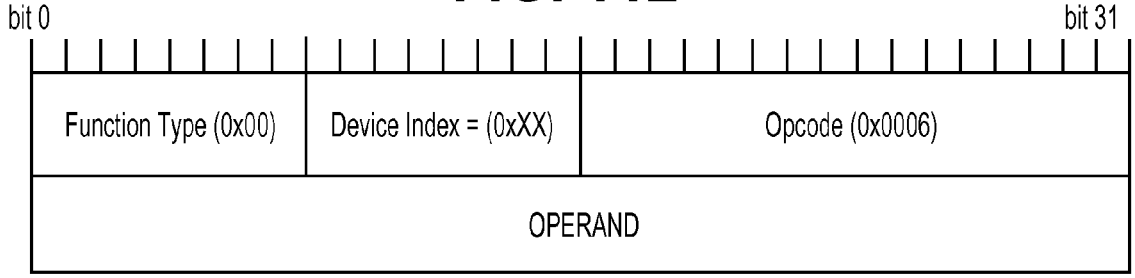
FIG. 113 illustrates a Stream Stop message.

Expected Response:

The expected response of the Disconnect Notify message is the Stream Stop message. This message is not generated by the remote host, but is issued by the transceivers once the streams are terminated. FIG. 113 illustrates a Stream Stop message. Its parameters are:

Function Type—Indicates the function type of the opcode. This value is '0x00' to indicate the Connection Control function type.

Device Index—Indicates the device index of the remote device to which a stream is being established.

Opcode—The opcode corresponding to Stream Stop message. This value is 0x0006.

Result Code—This field indicates the result of the Stream Stop message. A value of "0" indicates success, whereas "1" indicates failure.

Stream Index—The unique stream index was assigned during the Stream Start process. If the host was tracking the active streams using this index, it can be used here to perform any necessary cleanup associated with this stream.

Port—There are two ports associated with any connection—the logical port on the sink and the logical port of the source device. These fields and which device will perform sink vs. source role have already been established during the Connect Request/Response. This message must use values that were established at the time of the Connect Request/Response messages.

VP—Indicates that the port identified in this message will carry video data.

AP—Indicates that the port identified in this message will carry audio data.

Figure 114:
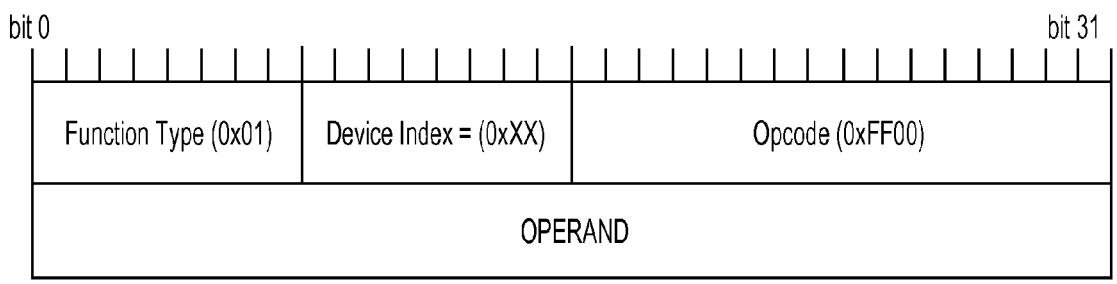
FIG. 114 illustrates a Feature Abort message indicating a failure to send the Disconnect Notify.

Timeout:

For a properly formatted Disconnect Notify message, the transceiver does not provide any further feedback to the host to indicate a success condition. If, for some reason, the transceiver is unable to send the message to the destination, a Feature Abort message will be generated and sent to the host indicating a timeout. FIG. 114 illustrates a Feature Abort message indicating a failure to send the Disconnect Notify. Its parameters are:

Function Type—Indicates the function type of the opcode. This value is '0x00' to indicate the Connection Control function type.

Device Index—Indicates the device index of the remote unit that the message is being sent to.

Opcode—The opcode corresponding to the Feature Abort message. This value is 0xFF00.

Rejected Opcode—The opcode of the message that failed. In this case, the Disconnect Notify has failed, so the value is 0x0004.

Reason Code—This field will provide an indication of why the message has failed. In this case, a reason code of 0x06 will be issued to denote a timeout.

Failure Case Response:

A failure will be indicated by the transceiver with a Feature Abort message. The three possible causes of failure correspond to the following reason codes:

Not in correct mode to respond (0x02)—If the message was sent before the transceiver was initialized, a Feature Abort message with this reason code will be issued.

Invalid Operand (0x04)—If the device index field is invalid, a Feature Abort message with this reason code will be issued. This message will also be generated if the Port and VP/AP information does not match the values that were set during the Connect Request/Response dialogue.

Out of Sequence (0x07)—If the Disconnect Notify message is sent by a host that is not currently connected, the Out of Sequence abort message will be issued.

Device Control Messages

Figure 115:
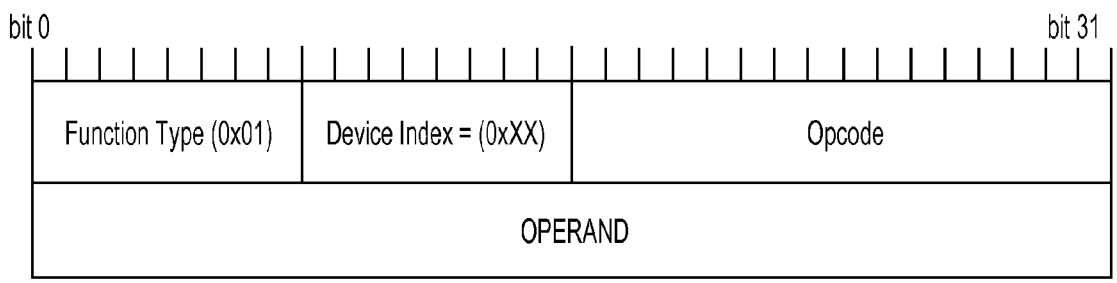
FIG. 115 illustrates Device Control messages.

FIG. 115 illustrates a Device Control message. Device Control commands are largely treated as pass-through messages by the transceiver.

Input Parameters:

Function Type—Indicates the function type of the opcode. This value is '0x01' to indicate the Device Control function type.

Device Index—Indicates the device index to send message to.

Opcode—The opcode corresponding to the specific Device Control message to be sent. The WirelessHD specification provides greater details on the available commands.

Param—The parameters associated with a specific Device Control message.

Expected Response:

None. It is possible for specific Device Control messages to have

Figure 116:
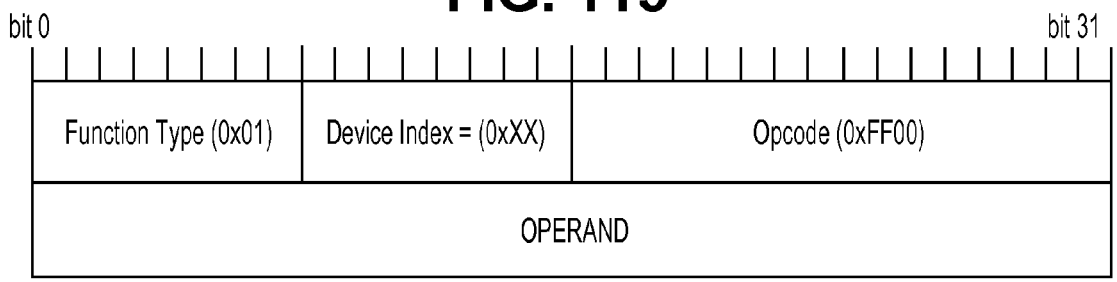
FIG. 116 illustrates a Feature Abort message indicating a failure of a Device Control message.

Timeout:

For a properly formatted Device Control message, the transceiver does not provide any further feedback to the host to indicate a success condition. If, for some reason, the transceiver is unable to send the message to the destination, a Feature Abort message will be generated and sent to the host indicating a timeout. FIG. 116 illustrates a Feature Abort message indicating a failure of a Device Control message. Its parameters are:

Function Type—Indicates the function type of the opcode. This value is '0x01' to indicate the Device Control function type.

Device Index—Indicates the device index of the remote unit that the message is being sent to.

Opcode—The opcode corresponding to the Feature Abort message. This value is 0xFF00.

Rejected Opcode—The opcode of the message that failed.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued.

Invalid Operand (0x04)—If the device index field is invalid, a Feature Abort message with this reason code will be issued.

HDMI Pass-Through Messages

HDMI Pass-Through Request

Figure 117:
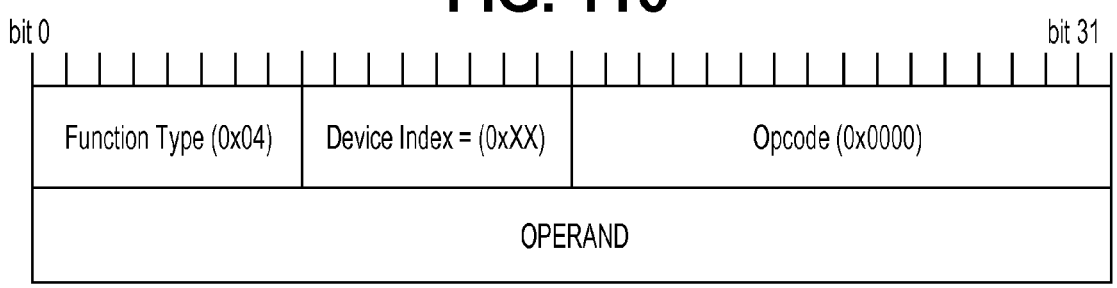
FIG. 117 illustrates a HDMI Pass-Through Request message.

FIG. 117 illustrates a HDMI Pass-Through Request message. This command issues a request to provide a pass-through connection of HDMI messages between two WirelessHD compliant devices.

Input Parameters:

Function Type—Indicates the function type of the opcode. This value is '0x04' to indicate the HDMI Pass-Through function type.

Device Index—Indicates the device index to enable an HDMI Pass-Through link.

Opcode—The opcode corresponding to the HDMI Pass-Through Request. This value must be 0x0000.

PT—Indicates whether to enable (1) or disable (0) Pass-Through.

Expected Response:

The expected response to this message is an HDMI Pass-Through Response message. This message is described in detail further below.

Figure 118:
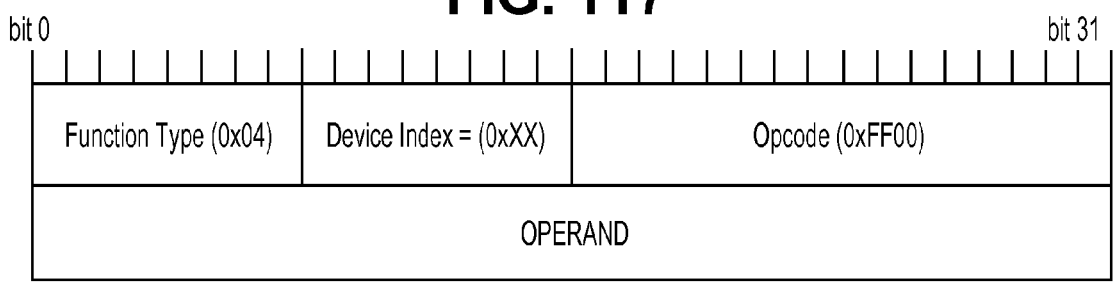

Timeout:

For a properly formatted HDMI Pass-Through Request message, the transceiver should respond with a HDMI Pass-Through Response message. If, for some reason, the transceiver is unable to obtain the response of the remote device, a Feature Abort message will be generated and sent to the host indicating a timeout. FIG. 118 illustrates a Feature Abort message indicating a failure to obtain an HDMI Pass-Through Response. Its parameters include:

Function Type—Indicates the function type of the opcode. This value is '0x04' to indicate the HDMI Pass-Through function type.

Device Index—Indicates the device index of the remote unit that the Pass-Through message could not be sent to.

Opcode—The opcode corresponding to the Feature Abort message. This value is 0xFF00.

Rejected Opcode—The opcode of the message that failed. In this case, the HDMI Pass-Through Request has failed, so the value is 0x0000.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued.

Invalid Operand (0x04)—If the device index field is invalid, a Feature Abort message with this reason code will be issued.

HDMI Pass-Through Response

Figure 119:
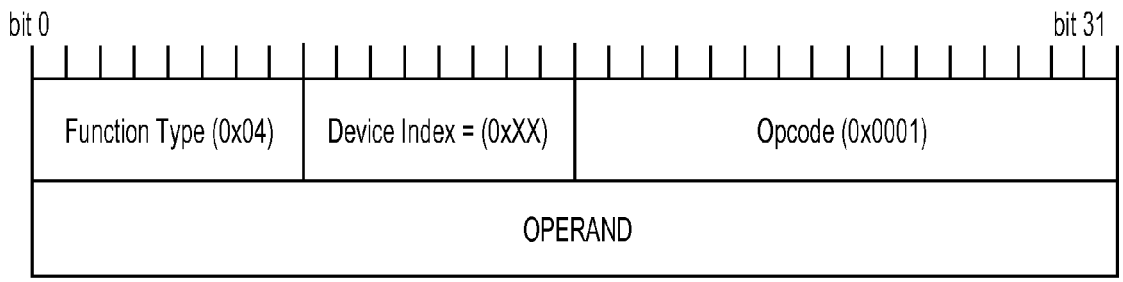

FIG. 119 illustrates an HDMI Pass-Through Response message. This command issues a confirmation response to establish a pass-through connection of HDMI messages between two WirelessHD compliant device. This message is only sent in response to an HDMI Pass-Through Request message.

Input Parameters:

Function Type—Indicates the function type of the opcode. This value is '0x04' to indicate the HDMI Pass-Through function type.

Device Index—Indicates the device index to issue a response.

Opcode—The opcode corresponding to the HDMI Pass-Through Response. This value is 0x0001.

Result Code—This field indicates the result of the HDMI Pass-Through request. A value of "0" indicates success, whereas "1" indicates failure.

Expected Response:

None. No response is explicitly expected in response to a HDMI Pass-Through Response message.

Figure 120:
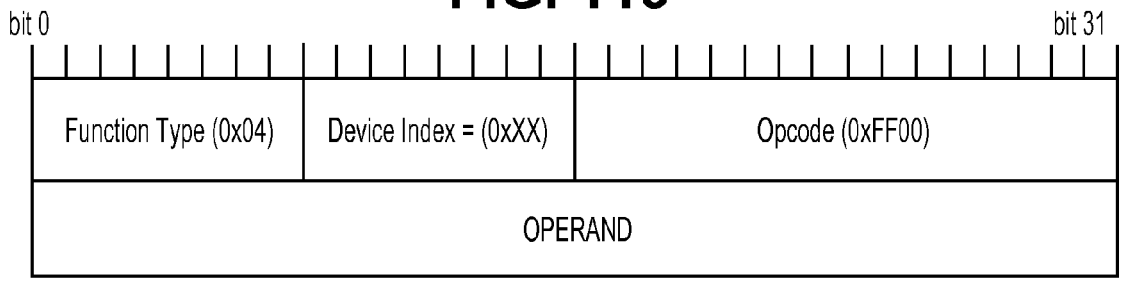

Timeout:

For a properly formatted HDMI Pass-Through Response message, the transceiver does not provide any further feedback to the host to indicate a success condition. If, for some reason, the transceiver is unable to send the message to the destination, a Feature Abort message will be generated and sent to the host indicating a timeout. FIG. 120 illustrates a Feature Abort message indicating a failure to send the HDMI Pass-Through Response. Its parameters are:

Function Type—Indicates the function type of the opcode. This value is '0x04' to indicate the HDMI Pass-Through function type.

Device Index—Indicates the device index of the remote unit that the original message was being sent to.

Opcode—The opcode corresponding to the Feature Abort message. This value is 0xFF00.

Rejected Opcode—The opcode of the message that failed. In this case, the HDMI Pass-Through Response has failed, so the value is 0x0001.

Reason Code—This field will provide an indication of why the message has failed. In this case, a reason code of 0x06 will be issued to denote a timeout.

Failure Case Response:

A failure will be indicated by the transceiver with a Feature Abort message. The three possible causes of failure correspond to the following reason codes:

Not in correct mode to respond (0x02)—If the message was sent before the transceiver was initialized, a Feature Abort message with this reason code will be issued.

Invalid Operand (0x04)—If the device index field is invalid, a Feature Abort message with this reason code will be issued.

Out of Sequence (0x07)—If the HDMI Pass-Through Response is sent to a recipient that has not issued a HDMI Pass-Through Request, the Out of Sequence reason code will be sent to the host.

EDID Request

Figure 121:
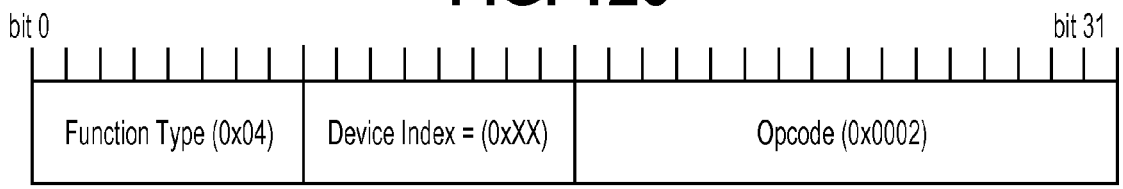

FIG. 121 illustrates a DID Request message. This command issues a request for EDID information from a Sink device.

Input Parameters:

Function Type—Indicates the function type of the opcode. This value is '0x04' to indicate the HDMI Pass-Through function type.

Device Index—Indicates the device index to request EDID information from.

Opcode—The opcode corresponding to the HDMI Pass-Through Request. This value is 0x0002.

Expected Response:

The expected response to this message is an EDID Response message. This message is described in detail in section 0.

Figure 122:
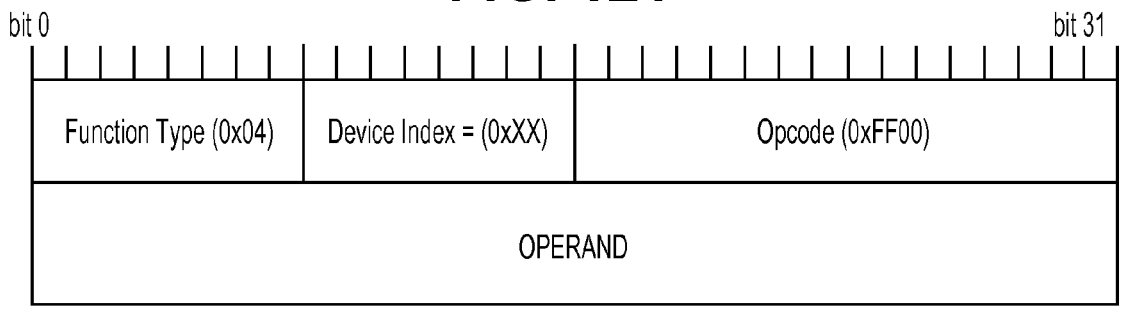

Timeout:

For a properly formatted EDID Request message, the transceiver should respond with an EDID Response message. If, for some reason, the transceiver is unable to obtain the response of the remote device, a Feature Abort message will be generated and sent to the host indicating a timeout. FIG. 122 illustrates a Feature Abort message indicating a failure to obtain an EDID Response. Its parameters are:

Function Type—Indicates the function type of the opcode. This value is '0x04' to indicate the HDMI Pass-Through function type.

Device Index—Indicates the device index of the remote unit that the Pass-Through message could not be sent to.

Opcode—The opcode corresponding to the Feature Abort message. This value is 0xFF00.

Rejected Opcode—The opcode of the message that failed. In this case, the EDID Request has failed, so the value is 0x0002.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued. This message will also be issued if the appropriate Pass-Through Request/Response handshake has not been established between the two devices.

Invalid Operand (0x04)—If the device index field is invalid, a Feature Abort message with this reason code will be issued.

EDID Response

Figure 123:
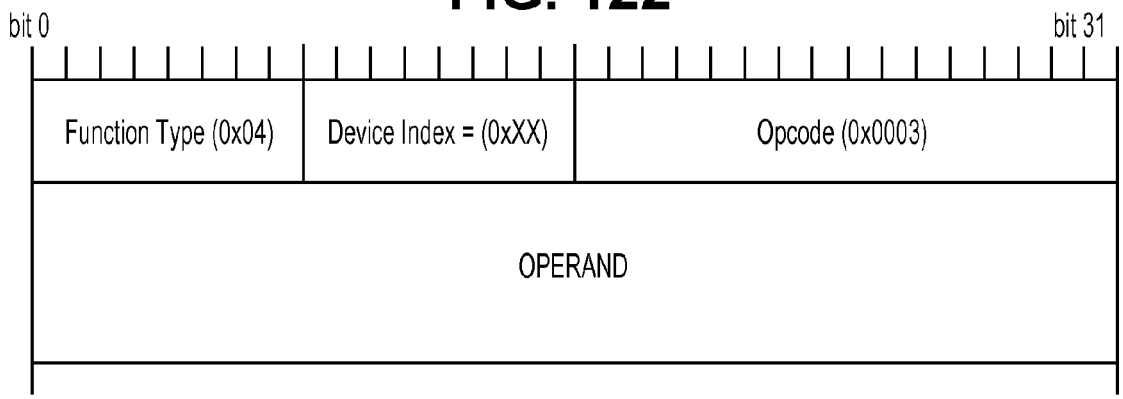

FIG. 123 illustrates an EDID Response message. This command provides EDID information to a Source device. It is only sent when prompted by an EDID Request message.

Figure 124:
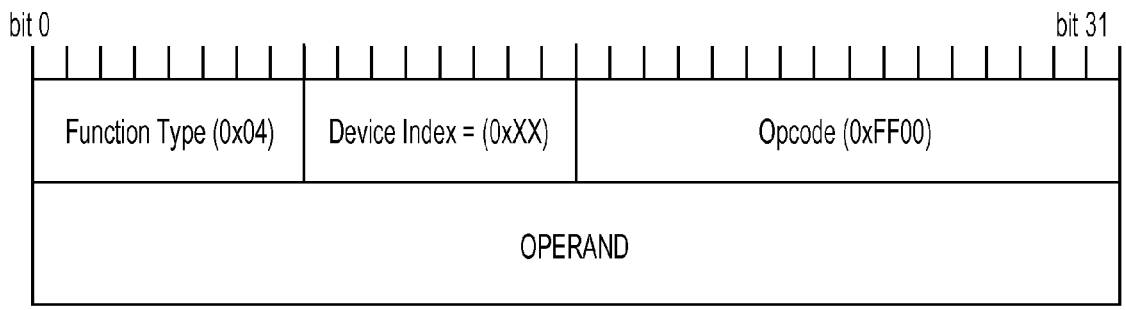
Figure 125:
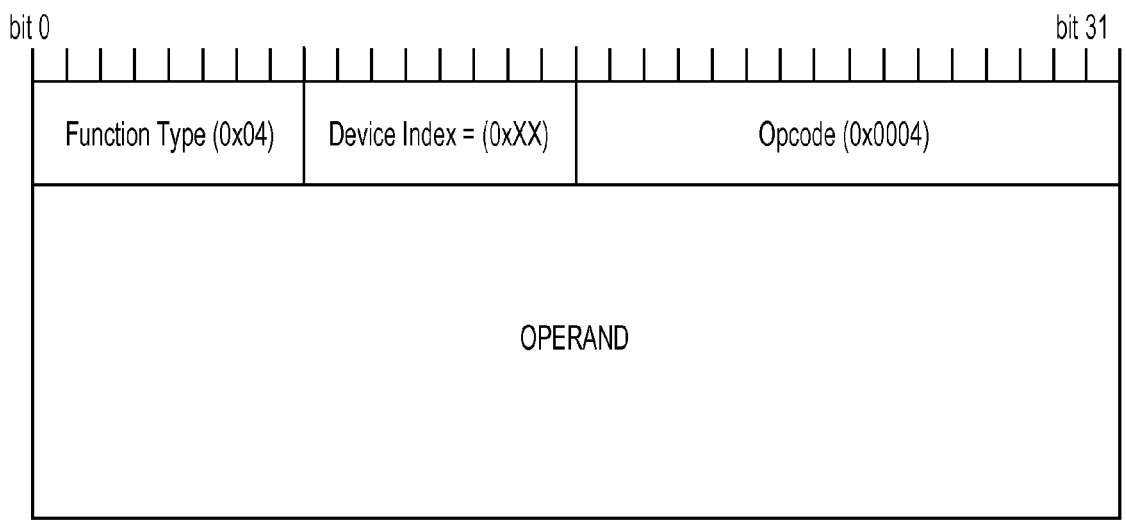
Figure 126:
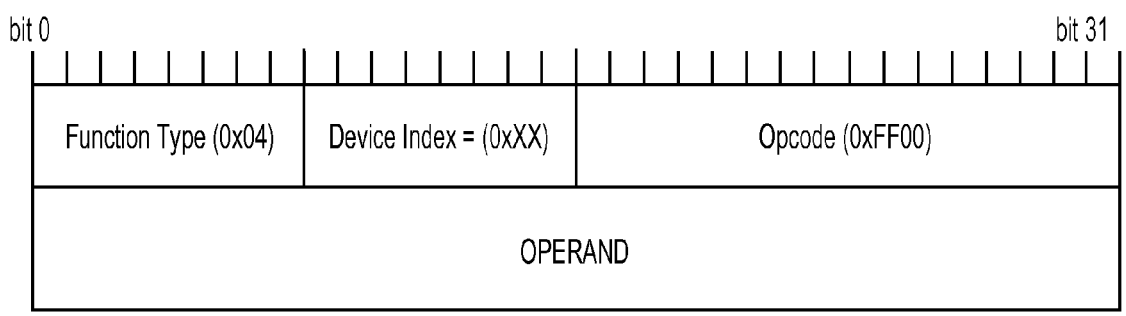
Figure 127:
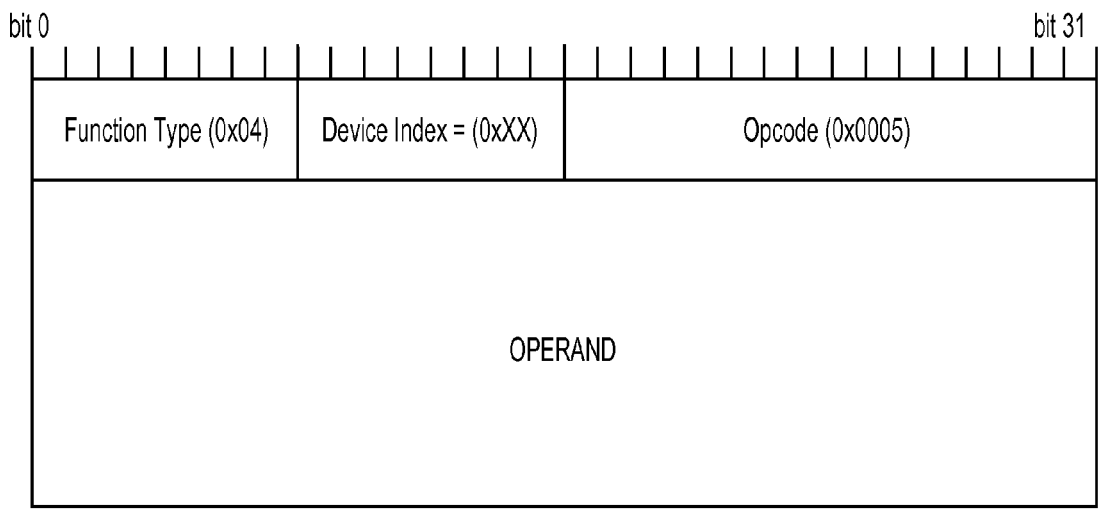

Input Parameters:
Function Type—Indicates the function type of the opcode. This value is '0x04' to indicate the HDMI Pass-Through function type.
Device Index—Indicates the device index to send EDID information to.
Opcode—The opcode corresponding to the HDMI Pass-Through Request. This value is 0x0003.
Result Code—This field indicates the result of the EDID request. A value of "0" indicates success, whereas "1" indicates failure.
Number of Blocks—Number of 128-octet EDID blocks are contained in this message.
Expected Response:
None. No response is explicitly expected in response to an EDID Response message.
Timeout:
For a properly formatted EDID Response message, the transceiver doesn't provide any further feedback to the host to indicate a success condition. If, for some reason, the transceiver is unable to send the message to the destination, a Feature Abort message will be generated and sent to the host indicating a timeout. FIG. 124 illustrates a Feature Abort message indicating a failure to send the EDID Response. Its parameters are:
Function Type—Indicates the function type of the opcode. This value is '0x04' to indicate the HDMI Pass-Through function type.
Device Index—Indicates the device index of the remote unit that the original message was being sent to.
Opcode—The opcode corresponding to the Feature Abort message. This value is 0xFF00.
Rejected Opcode—The opcode of the message that failed. In this case, the EDID Response has failed, so the value is 0x0003.
Reason Code—This field will provide an indication of why the message has failed. In this case, a reason code of 0x06 will be issued to denote a timeout.
Failure Case Response:
A failure will be indicated by the transceiver with a Feature Abort message. The three possible causes of failure correspond to the following reason codes:
Not in correct mode to respond (0x02)—If the message was sent before the transceiver was initialized, a Feature Abort message with this reason code will be issued. This message will also be issued if the appropriate Pass-Through Request/Response handshake has not been established between the two devices.
Invalid Operand (0x04)—If the device index field is invalid, a Feature Abort message with this reason code will be issued.
Out of Sequence (0x07)—If the EDID Response is sent to a recipient that has not issued a HDMI EDID Request, the Out of Sequence reason code will be sent to the host.
Data Island Notify
FIG. 125 illustrates a Data Island Notify message. This command provides EDID information to a Source device. It is only sent when prompted by an EDID Request message.
Input Parameters:
Function Type—Indicates the function type of the opcode. This value is '0x04' to indicate the HDMI Pass-Through function type.
Device Index—Indicates the device index to send the Data Island packet to.
Opcode—The opcode corresponding to the Data Island Notify message. This value is 0x0004.
Port—There are two ports associated with any connection—the logical port on the sink and the logical port of the source device. These fields and which device will perform sink vs. source role have already been established during the Connect Request/Response. This message uses values that were established at the time of the Connect Request/Response messages.
VP—Indicates that the port identified in this message will carry video data.
AP—Indicates that the port identified in this message will carry audio data.
Frame—Frame number that the Data Island Notify message should apply to.
Total Length—Indicates the total number of octets used by the Data Island Notify message to send "type-length-value" (TLV) data.
Expected Response:
None. No response is explicitly expected in response to a Data Island Notify message.
Timeout:
For a properly formatted Data Island Notify message, the transceiver does not need to provide any further feedback to the host to indicate a success condition. If, for some reason, the transceiver is unable to send the message to the destination, a Feature Abort message will be generated and sent to the host indicating a timeout. FIG. 126 illustrates a Feature Abort message indicating a failure to send the Data Island Notify. Its parameters are:
Function Type—Indicates the function type of the opcode. This value is '0x04' to indicate the HDMI Pass-Through function type.
Device Index—Indicates the device index of the remote unit that the original message was being sent to.
Opcode—The opcode corresponding to the Feature Abort message. This value is 0xFF00.
Rejected Opcode—The opcode of the message that failed. In this case, the Data Island Notify message has failed, so the value is 0x0004.
Reason Code—This field will provide an indication of why the message has failed. In this case, a reason code of 0x06 will be issued to denote a timeout.
Failure Case Response:
A failure will be indicated by the transceiver with a Feature Abort message. The two possible causes of failure correspond to the following reason codes:
Not in correct mode to respond (0x02)—If the message was sent before the transceiver was initialized, a Feature Abort message with this reason code will be issued. This message will also be issued for two other cases: 1) the appropriate Pass-Through Request/Response handshake has not been established between the two devices, 2) a successful connection control link has not been established between the two WirelessHD devices.
Invalid Operand (0x04)—If the device index field is invalid, a Feature Abort message with this reason code will be issued. This message will also be generated if the Port and VP/AP information does not match the values that were set during the Connect Request/Response dialogue.
CEC Notify
FIG. 127 illustrates a CEC Notify message. This command forwards a CEC message to a remote device on the WirelessHD network.
Input Parameters:
Function Type—Indicates the function type of the opcode. This value is '0x04' to indicate the HDMI Pass-Through function type.
Device Index—Indicates the device index to send the CEC packet to.

Opcode—The opcode corresponding to the CEC Notify message. This value is 0x0005.

Message Number—Host generated sequential numbering scheme for CEC messages.

Fragment Number—In the event that a single CEC message needs to be fragmented into multiple pieces, this field will allow the remote device to distinguish between retransmissions and sequential fragments.

Fragment Length—Indicates the length in octets of the "Fragment Data" block of this message.

LF—Zero (0) typically. Set to one (1) if current fragment is the last fragment of a message.

Fragment Data—The entire CEC message (or fragment), unprocessed.

Expected Response:

None. No response is explicitly expected in response to a CEC Notify message. Certain CEC messages will provide a response message, but the responsibility of maintaining state information of the CEC application layer is on the host system.

Figure 128:
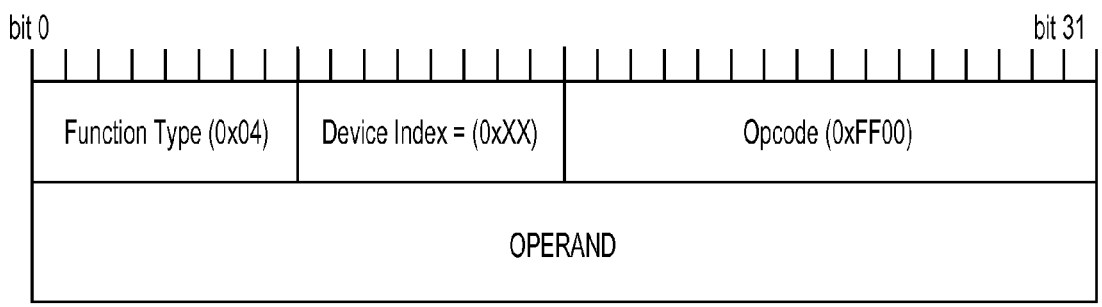

Timeout:

For a properly formatted CEC Notify message, the transceiver does not provide any further feedback to the host to indicate a success condition. If, for some reason, the transceiver is unable to send the message to the destination, a Feature Abort message will be generated and sent to the host indicating a timeout. FIG. 128 illustrates a Feature Abort message indicating a failure to send the CEC Notify. Its parameters are:

Function Type—Indicates the function type of the opcode. This value is '0x04' to indicate the HDMI Pass-Through function type.

Device Index—Indicates the device index of the remote unit that the original message was being sent to.

Opcode—The opcode corresponding to the Feature Abort message. This value is 0xFF00.

Rejected Opcode—The opcode of the message that failed. In this case, the CEC Notify message has failed, so the value is 0x0005.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued. This message will also be issued if the appropriate Pass-Through Request/Response handshake has not been established between the two devices.

Invalid Operand (0x04)—If the device index field is invalid, a Feature Abort message with this reason code will be issued.

CEC NAK

Figure 129:
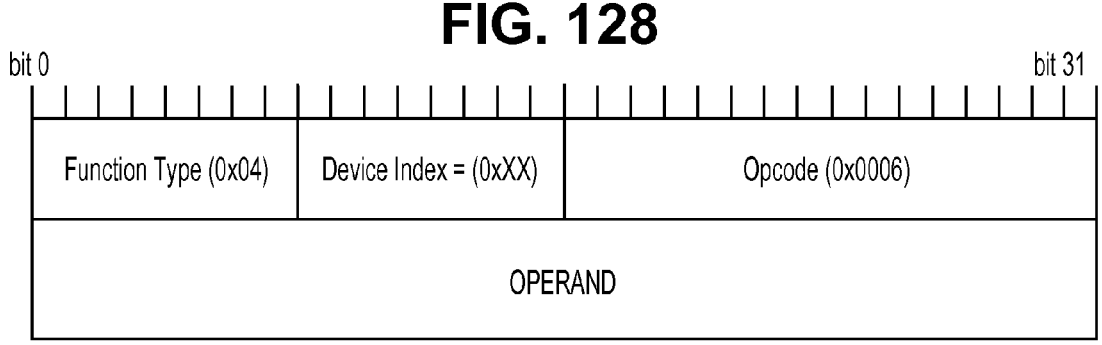

FIG. 129 illustrates a CEC NAK message. This command notifies a remote device that a CEC message sent by that remote device was not accepted (NAK) on the local CEC bus.

Input Parameters:

Function Type—Indicates the function type of the opcode. This value is '0x04' to indicate the HDMI Pass-Through function type.

Device Index—Indicates the device index to send the NAK packet to.

Opcode—The opcode corresponding to the CEC NAK message. This value is 0x0006.

Result Code—This field indicates the result of the CEC request. A value of "0" indicates success, whereas "1" indicates failure.

Message Number—Host generated sequential numbering scheme for CEC messages. This number must correspond to the Message Number of the CEC Notify message that cannot be placed on the CEC bus.

Expected Response:

None. No response is explicitly expected in response to a CEC NAK message.

Timeout:

For a properly formatted CEC NAK message, the transceiver should not need to provide any further feedback to the host to indicate a success condition. If, for some reason, the transceiver is unable to send the message to the destination, a Feature Abort message will be generated and sent to the host indicating a timeout. FIG. 130 illustrates a Feature Abort message indicating a failure to send the CEC NAK.

Function Type—Indicates the function type of the opcode. This value is '0x04' to indicate the HDMI Pass-Through function type.

Device Index—Indicates the device index of the remote unit that the original message was being sent to.

Opcode—The opcode corresponding to the Feature Abort message. This value is 0xFF00.

Rejected Opcode—The opcode of the message that failed. In this case, the CEC NAK message has failed, so the value is 0x0006.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued. This message will also be issued if the appropriate Pass-Through Request/Response handshake has not been established between the two devices.

Invalid Operand (0x04)—If the device index field is invalid, a Feature Abort message with this reason code will be issued. This message will also be sent if the CEC NAK message is sent to a device that did not issue the CEC message.

Logical Address Table Notify

FIG. 131 illustrates a Logical Address Table Notify message. This command notifies a remote device of the logical addresses occupied on the local CEC bus.

Input Parameters:

Function Type—Indicates the function type of the opcode. This value is '0x04' to indicate the HDMI Pass-Through function type.

Device Index—Indicates the device index to send the Logical Address bitmap to.

Opcode—The opcode corresponding to the Logical Address Table Notify message. This value must be 0x0007.

Logical Address Bitmap—The 16-bit bit-field indicates the HDMI logical addresses occupied on the local CEC bus. The definitions of each bit location are defined in the HDMI specification which should be referred to for detailed information. FIG. 132 illustrates fields for definitions of the logical address bitmap.

Expected Response:

None. No response is explicitly expected in response to a Logical Address Table Notify message.

Timeout:

For a properly formatted Logical Address Table Notify message, the transceiver should not need to provide any further feedback to the host to indicate a success condition. If, for some reason, the transceiver is unable to send the message to the destination, a Feature Abort message will be generated and sent to the host indicating a timeout. FIG. 133 illustrates a Feature Abort message indicating a failure to send the Logical Address Table Notify. Its parameters are:

Function Type—Indicates the function type of the opcode. This value is '0x04' to indicate the HDMI Pass-Through function type.

Device Index—Indicates the device index of the remote unit that the original message was being sent to.

Opcode—The opcode corresponding to the Feature Abort message. This value is 0xFF00.

Rejected Opcode—The opcode of the message that failed. In this case, the Logical Address Table Notify message has failed, so the value is 0x0007.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued. This message will also be issued if the appropriate Pass-Through Request/Response handshake has not been established between the two devices.

Invalid Operand (0x04)—If the device index field is invalid, a Feature Abort message with this reason code will be issued.

HPD Notify

FIG. 134 illustrates an HPD Notify message. This command notifies a remote device of the Hot Plug Detect state of the HDMI bus.

Input Parameters:

Function Type—Indicates the function type of the opcode. This value is '0x04' to indicate the HDMI Pass-Through function type.

Device Index—Indicates the device index to send the HPD Notify message to.

Opcode—The opcode corresponding to the HPD Notify message. This value is 0x0008.

HPD—The state of the Hot-Plug Detect signal. A one (1) indicates that the HPD signal is asserted. A zero (0) indicates that the HPD signal is not asserted.

Expected Response:

None. No response is explicitly expected in response to an HPD Notify message.

Timeout:

For a properly formatted HPD Notify message, the transceiver does not provide any further feedback to the host to indicate a success condition. If, for some reason, the transceiver is unable to send the message to the destination, a Feature Abort message will be generated and sent to the host indicating a timeout. FIG. 135 illustrates a Feature Abort message indicating a failure to send the HPD Notify. Its parameters are:

Function Type—Indicates the function type of the opcode. This value is '0x04' to indicate the HDMI Pass-Through function type.

Device Index—Indicates the device index of the remote unit that the original message was being sent to.

Opcode—The opcode corresponding to the Feature Abort message. This value is 0xFF00.

Rejected Opcode—The opcode of the message that failed. In this case, the HPD Notify message has failed, so the value is 0x0008.

Reason Code—This field will provide an indication of why the message has failed. In this case, a reason code of 0x06 will be issued to denote a timeout.

Failure Case Response:

A failure will be indicated by the transceiver with a Feature Abort message. The two possible causes of failure correspond to the following reason codes:

Not in correct mode to respond (0x02)—If the message was sent before the transceiver was initialized, a Feature Abort message with this reason code will be issued. This message will also be issued if the appropriate Pass-Through Request/Response handshake has not been established between the two devices.

Invalid Operand (0x04)—If the device index field is invalid, a Feature Abort message with this reason code will be issued.

Other Messages

FIG. 136 illustrates a Feature Abort message indicating unrecognized opcode. The response to failure cases for each category of messages has been described in the previous sections. In general, a message failure will result in a Feature Abort message. Messages received by the transceiver that do not contain valid opcodes will also result in a Feature Abort with the corresponding Reason Code.

An Example of a Communication System

FIG. 138 is a block diagram of one embodiment of a communication system. Referring to FIG. 130, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beam-forming. The other wireless connection is via wireless communications channel 107, referred to herein as the back channel. In one embodiment, wireless communications channel 107 is uni-directional. In an alternative embodiment, wireless communications channel 107 is bi-directional. In one embodiment, the back channel can use some or all of the same antennas as the forward beam-formed channel (part of 105). In another embodiment, the two sets of antennas are disjoint.

Receiver device 141 transfers the content received from transmitter device 140 to media player 114 via an interface such as a media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection. The transfer could also occur through a wired or wireless data interface that was not a media player interface.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content. The same techniques can be used in non-media data applications as well.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display. An example of such a device is shown in FIG. 139.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beam-forming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beam-forming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals.

In one embodiment, transmitter device 140 and/or receiver device 141 are part of separate transceivers.

Transmitter device 140 and receiver device 141 perform wireless communication using a phased array antenna with adaptive beam-forming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at the other location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization or tuning of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa. In one embodiment, communications link 107 transfers information from receiver device 141 to transmitter device 140 that can be used to control phased array antenna 105.

An Example of a Transceiver Architecture

One embodiment of a transceiver is described below. The transceiver includes transmit and receive paths for a transmitter and receiver, respectively. In one embodiment, the transmitter, for use in communication with a receiver, comprises a processor and a phased array beamforming antenna. The processor controls the antenna to perform adaptive beam steering using multiple transmit antennas in conjunction with receive antennas of the receiver by iteratively performing a set of training operations. One of the training operations comprises the processor causing the phased array beamforming antenna to transmit a first training sequence while a receive antenna-array weight vector of the receiver is set and a transmitter antenna-array weight vector switches between weight vectors with a set of weight vectors. Another of the training operations comprises the processor causing the phased array beamforming antenna to transmit a second training sequence while a transmitter antenna-array weight vector is set as part of a process to calculate the receive antenna-array weight vector.

In one embodiment, the receiver, for use in communication with a transmitter, comprises a processor and a phased array beamforming antenna. The processor controls the antenna to perform adaptive beam steering using multiple receive antennas in conjunction with transmit antennas of the transmitter by iteratively performing a set of training operations. One of the training operations comprises the processor setting a receive antenna-array weight vector during a process for estimating a transmit antenna-array weight vector by having the transmitter transmit a first training sequence while the receive antenna-array weight vector is set. Another of the training operations comprises the processor calculate the receive antenna-array weight vector when the transmitter transmits a second training sequence while the transmitter antenna-array weight vector is set.

FIG. 140 is a block diagram of one embodiment of a transmitter device and a receiver device that are part of an adaptive beam forming multiple antenna radio system containing of FIG. 138. Transceiver 300 includes multiple independent transmit and receive chains and performs phased array beam forming using a phased array that takes an identical RF signal and shifts the phase for one or more antenna elements in the array to achieve beam steering.

Referring to FIG. 140, digital baseband processing module (e.g., Digital Signal Processor (DSP)) 301 formats the content and generates real time baseband signals. Digital baseband processing module 301 may provide modulation, FEC coding, packet assembly, interleaving and automatic gain control.

Digital baseband processing module 301 then forwards the baseband signals to be modulated and sent out on the RF portion of the transmitter. In one embodiment, the content is modulated into OFDM signals in a manner well known in the art.

Digital-to-analog converter (DAC) 302 receives the digital signals output from digital baseband processing module 301 and converts them to analog signals. In one embodiment, the signal outputs from DAC 302 are between 0-1.7 GHz. Analog front end 303 receives the analog signals and filters it with an appropriate low-pass image-rejection filter and amplifies it accordingly. The IF module 304 receives the output of analog front end 303 and up-converts it to the IF frequency. In one embodiment, the IF frequency is between 2-15 GHz.

RF mixer 305 receives signals output from IF amplifier 304 and combines them with a signal from a local oscillator (LO) (not shown) in a manner well-known in the art. The signals output from mixer 305 are at an intermediate frequency. In one embodiment, the intermediate frequency is between 2-15 GHz.

Multiplexer 306 is coupled to receive the output from mixer 305 to control which phase shifters $307_{1-N}$ receive the signals. In one embodiment, phase shifters $307_{1-N}$ are quantized phase shifters. In an alternative embodiment, phase shifters $307_{1-N}$ may be replaced by IF or RF amplifiers with controllable gain and phase. In one embodiment, digital baseband processing module 201 also controls, via control channel 360, the phase and magnitude of the currents in each of the antenna elements in phased array antenna to produce a desired beam pattern in a manner well-known in the art. In other words, digital baseband processing module 201 controls the phase shifters $307_{1-N}$ of phased array antenna to produce the desired pattern.

Each of phase shifters $307_{1-K}$ produce an output that is sent to one of power amplifiers $308_{1-N}$, which amplify the signal. The amplified signals are sent to an antenna array that has multiple antenna elements $309_{1-N}$. In one embodiment, the signals transmitted from antennas $309_{1-N}$ are radio frequency signals between 56-64 GHz. Thus, multiple beams are output from the phased array antenna.

With respect to the receiver, antennas $310_{1-N}$ receive the wireless transmissions from antennas $309_{1-NK}$ and provide them to phase shifters $312_{1-N}$, via low-noise amplifiers $311_{1-N}$, respectively. As discussed above, in one embodiment, phase shifters $312_{1-N}$ comprise quantized phase shifters. Alternatively, phase shifters $312_{1-N}$ may be replaced by complex multipliers. Phase shifters $312_{1-N}$ receive the signals from antennas $310_{1-N}$, which are combined by RF combiner 313 to form a single line feed output. In one embodiment, a multiplexer is used to combine the signals from the different elements and output the single feed line. The output of RF combiner 313 is input to RF mixer 314.

Mixer 314 receives the output of the RF combiner 313 and combines it with a signal from a LO (not shown) in a manner well-known in the art. In one embodiment, the output of mixer 314 is a signal with the IF carrier frequency of 2-15 GHz. The IF module then down-converts the IF signal to the baseband frequency. In one embodiment, there are I and Q signals, which are between 0-1.7 GHz.

Analog-to-digital converter (ADC) 316 receives the output of IF 315 and converts it to digital form. The digital output from ADC 316 is received by digital baseband processing module (e.g., DSP) 318. Digital baseband processing module 318 restores the amplitude and phase of the signal. Digital baseband processing module 318 may provide demodulation, packet disassembly, de-interleaving and automatic gain.

In one embodiment, each of the transceivers includes a controlling microprocessor that sets up control information for the digital baseband processing module (e.g., DSP). The controlling microprocessor may be on the same die as the digital baseband processing module (e.g., DSP).

DSP-Controlled Adaptive Beam Forming

In one embodiment, the DSPs implement an adaptive algorithm with the beam forming weights being implemented in hardware. That is, the transmitter and receiver work together to perform the beam forming in RF frequency using digitally controlled analog phase shifters; however, in an alternative embodiment, the beam-forming is performed in IF. Phase shifters $307_{1-N}$ and $312_{1-N}$ are controlled via control channel 360 and control channel 370, respectfully, via their respective DSPs in a manner well known in the art. For example, digital baseband processing module (e.g., DSP) 301 controls phase shifters $307_{1-N}$ to have the transmitter perform adaptive beam-forming to steer the beam while digital baseband processing module (e.g., DSP) 318 controls phase shifters $312_{1-N}$ to direct antenna elements to receive the wireless transmission from antenna elements and combine the signals from different elements to form a single line feed output. In one embodiment, a multiplexer is used to combine the signals from the different elements and output the single feed line. Note that processors (e.g., DSPs) that control the digital baseband processing modules, such as shown in the transmitters and receivers of FIG. 1, could be coupled to control channels 360 and 370, respectively, could be used to control phase shifters $307_{1-N}$ and $312_{1-N}$.

Digital baseband processing module (e.g., DSP) 301 performs the beam steering by pulsing, or energizing, the appropriate phase shifter connected to each antenna element. The pulsing algorithm under digital baseband processing module (e.g., DSP) 301 controls the phase and gain of each element. Performing DSP controlled phase array beam-forming is well known in the art.

The adaptive beam forming antenna is used to avoid interfering obstructions. By adapting the beam forming and steering the beam, the communication can occur avoiding obstructions which may prevent or interfere with the wireless transmissions between the transmitter and the receiver.

In one embodiment, with respect to the adaptive beam-forming antennas, they have three phases of operations. The three phases of operations are the training phase, a searching phase, and a tracking phase. The training phase and searching phase occur during initialization. The training phase determines the channel profile with predetermined sequences of spatial patterns $\{A\hat{i}\}$ and $\{B\hat{j}\}$. The searching phase computes a list of candidate spatial patterns $\{A\overline{i}\}$, $\{B\overline{j}\}$ and selects a prime candidate $\{A\overline{0}, B\overline{0}\}$ for use in the data transmission between the transmitter of one transceiver and the receiver of another. The tracking phase keeps track of the strength of the candidate list. When the prime candidate is obstructed, the next pair of spatial patterns is selected for use.

In one embodiment, during the training phase, the transmitter sends out a sequence of spatial patterns $\{A\hat{i}\}$. For each spatial pattern $\{A\hat{i}\}$, the receiver projects the received signal onto another sequence of patterns $\{B\hat{j}\}$. As a result of the projection, a channel profile is obtained over the pair $\{A\hat{i}\}$, $\{B\hat{j}\}$.

In one embodiment, an exhaustive training is performed between the transmitter and the receiver in which the antenna of the receiver is positioned at all locations and the transmitter sending multiple spatial patterns. Exhaustive training is well-known in the art. In this case, M transmit spatial patterns are transmitted by the transmitter and N received spatial patterns are received by the receiver to form an N by M channel matrix. Thus, the transmitter goes through a pattern of transmit sectors and the receiver searches to find the strongest signal for that transmission. Then the transmitter moves to the next sector. At the end of the exhaustive search process, a ranking of all the positions of the transmitter and the receiver and the signals strengths of the channel at those positions has been obtained. The information is maintained as pairs of positions of where the antennas are pointed and signal strengths of the channels. The list may be used to steer the antenna beam in case of interference.

In an alternative embodiment, subspace training is used in which the space is divided in successively narrow sections with orthogonal antenna patterns being sent to obtain a channel profile.

Assuming digital baseband processing module 301 (DSP) is in a stable state and the direction the antenna should point is already determined. In the nominal state, the DSP will have a set of coefficients that it sends to the phase shifters. The coefficients indicate the amount of phase the phase shifter is to shift the signal for its corresponding antennas. For example, digital baseband processing module 301 (DSP) sends a set digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 32, 36, 64 elements in the array by different amounts enables the antenna to be steered in a direction that provides the most sensitive reception location for the receiving antenna. That is, the composite set of shifts over the entire antenna array provides the ability to stir where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

The Back Channel

In one embodiment, the wireless communication system includes a back channel 320, or link, for transmitting information between wireless communication devices (e.g., a transmitter and receiver, a pair of transceivers, etc.). The information is related to the beam-forming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIG. 140, back channel 320 is coupled between digital baseband processing module (DSP) 318 and digital baseband processing module (DSP) 301 to enable digital baseband processing module (DSP) 318 to send tracking and control information to digital baseband processing module (DSP) 301. In one embodiment, back channel 320 functions as a high speed downlink and an acknowledgement channel.

In one embodiment, the back channel is also used to transfer information corresponding to the application for which the wireless communication is occurring (e.g., wireless video). Such information includes content protection information. For example, in one embodiment, the back channel is used to transfer encryption information (e.g., encryption keys and acknowledgements of encryption keys) when the transceivers are transferring HDMI data. In such a case, the back channel is used for content protection communications.

More specifically, in HDMI, encryption is used to validate that the data sink is a permitted device (e.g., a permitted display). There is a continuous stream of new encryption keys that is transferred while transferring the HDMI datastream to validate that the permitted device hasn't changed. Blocks of frames for the HD TV data are encrypted with different keys and then those keys have to be acknowledged back on back channel 320 in order to validate the player. Back channel 220 transfers the encryption keys in the forward direction to the receiver and acknowledgements of key receipts from the receiver in the return direction. Thus, encrypted information is sent in both directions.

The use of the back channel for content protection communications is beneficial because it avoids having to complete a lengthy retraining process when such communications are sent along with content. For example, if a key from a transmitter is sent alongside the content flowing across the primary link and that primary link breaks, it will force a lengthy retrain of 2-3 seconds for a typical HDMI/HDCP system. In one embodiment, this separate bi-directional link that has higher reliability than the primary directional link given its omni-directional orientation. By using this back channel for communication of the HDCP keys and the appropriate acknowledgement back from the receiving device, the time consuming retraining can be avoided even in the event of the most impactful obstruction.

In the active mode, when the beam-forming antennas are transferring content, the back channel is used to allow the receiver to notify the transmitter about the status of the channel. For example, while the channel between the beam-forming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beam-forming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bi-directional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, CPM is used to transfer information over the back channel.

An Example of a Computer System

FIG. 141 is a block diagram of an exemplary computer system that may perform one or more of the operations described herein. Referring to FIG. 141, computer system 14100 may comprise an exemplary client or server computer system. Computer system 14100 comprises a communication mechanism or bus 14111 for communicating information, and a processor 14112 coupled with bus 14111 for processing information. Processor 14112 includes a microprocessor, but is not limited to a microprocessor, such as, for example, Pentium™, PowerPC™, Alpha™, etc.

System 14100 further comprises a random access memory (RAM), or other dynamic storage device 14104 (referred to as main memory) coupled to bus 14111 for storing information and instructions to be executed by processor 14112. Main memory 14104 also may be used for storing temporary variables or other intermediate information during execution of instructions by processor 14112.

Computer system 14100 also comprises a read only memory (ROM) and/or other static storage device 14106 coupled to bus 14111 for storing static information and instructions for processor 14112, and a data storage device 14107, such as a magnetic disk or optical disk and its corresponding disk drive. Data storage device 14107 is coupled to bus 14111 for storing information and instructions.

Computer system 14100 may further be coupled to a display device 14121, such as a cathode ray tube (CRT) or liquid crystal display (LCD), coupled to bus 14111 for displaying information to a computer user. An alphanumeric input device 14122, including alphanumeric and other keys, may also be coupled to bus 14111 for communicating information and command selections to processor 14112. An additional user input device is cursor control 14123, such as a mouse, trackball, trackpad, stylus, or cursor direction keys, coupled to bus 14111 for communicating direction information and command selections to processor 14112, and for controlling cursor movement on display 14121.

Another device that may be coupled to bus 14111 is hard copy device 14124, which may be used for marking information on a medium such as paper, film, or similar types of media. Another device that may be coupled to bus 14111 is a wired/wireless communication capability 14125 to communication to a phone or handheld palm device.

Note that any or all of the components of system 14100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for initializing a transceiver that is part of an apparatus for use in a wireless communication system for communicating with WirelessHD devices in a wireless network, where the apparatus comprises a host processor; a transceiver; a physical interface coupling the host processor and the transceiver; and a memory accessible by the host processor and the transceiver via the interface to exchange information between the host processor and the transceiver via the interface, the initialization method comprising:
   resetting the transceiver by initializing internal hardware and software subsystems of the transceiver;
   determining if the transceiver is ready for use after resetting based on a status of a register within the memory;
   the transceiver entering a configuration state to configure the transceiver if determined ready for use;
   configuring the transceiver, such that the transceiver is configured as part of initialization; and
   after configuration, the transceiver entering a wait enable state during which the transceiver waits for its wireless interface to be enabled before wireless operation of the transceiver becomes active;
   prior to the transceiver being visible on the wireless network, the transceiver receiving an indication that host processor capabilities information is available in the memory;
   responsive to receiving the indication that the host processor capabilities information is available, the transceiver accessing the memory to obtain the host processor capabilities information; and
   the transceiver parsing fields in the host processor capabilities information; and
   the transceiver making itself visible on the wireless network by advertising the host process capabilities.

2. The method defined in claim 1 wherein resetting of the transceiver occurs in response to a reset pin being asserted.

3. The method defined in claim 1 wherein resetting of the transceiver occurs in response to the host processor writing data to hardware reset field in a register stored in a register bank.

4. The method defined in claim 1 further comprising the transceiver reinitializing its internal states and then notifying the host processor.

5. The method defined in claim 4 wherein the transceiver notifies the host processor by writing value in a control register in a memory accessible by the host processor.

6. The method defined in claim 1 further comprising, after physical hardware of the transceiver is on-line, the transceiver entering a wait enable state during which the transceiver waits for its wireless interface to be enabled before wireless operation of the transceiver becomes active.

7. The method defined in claim 6 wherein the transceiver waits until the host processor enables the transceiver wireless interface by writing to a predetermined location in memory.

8. The method defined in claim 7 wherein the predetermined location is a field in a host control register.

9. The method defined in claim 7 further comprising, the transceiver, after being enabled, accessing information to configure itself as a source, sink or either.

10. An apparatus for use in a wireless communication system for communicating with WirelessHD devices in a wireless network, the apparatus comprising:
   a host processor;
   a transceiver;
   a physical interface coupling the host processor and the transceiver; and
   a memory accessible by the host processor and the transceiver via the interface to exchange information between the host processor and the transceiver via the interface, wherein the transceiver and host processor operate together to initialize the transceiver by resetting the transceiver by initializing internal hardware and software subsystems of the transceiver;
   determining if the transceiver is ready for use after resetting based on a status of a register within the memory;
   the transceiver entering a configuration state to configure the transceiver if determined ready for use configuring the transceiver, such that the transceiver is configured as part of initialization; and
   after configuration, the transceiver entering a wait enable state during which the transceiver waits for its wireless interface to be enabled before wireless operation of the transceiver becomes active;
   prior to the transceiver being visible on the wireless network, the transceiver receiving an indication that host processor capabilities information is available in the memory;
   responsive to receiving the indication that the host processor capabilities information is available, the transceiver accessing the memory to obtain the host processor capabilities information; and
   the transceiver parsing fields in the host processor capabilities information; and
   the transceiver making itself visible on the wireless network by advertising the host process capabilities.

11. The apparatus defined in claim 10 wherein the transceiver resets itself in response to a reset pin being asserted.

12. The apparatus defined in claim 10 wherein the transceiver resets itself in response to the host processor writing data to hardware reset field in a register stored in the memory.

13. The apparatus defined in claim 10 wherein the transceiver re-initalizes its internal states and then notifying the host processor.

14. The apparatus defined in claim 13 wherein the transceiver notifies the host processor by writing value in a control register in the memory, which the host processor subsequently accesses.

15. The apparatus defined in claim 10 wherein, after physical hardware of the transceiver is on-line, the transceiver enters a wait enable state during which the transceiver waits for its wireless interface to be enabled before wireless operation of the transceiver becomes active.

16. The apparatus defined in claim 15 wherein the transceiver waits until the host processor enables the transceiver wireless interface by writing to a predetermined location in memory.

17. The apparatus defined in claim 16 wherein the predetermined location is a field in a host control register in the memory.

18. The apparatus defined in claim 16 wherein, the transceiver, after being enabled, accesses information, stored by the host processor in memory, to configure itself as a source, sink or either.

\* \* \* \* \*